(12) United States Patent
Kamiya

(10) Patent No.: US 11,833,644 B2
(45) Date of Patent: Dec. 5, 2023

(54) ELECTRIC POWER TOOL AND ELECTRIC VIBRATION DRIVER DRILL

(71) Applicant: MAKITA CORPORATION, Anjo (JP)

(72) Inventor: Takeshi Kamiya, Anjo (JP)

(73) Assignee: MAKITA CORPORATION, Anjo (JP)

(*) Notice: Subject to any disclaimer, the term of this patent is extended or adjusted under 35 U.S.C. 154(b) by 986 days.

(21) Appl. No.: 16/416,368

(22) Filed: May 20, 2019

(65) Prior Publication Data

US 2019/0375079 A1 Dec. 12, 2019

(30) Foreign Application Priority Data

Jun. 6, 2018 (JP) .................................. 2018-108877

(51) Int. Cl.
| | | |
|---|---|---|
| B25B 21/02 | (2006.01) | |
| B23B 45/00 | (2006.01) | |
| B25B 19/00 | (2006.01) | |
| B23B 45/02 | (2006.01) | |

(52) U.S. Cl.
CPC .......... B25B 21/023 (2013.01); B23B 45/008 (2013.01); B25B 19/00 (2013.01); B23B 45/02 (2013.01)

(58) Field of Classification Search
None
See application file for complete search history.

(56) References Cited

U.S. PATENT DOCUMENTS

| | | | | | |
|---|---|---|---|---|---|
| 5,409,243 | A | * | 4/1995 | Shadeck | B23B 31/1238 279/157 |
| 5,449,043 | A | * | 9/1995 | Bourner | B25D 11/102 173/48 |
| 7,431,308 | B2 | * | 10/2008 | Cachod | B23B 31/1238 279/140 |
| 8,434,564 | B2 | * | 5/2013 | Tomayko | B25F 5/001 173/217 |
| 9,358,617 | B2 | * | 6/2016 | Bordeianu | B23B 31/1238 |
| 2009/0066039 | A1 | * | 3/2009 | Cachod | B23B 31/123 279/60 |

(Continued)

FOREIGN PATENT DOCUMENTS

| | | |
|---|---|---|
| CN | 101184571 A | 5/2008 |
| CN | 201783922 U | 4/2011 |

(Continued)

OTHER PUBLICATIONS

Jun. 9, 2021 Office Action Issued in U.S. Appl. No. 16/416,406.
(Continued)

*Primary Examiner* — Tanzim Imam
(74) *Attorney, Agent, or Firm* — Oliff PLC

(57) ABSTRACT

An electric vibration driver drill as one example of an electric power tool includes the gear housing, the vibration mechanism and the clutch mechanism each located inside the gear housing, the mode switching ring (vibration switching ring) configured to operate the vibration mechanism and rotatably held to the gear housing, the clutch ring (clutch switching ring) configured to operate the clutch mechanism and rotatably held to the housing, and the respective balls located between the mode switching ring and the clutch ring.

11 Claims, 42 Drawing Sheets

(56) References Cited

U.S. PATENT DOCUMENTS

| | | | |
|---|---|---|---|
| 2010/0163261 A1 | 7/2010 | Tomayko et al. | |
| 2012/0279738 A1 | 11/2012 | Tomayko et al. | |
| 2016/0211730 A1* | 7/2016 | Niwa | H02K 9/28 |
| 2016/0226339 A1* | 8/2016 | Niwa | H02K 5/08 |
| 2017/0157753 A1 | 6/2017 | Nagasaka | |

FOREIGN PATENT DOCUMENTS

| | | |
|---|---|---|
| CN | 205600652 U | 9/2016 |
| JP | 2003-220570 A | 8/2003 |
| JP | 2012-218088 A | 11/2012 |
| JP | 2016-150431 A | 8/2016 |
| JP | 2016-214042 A | 12/2016 |
| JP | 2017-100259 A | 6/2017 |

OTHER PUBLICATIONS

Oct. 29, 2021 Notice of Allowance issued in U.S. Appl. No. 16/416,406.
Jan. 5, 2022 Office Action issued in Japanese Patent Application No. 2018-108877.
U.S. Appl. No. 16/416,406, filed May 20, 2019.
Jul. 5, 2023 Office Action Issued in Chinese Patent Application No. 201910489964.
Apr. 20, 2023 Office Action issued in Chinese Patent Application No. 201910489964.X.

\* cited by examiner

FIG.1
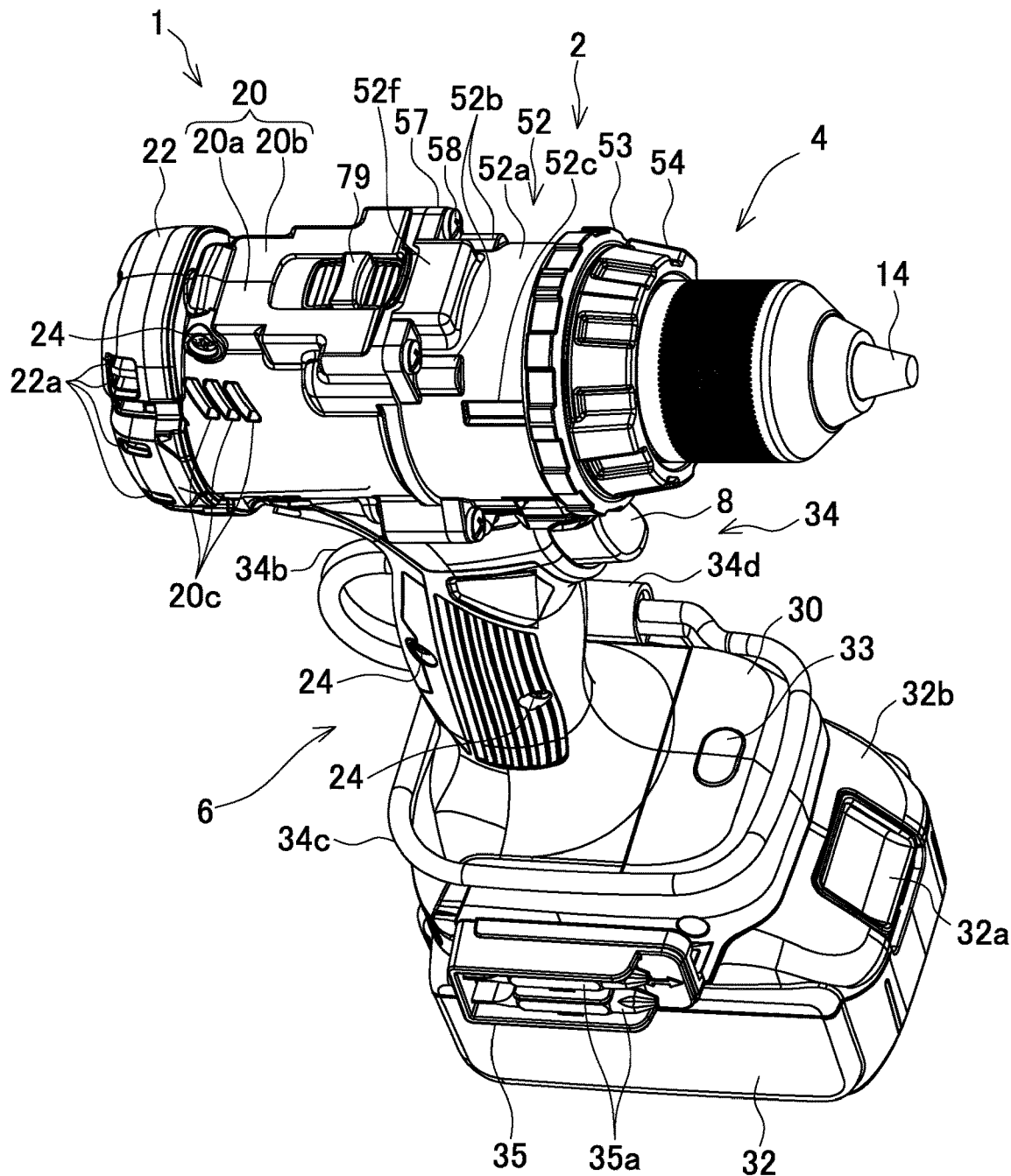
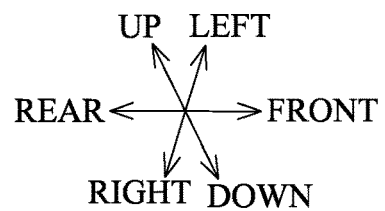

FIG.12
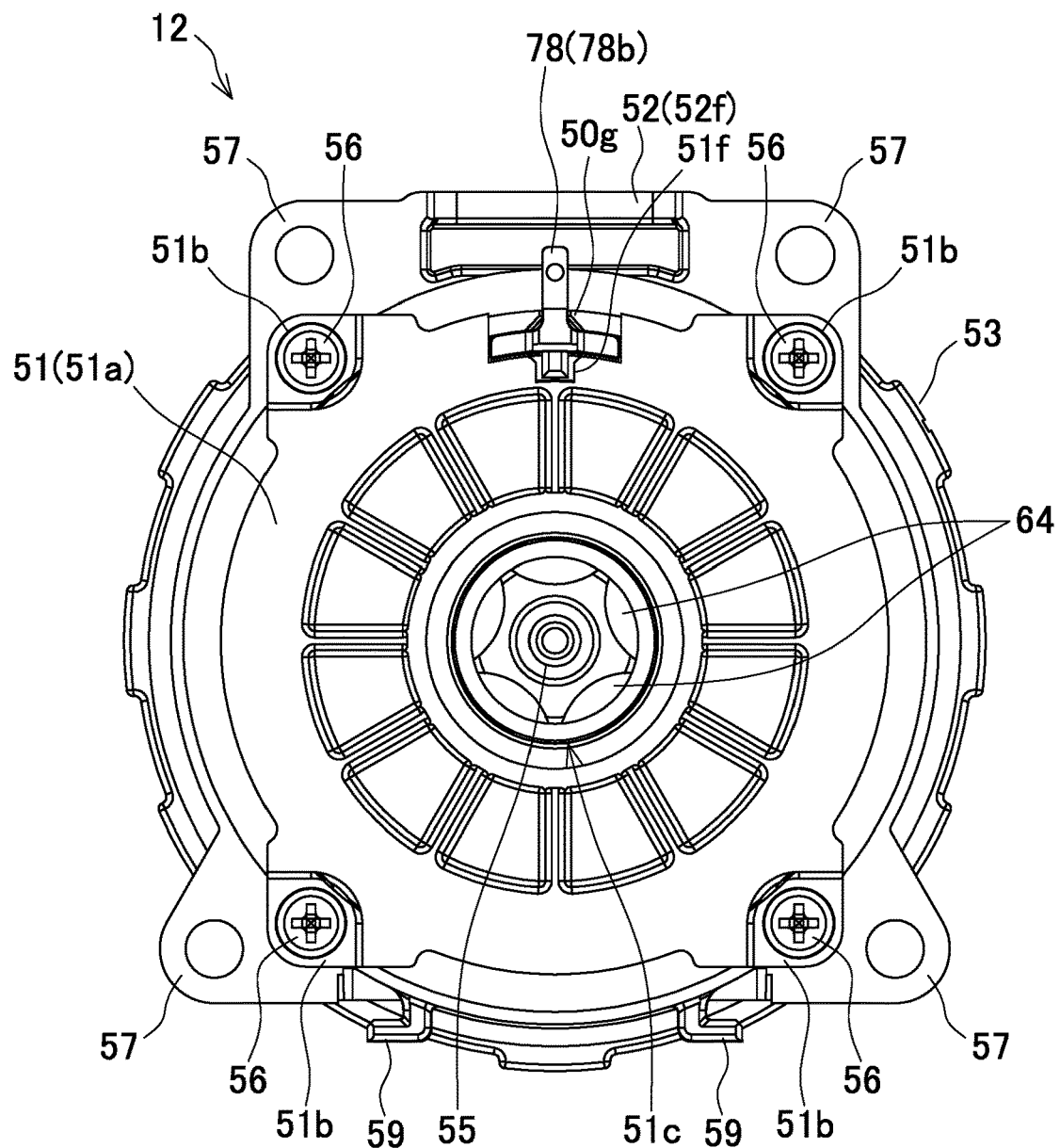
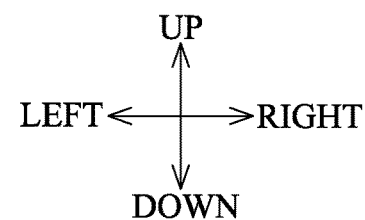

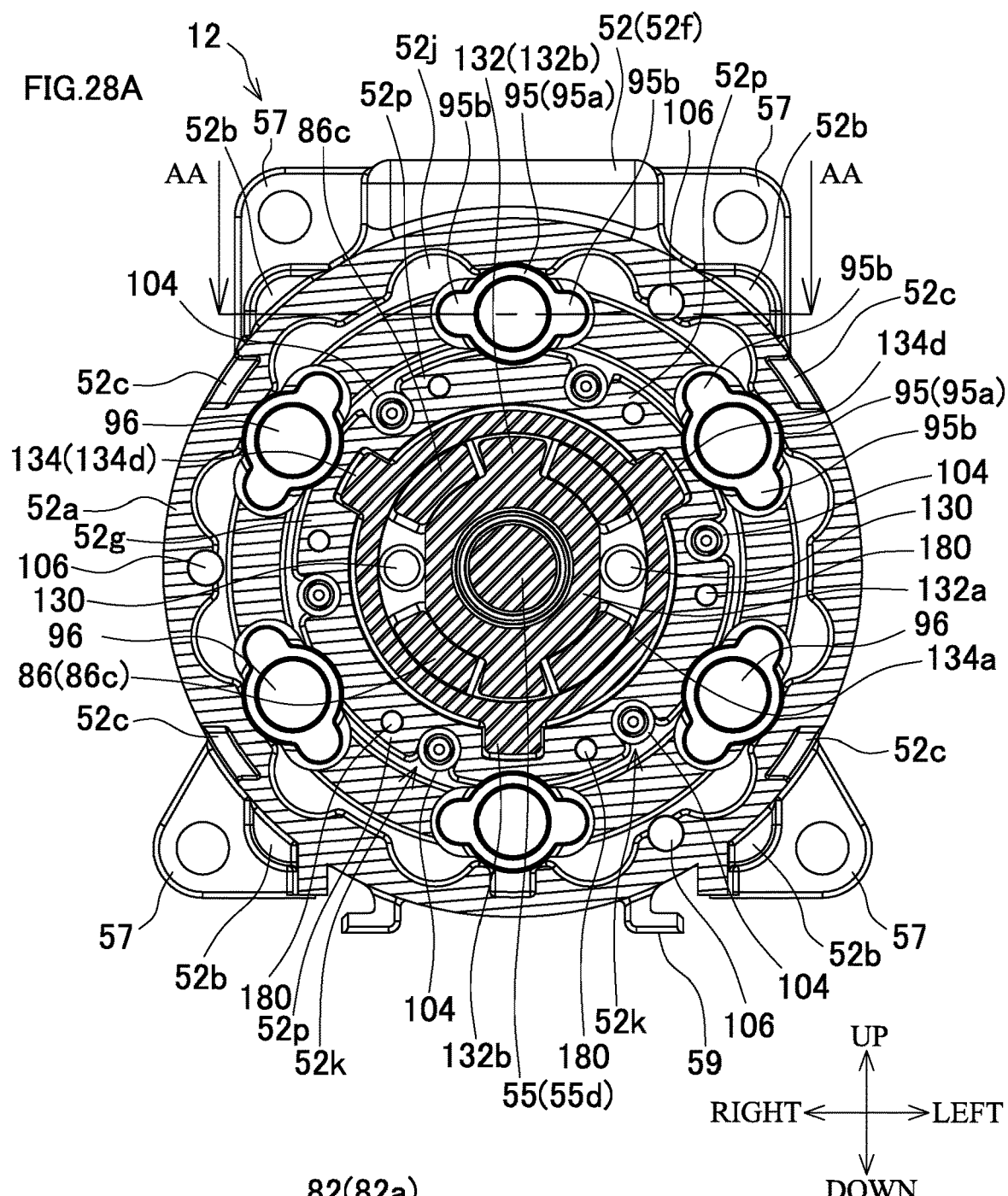
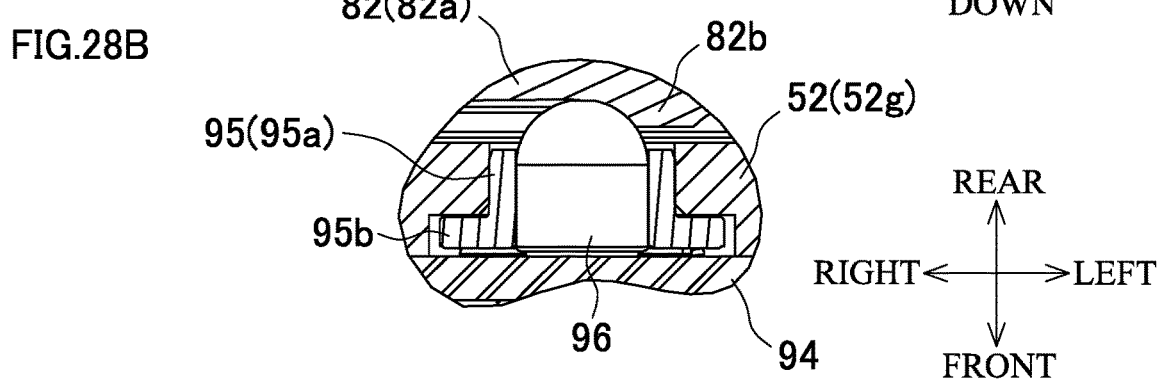
FIG.28A
FIG.28B

FIG.33
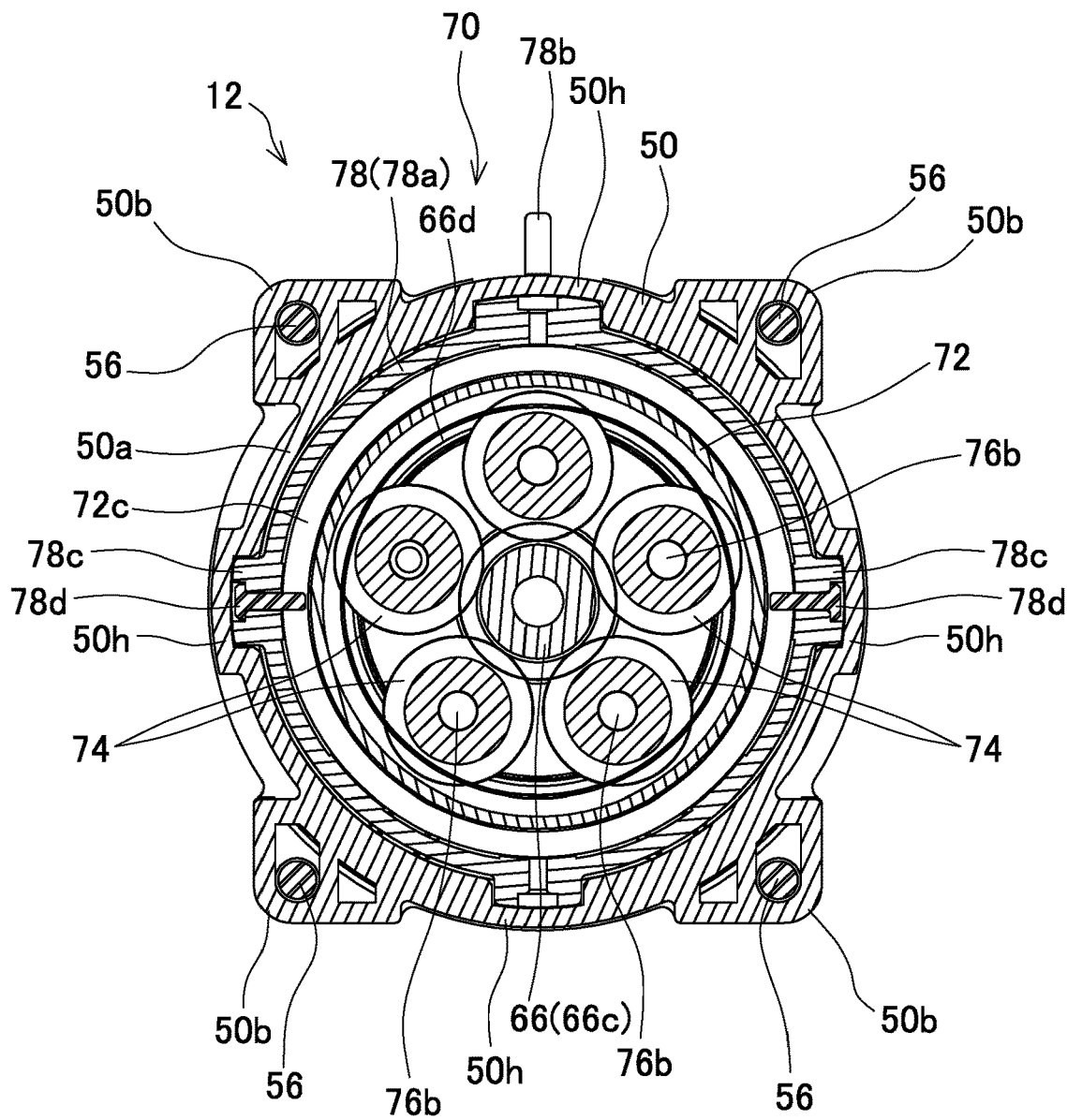
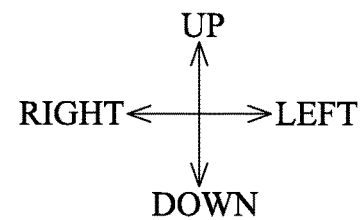

FIG.35
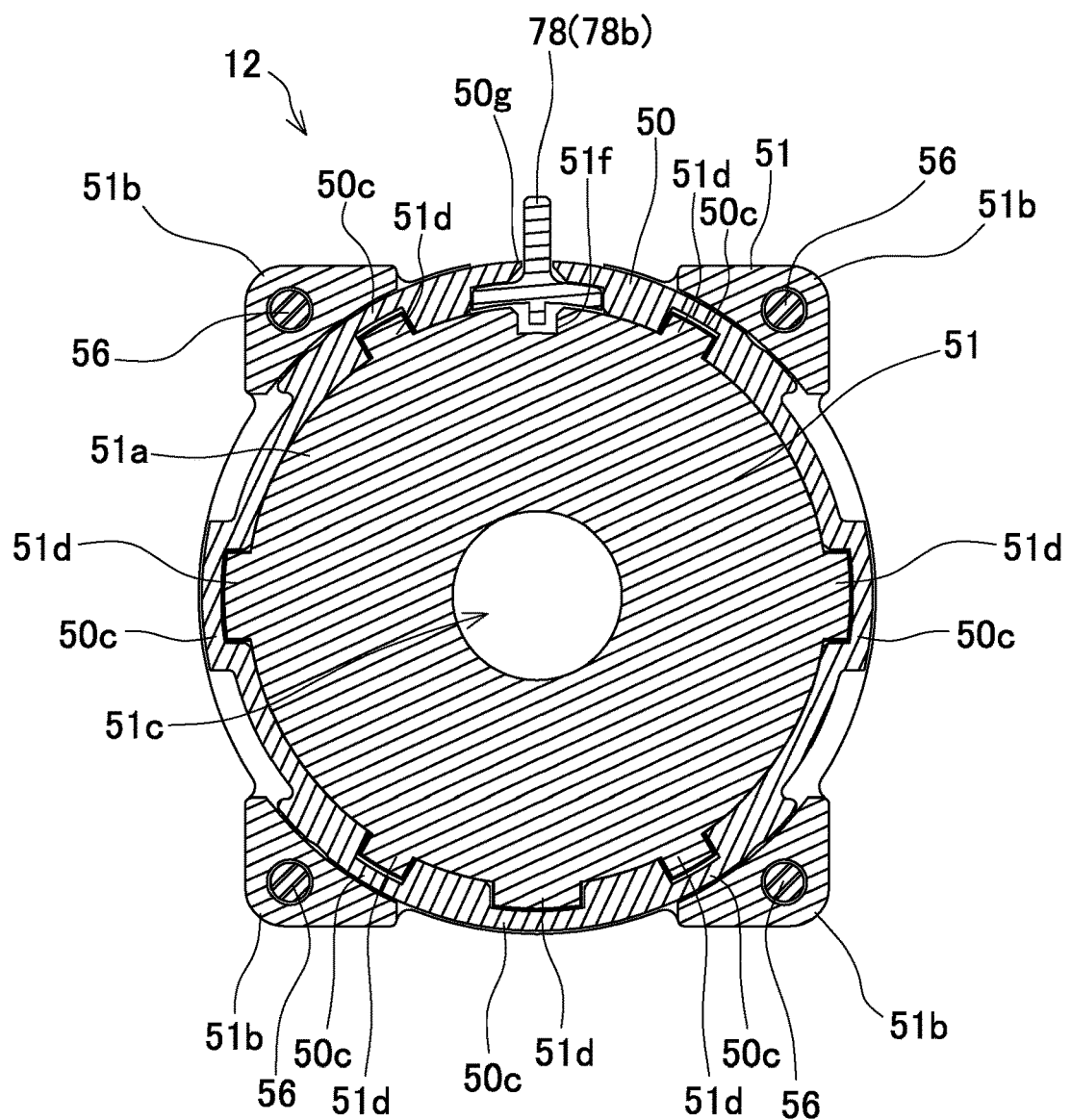
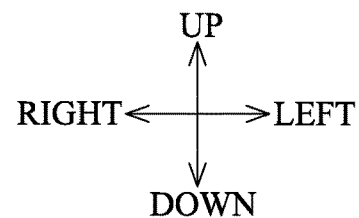

ELECTRIC POWER TOOL AND ELECTRIC VIBRATION DRIVER DRILL

BACKGROUND

This application claims the benefit of Japanese Patent Application Number 2018-108877 filed on Jun. 6, 2018, the entirety of which is incorporated by reference.

TECHNICAL HELD

The disclosure relates to an electric power tool and an electric vibration driver drill.

RELATED ART

As described in Japanese Patent Application Publication No. 2017-100259, there has been known a vibration driver drill including a mode change ring and a change ring. The mode change ring is configured to switch a drill mode, a clutch mode, and a vibration mode through a change operation of its rotation position. The change ring, which is located adjacent to a front side of the mode change ring, adjusts a clutch operation torque in the clutch mode through a change operation of its rotation position.

The above-described vibration driver drill possibly increases a friction force between the mode change ring and the change ring, making it difficult to rotate these rings.

A main object of the disclosure is to provide an electric power tool and an electric vibration driver drill in which operation rings easily rotate.

SUMMARY

In order to achieve the above-described object, there is provided an electric power tool according to a first aspect of the disclosure. The electric power tool includes a housing, a first ring and a second ring, and a sliding member. The first ring and the second ring are each externally mounted to the housing to be rotatable. The sliding member is located between the first ring and the second ring.

In the disclosure according to a second aspect of the above-described disclosure, the sliding member may include one or more balls.

In the disclosure according to a third aspect of the above-described disclosure, at least one of a plate and a washer may be interposed between the ball and at least one of the first ring and the second ring.

In the disclosure according to a fourth aspect of the above-described disclosure, the ball may be made of steel.

In order to achieve the above-described object, there is provided an electric vibration driver drill according to a fifth aspect of the disclosure. The electric vibration driver drill may include a housing, a vibration mechanism and a clutch mechanism, a vibration switching ring, a clutch switching ring, and a sliding member. The vibration mechanism and the clutch mechanism may be each located inside the housing. The vibration switching ring may be configured to operate the vibration mechanism. The vibration switching ring is rotatably held to the housing. The clutch switching ring may be configured to operate the clutch mechanism. The clutch switching ring may be rotatably held to the housing. The sliding member may be located between the vibration switching ring and the clutch switching ring.

In the disclosure according to a sixth aspect of the above-described disclosure, the sliding member may include one or more balls.

In the disclosure according to a seventh aspect of the above-described disclosure, at least one of a plate and a washer may be interposed between the ball and at least one of the vibration switching ring and the clutch switching ring.

In the disclosure according to an eighth aspect of the above-described disclosure, the ball may be made of steel.

In the disclosure according to a ninth aspect of the above-described disclosure, the vibration switching ring may be configured to operate presence or absence of a vibration of an output shaft by the vibration mechanism. The clutch switching ring may be configured to control a torque for perforating operation of a clutch in the clutch mechanism.

The embodiment provides the electric power tool and the electric vibration driver drill in which the operation rings easily rotate.

BRIEF DESCRIPTION OF THE DRAWINGS

FIG. 1 is a perspective view of a driver drill according to the disclosure.

Figure 2:
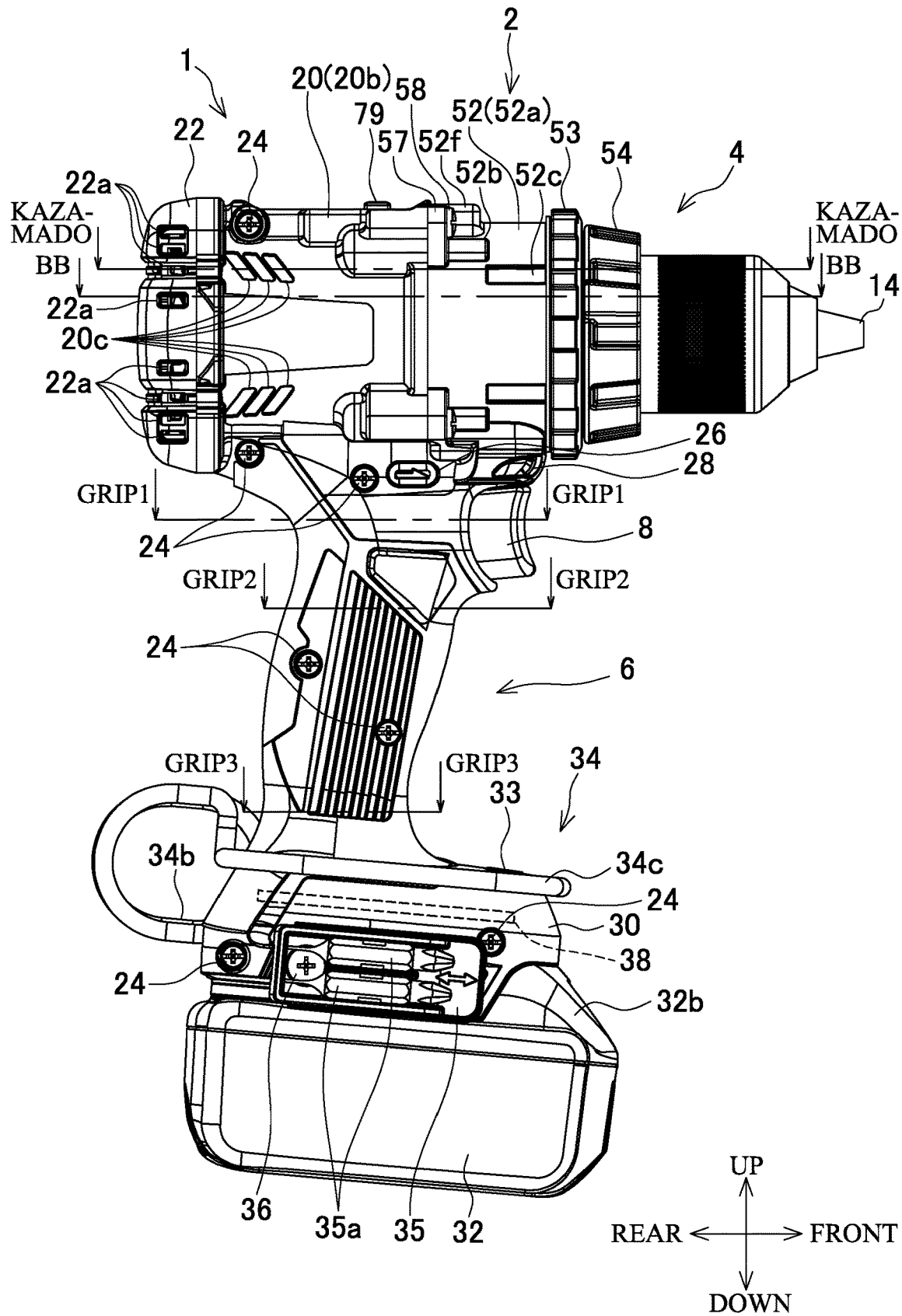
FIG. 2 is a right view of FIG. 1.

FIG. H is a cross-sectional view taken along GRIP2-GRIP2 of FIG. 2.

Figure 9:
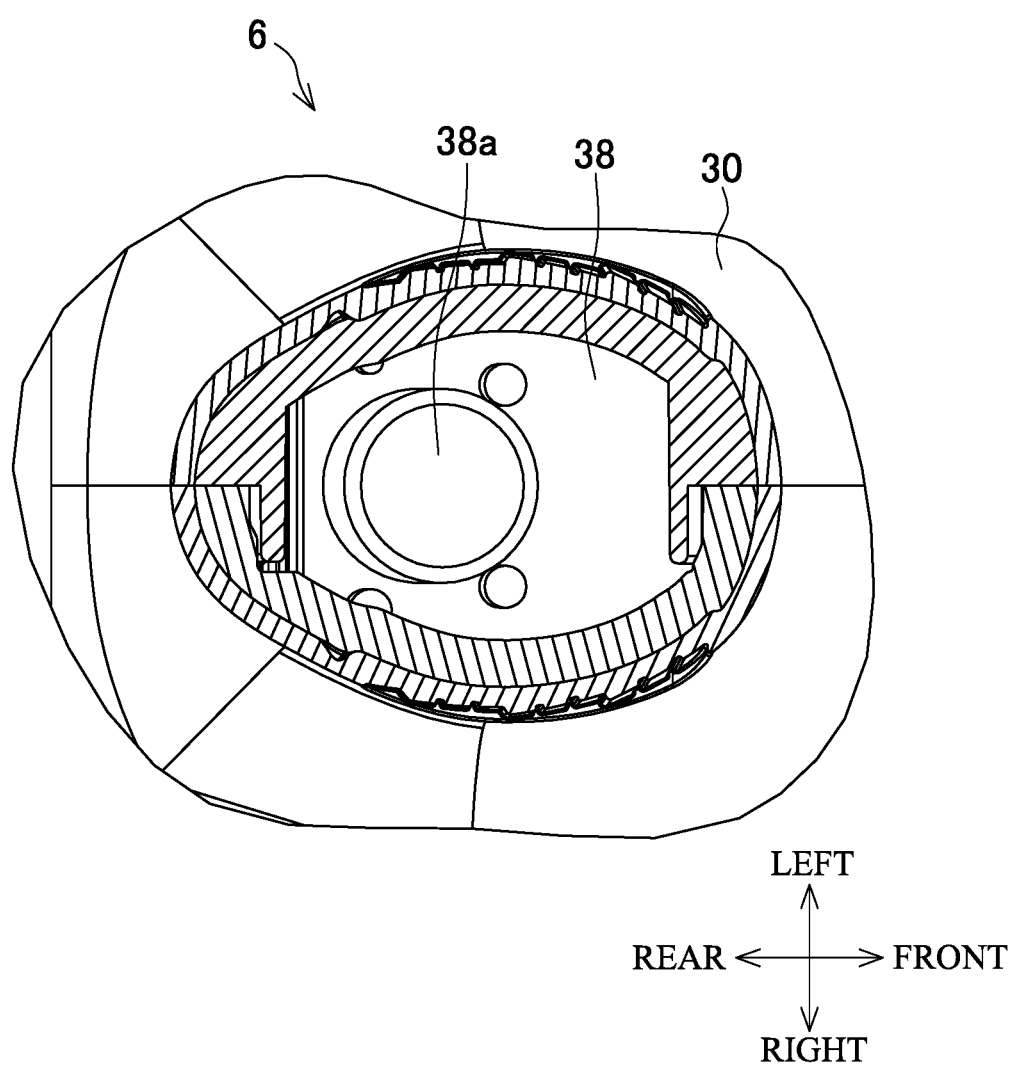

FIG. 9 is a cross-sectional view taken along GRIP3-GRIP3 of FIG. 2.

Figure 10:
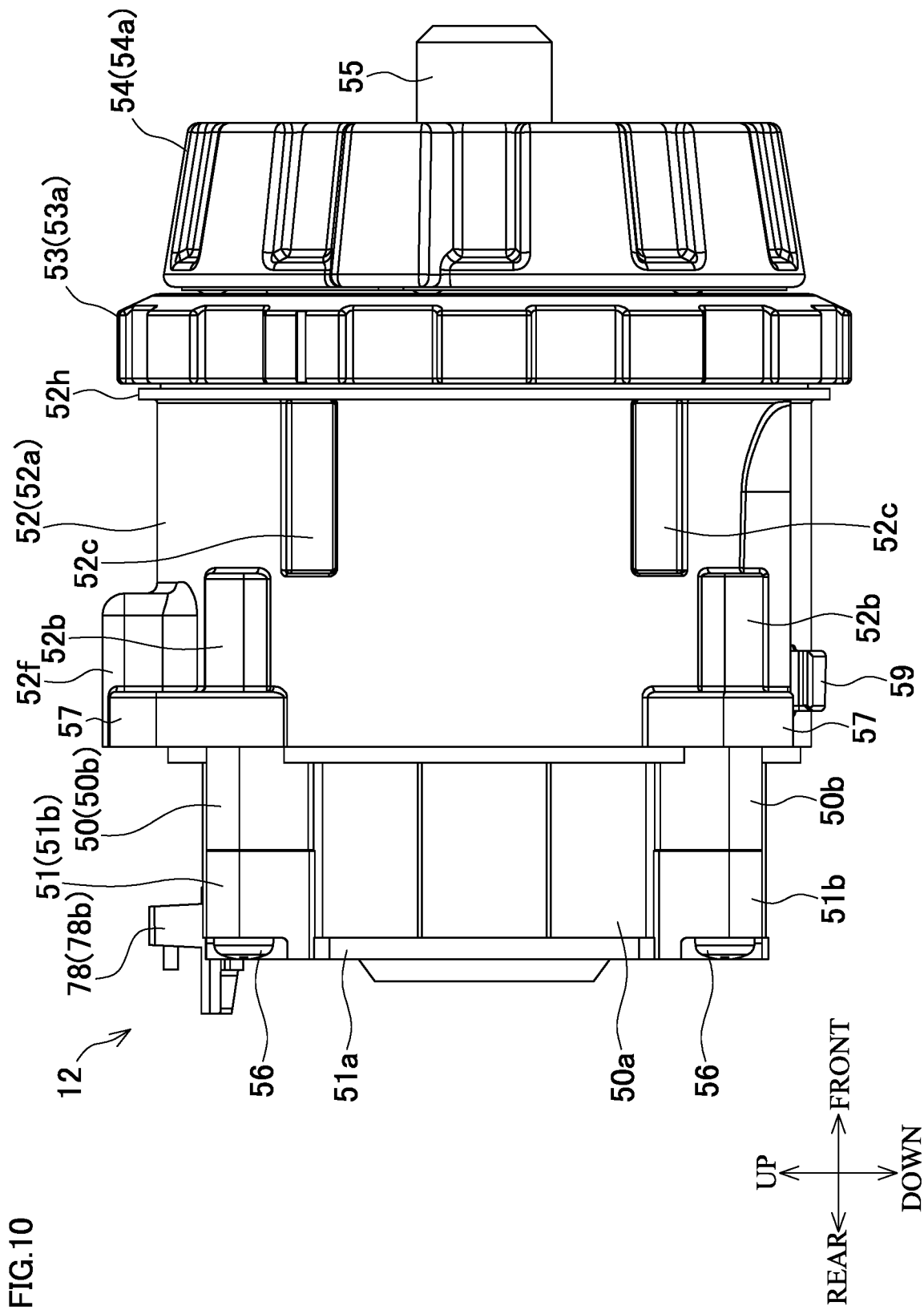

FIG. 10 is a right view of a gear assembly in an electric vibration driver drill of FIG. 1.

Figure 11:
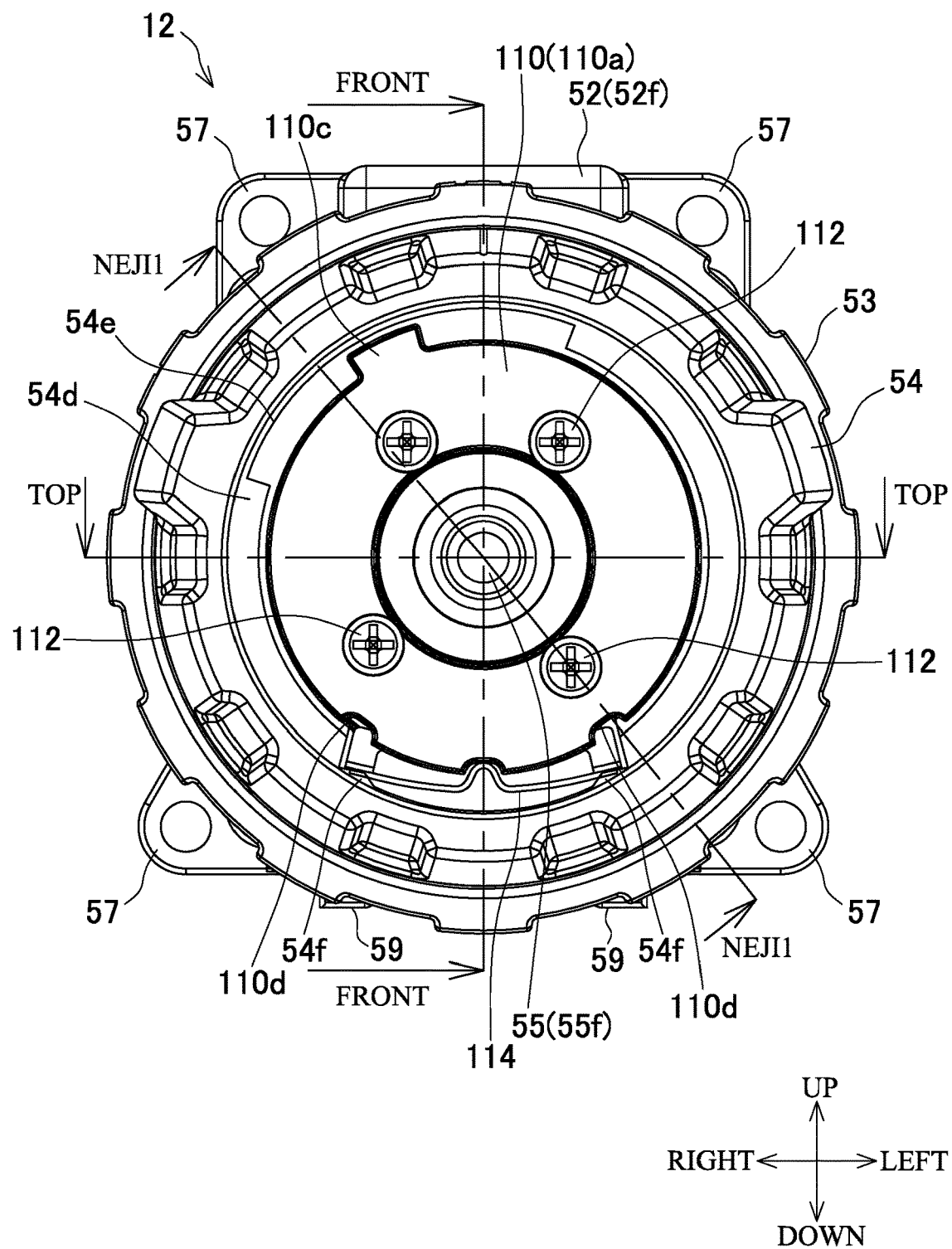

FIG. 11 is a front view of FIG. 10.

FIG. 12 is a rear view of FIG. 10.

Figure 13:
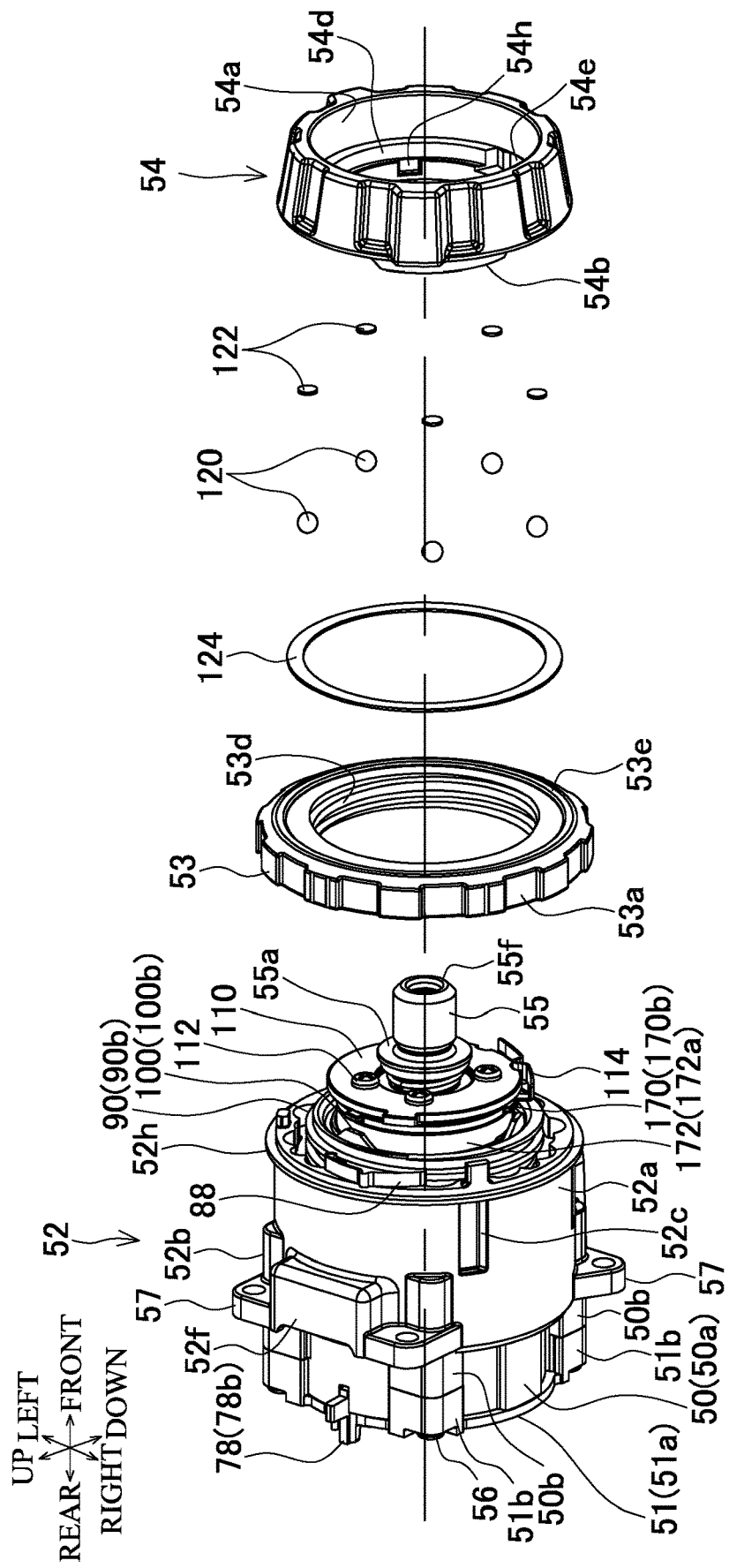

FIG. 13 is a perspective view of FIG. 10 where only a front portion is exploded.

Figure 14:
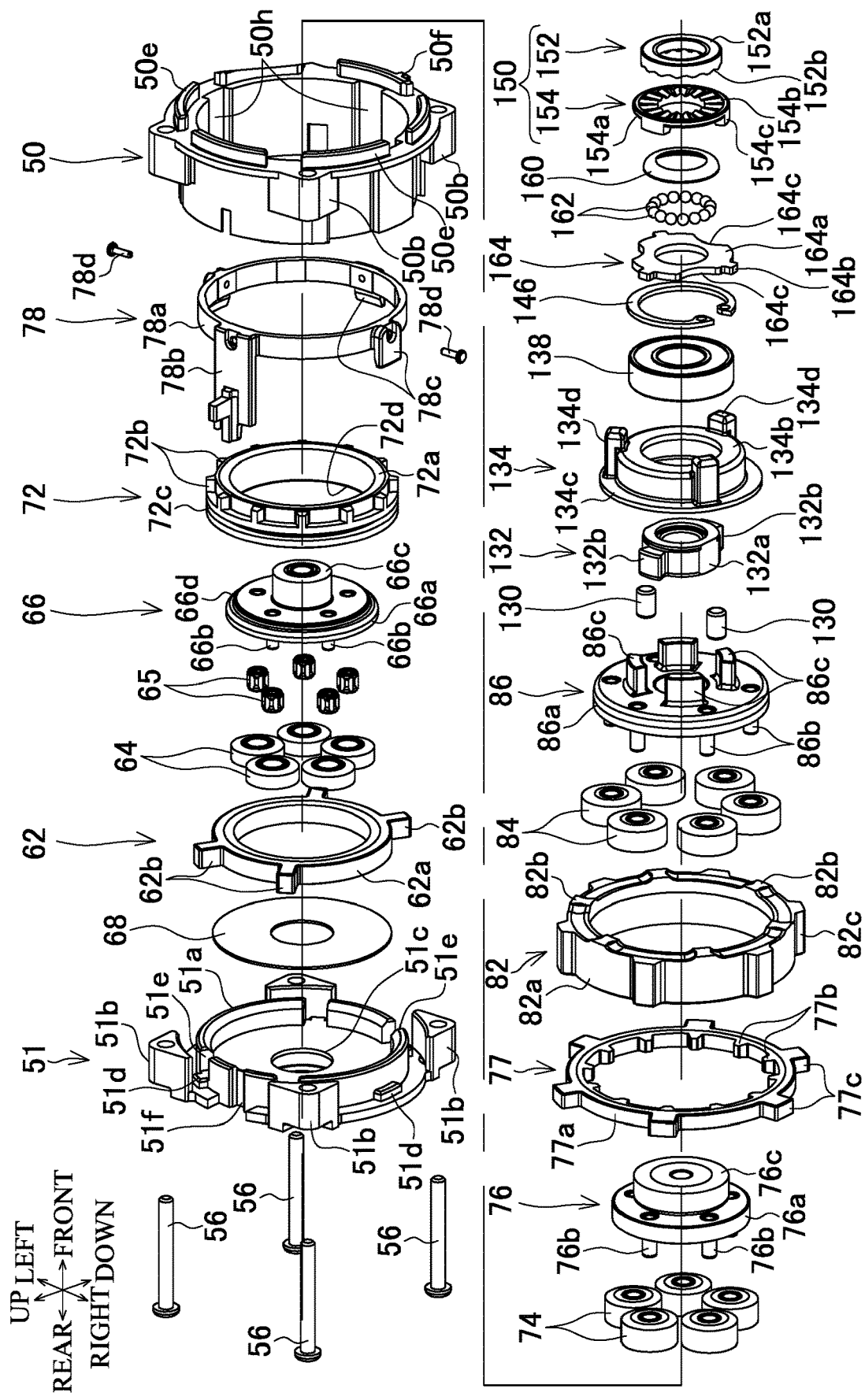

FIG. 14 is an exploded perspective view of a part of FIG. 10.

Figure 15:
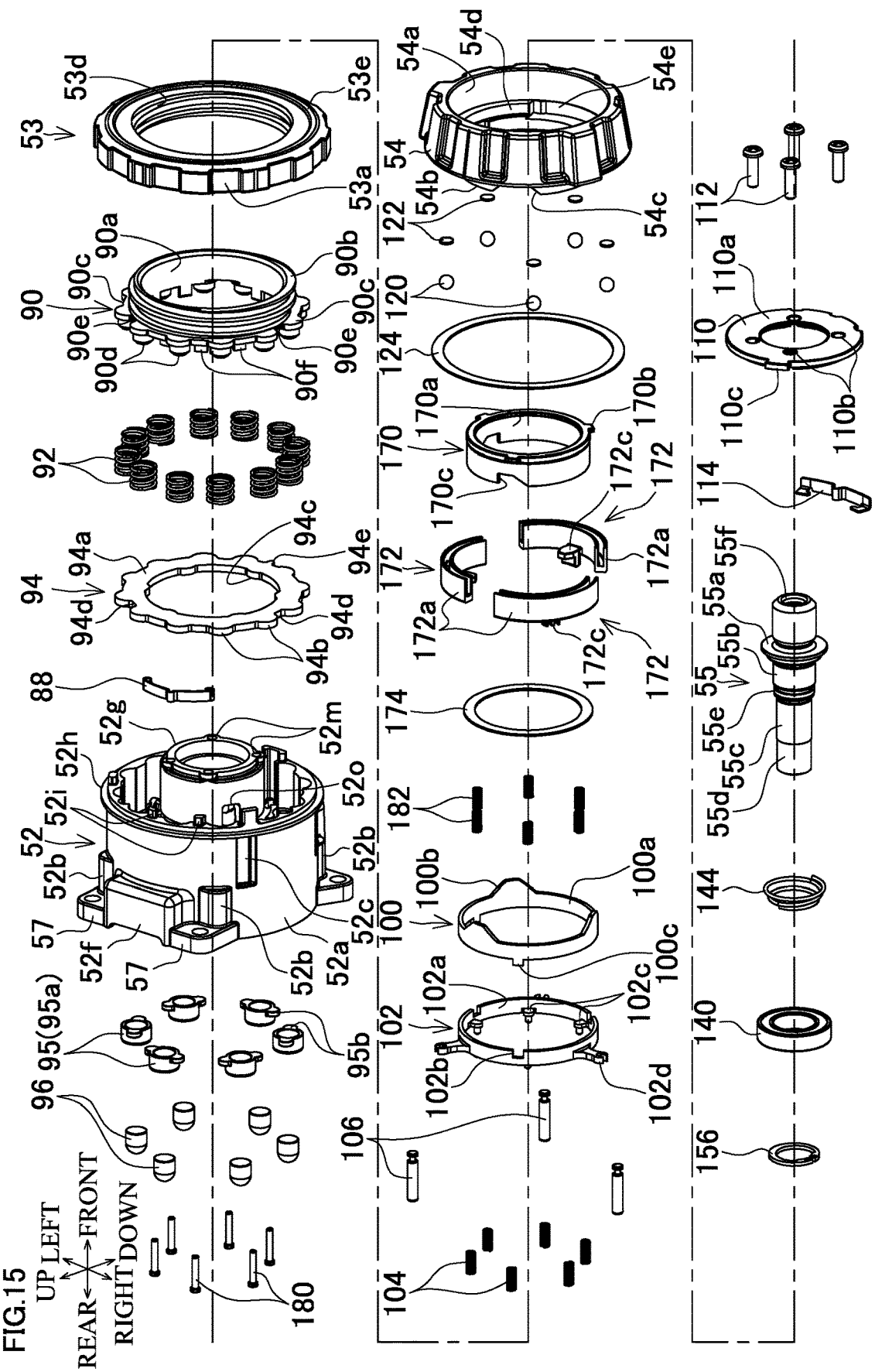

FIG. 15 is an exploded perspective view of another pan of FIG. 10.

Figure 16:
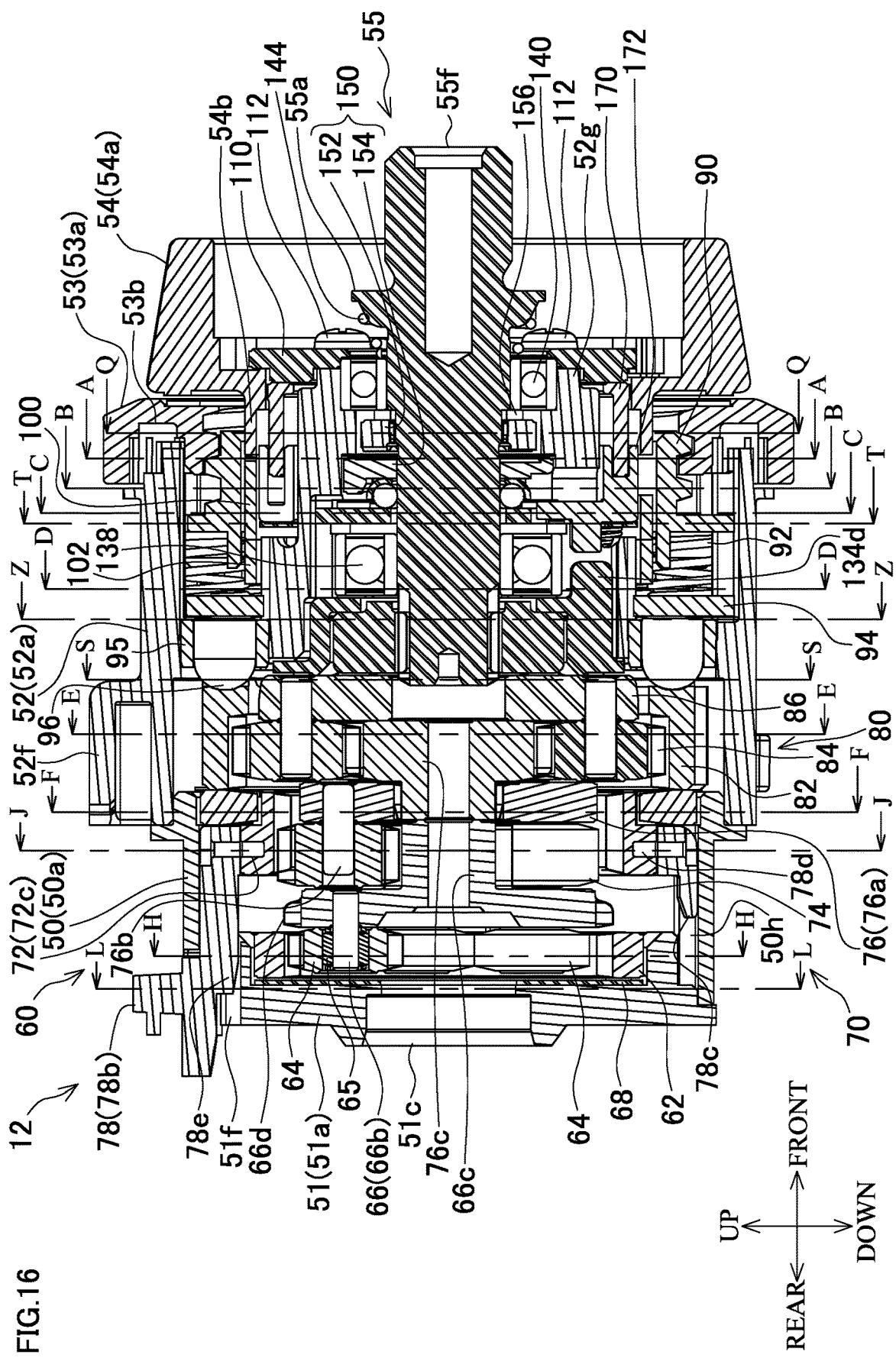

FIG. 16 is a cross-sectional view taken along FRONT-FRONT of FIG. 11.

Figure 17:
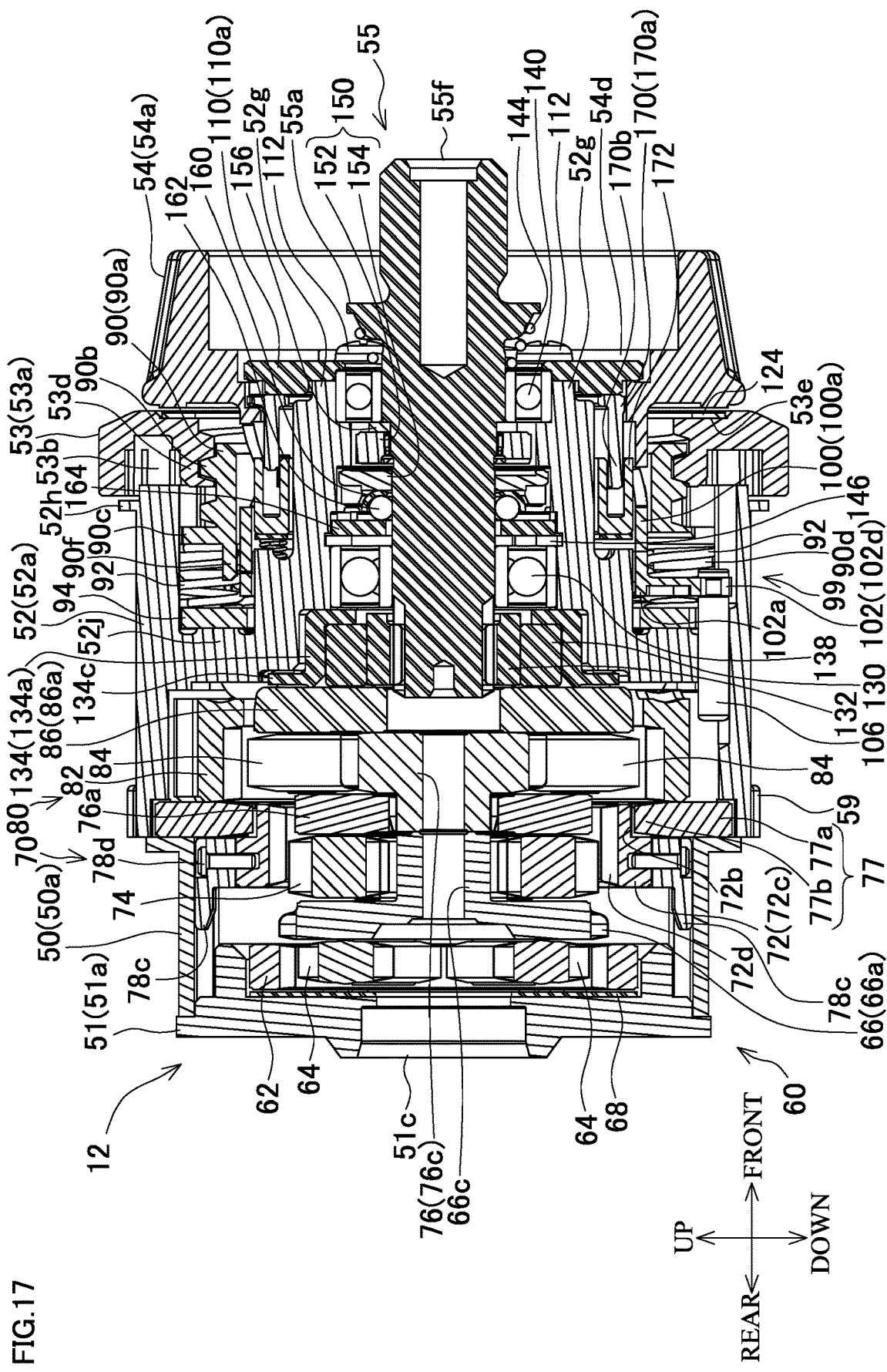

FIG. 17 is a cross-sectional view taken along TOP-TOP of FIG. 11.

Figure 18:
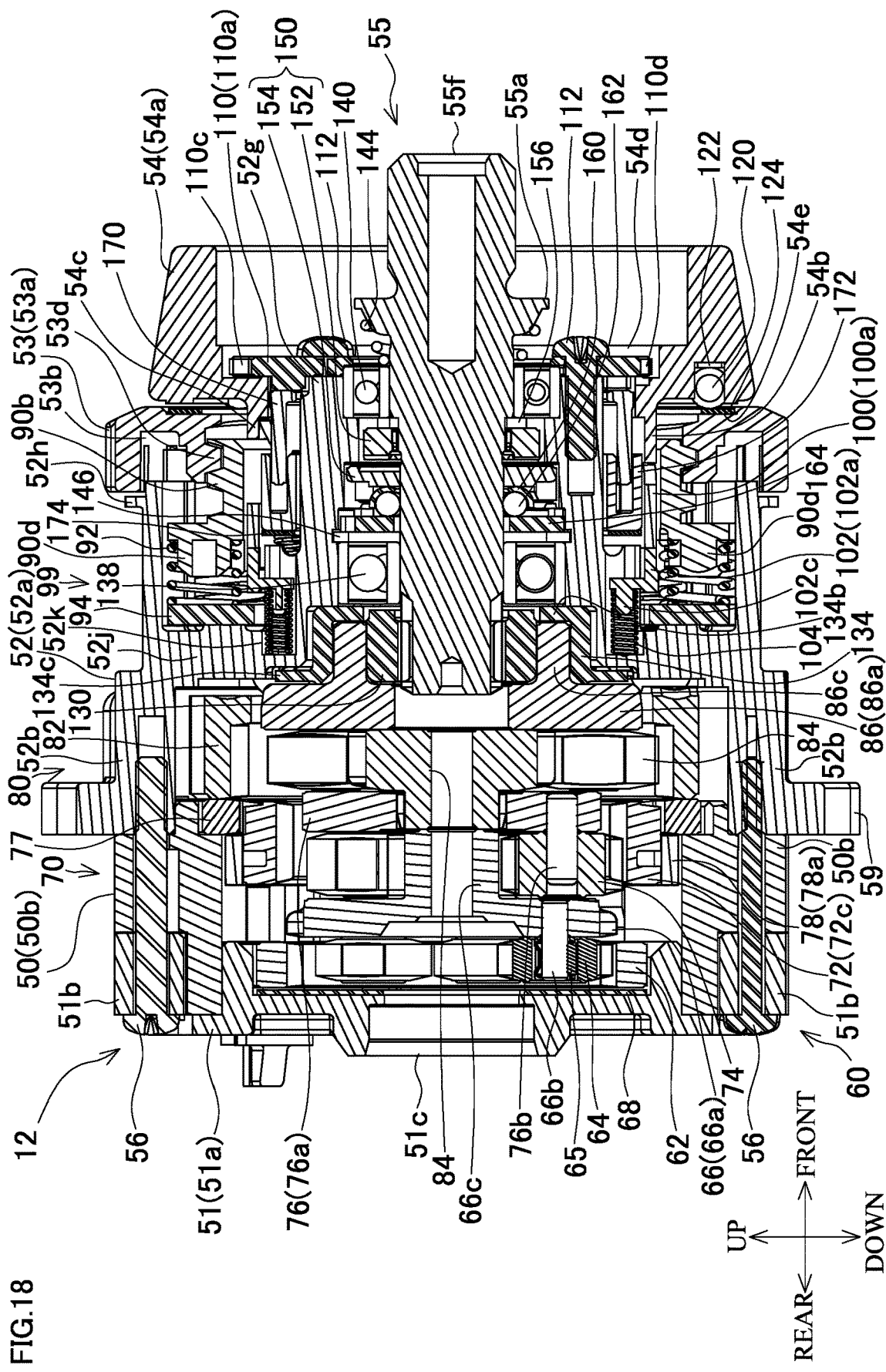

FIG. 18 is a cross-sectional view taken along NEJI1-NEIJ1 of FIG. 11.

Figure 19:
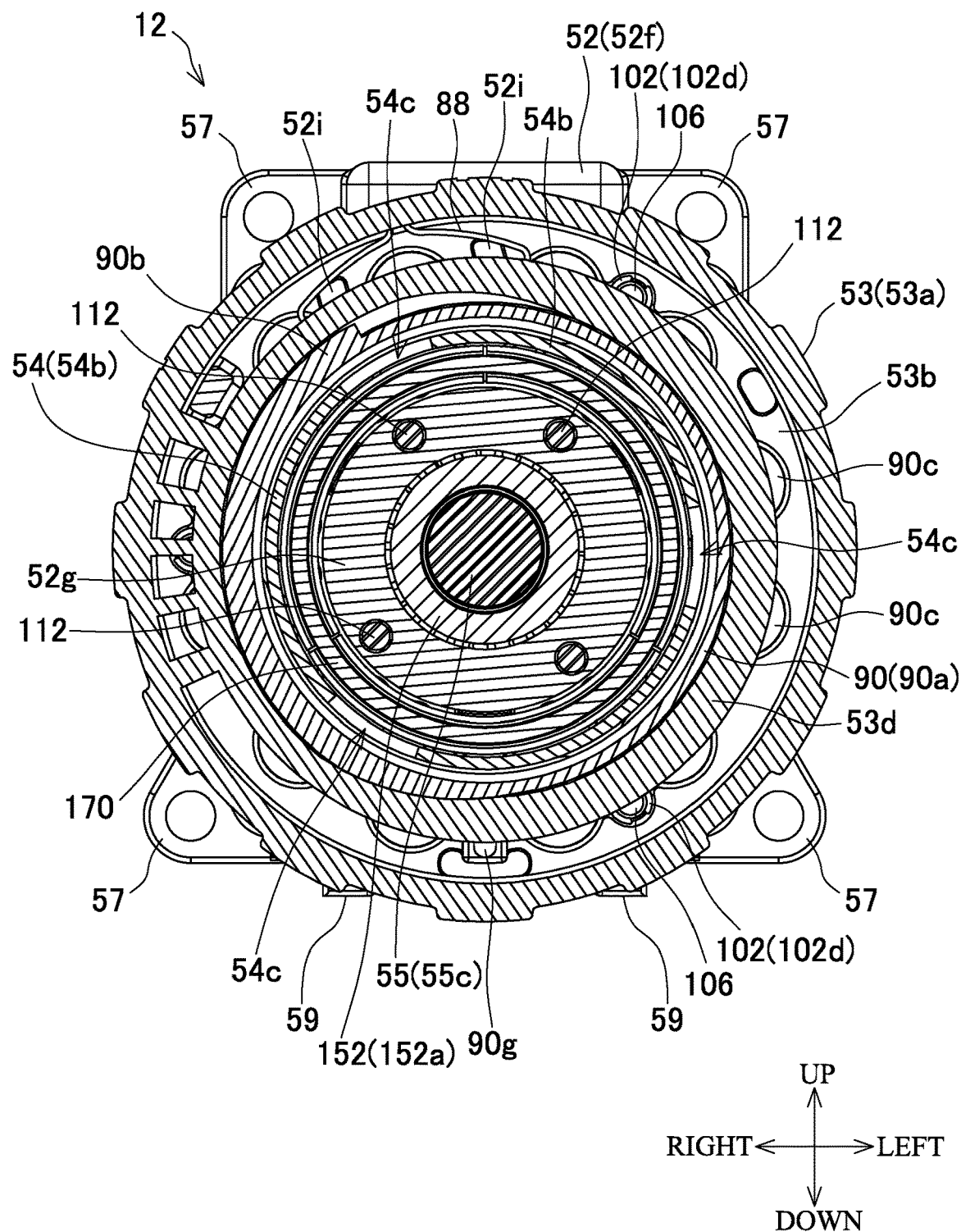

FIG. 19 is a cross-sectional view taken along Q-Q of FIG. 16.

Figure 20:
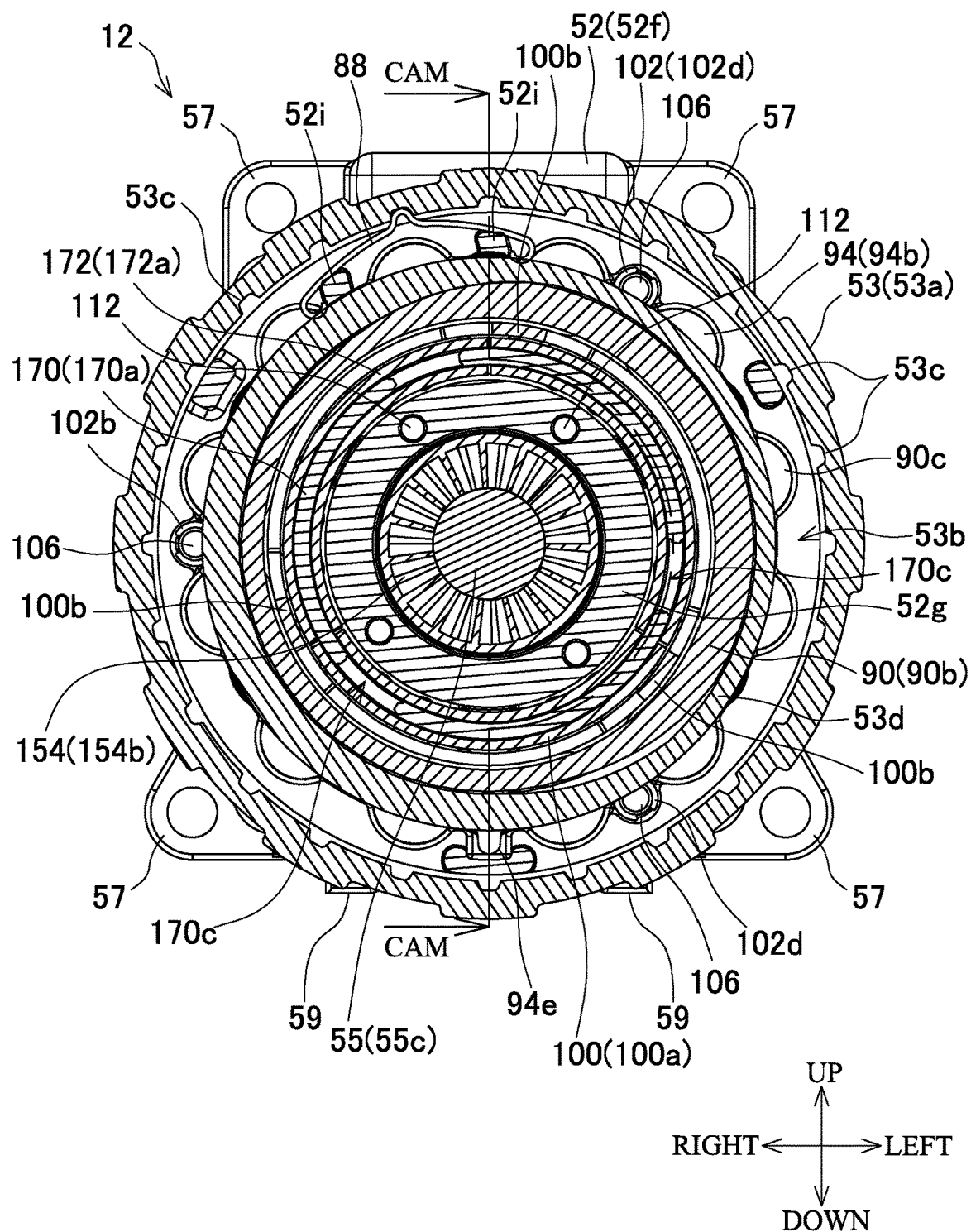

FIG. 20 is a cross-sectional view taken along A-A of FIG. 16.

Figure 21:
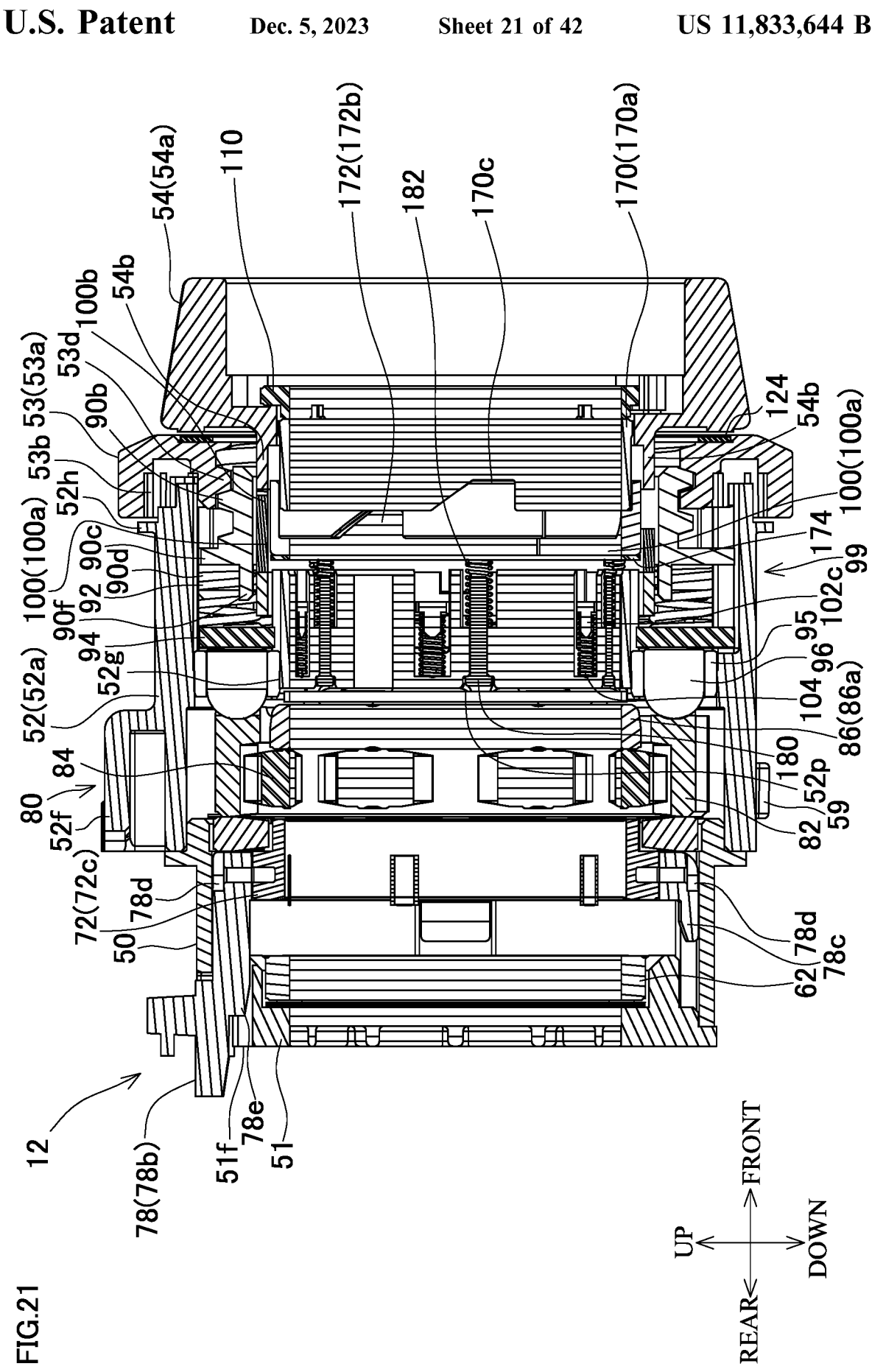

FIG. 21 is a cross-sectional view taken along CAM-CAM of FIG. 20.

Figure 22:
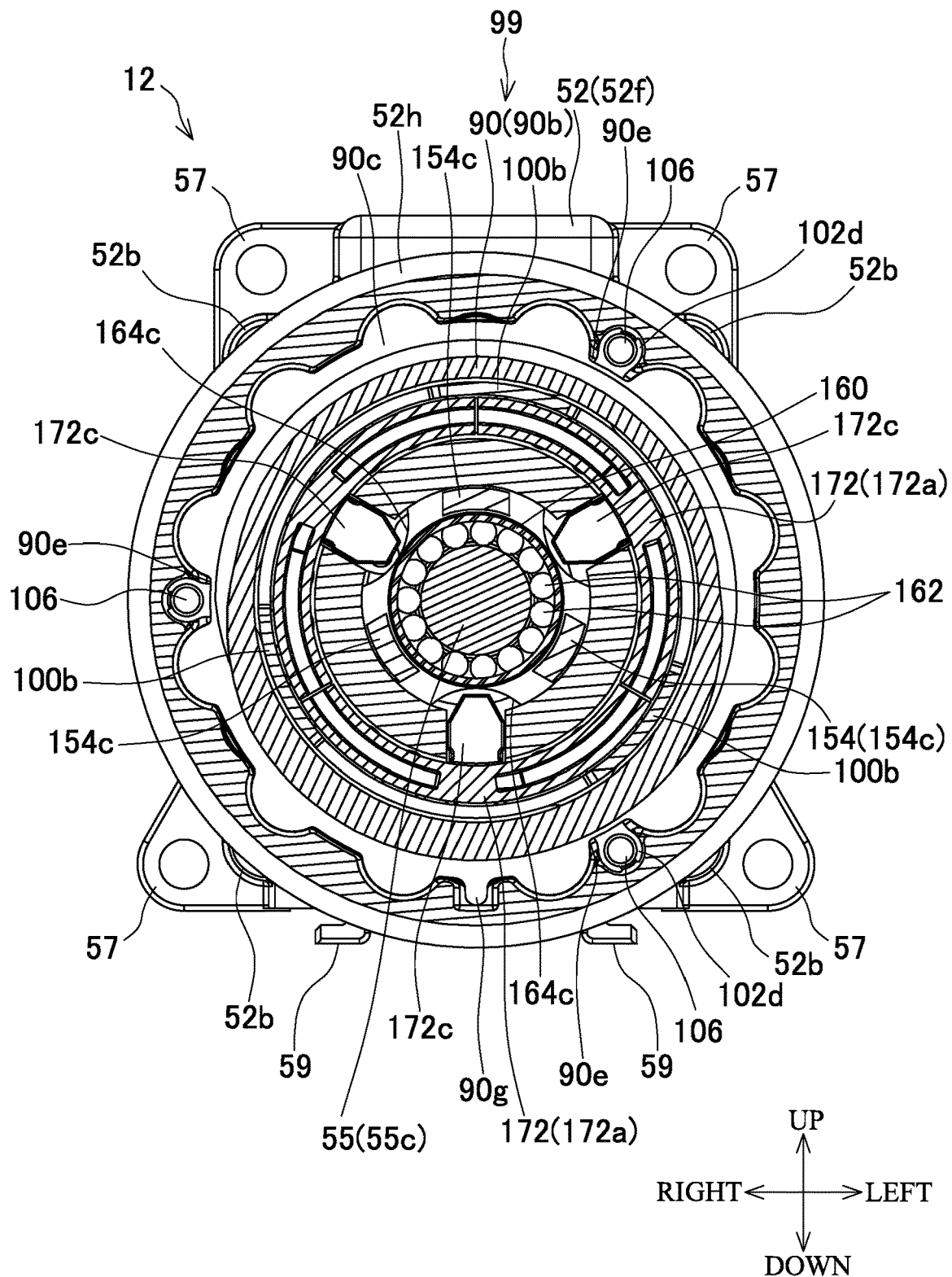

FIG. 22 is a cross-sectional view taken along B-B of FIG. 16.

Figure 23:
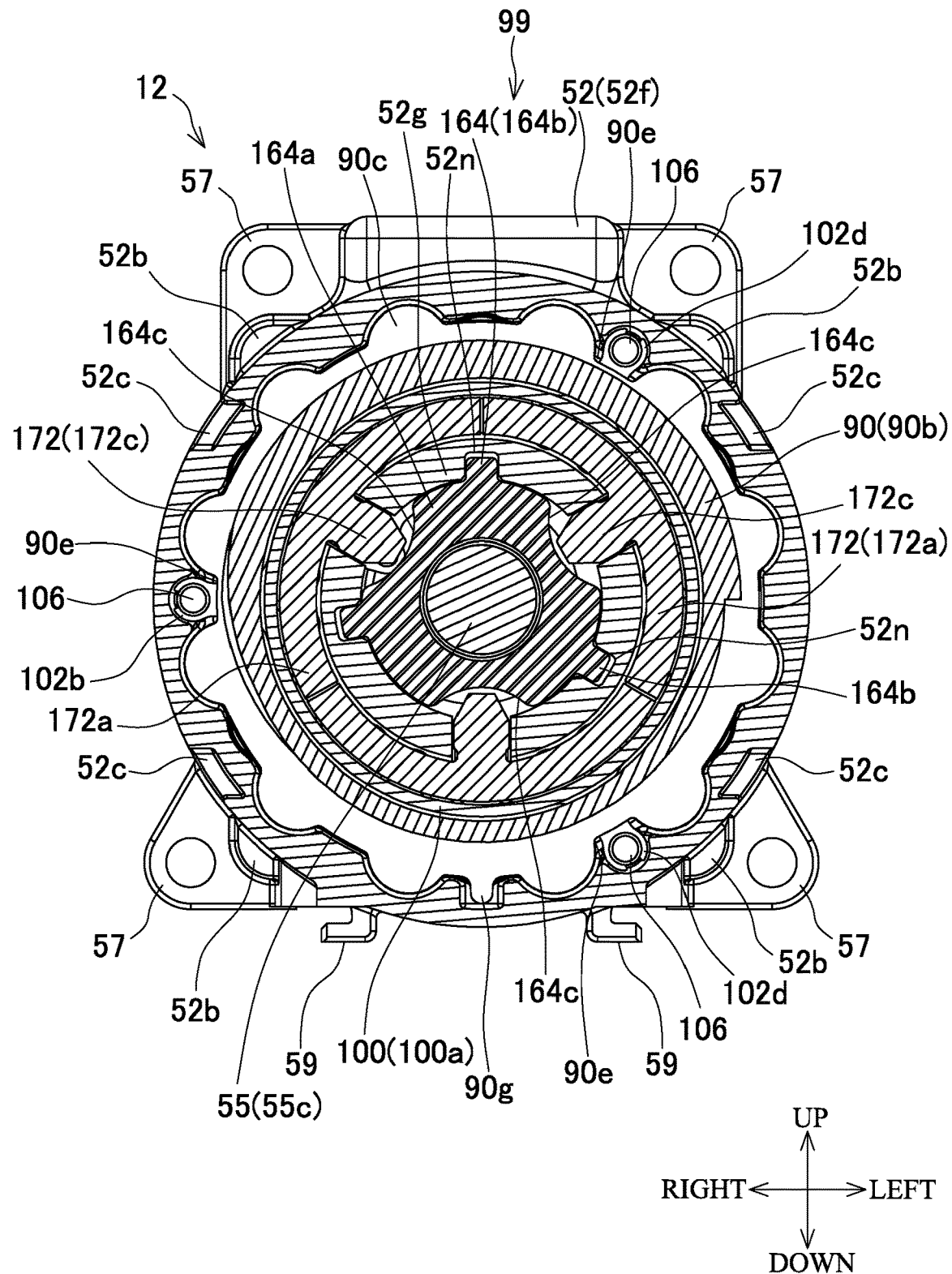

FIG. 23 is a cross-sectional view taken along C-C of FIG. 16.

Figure 24:
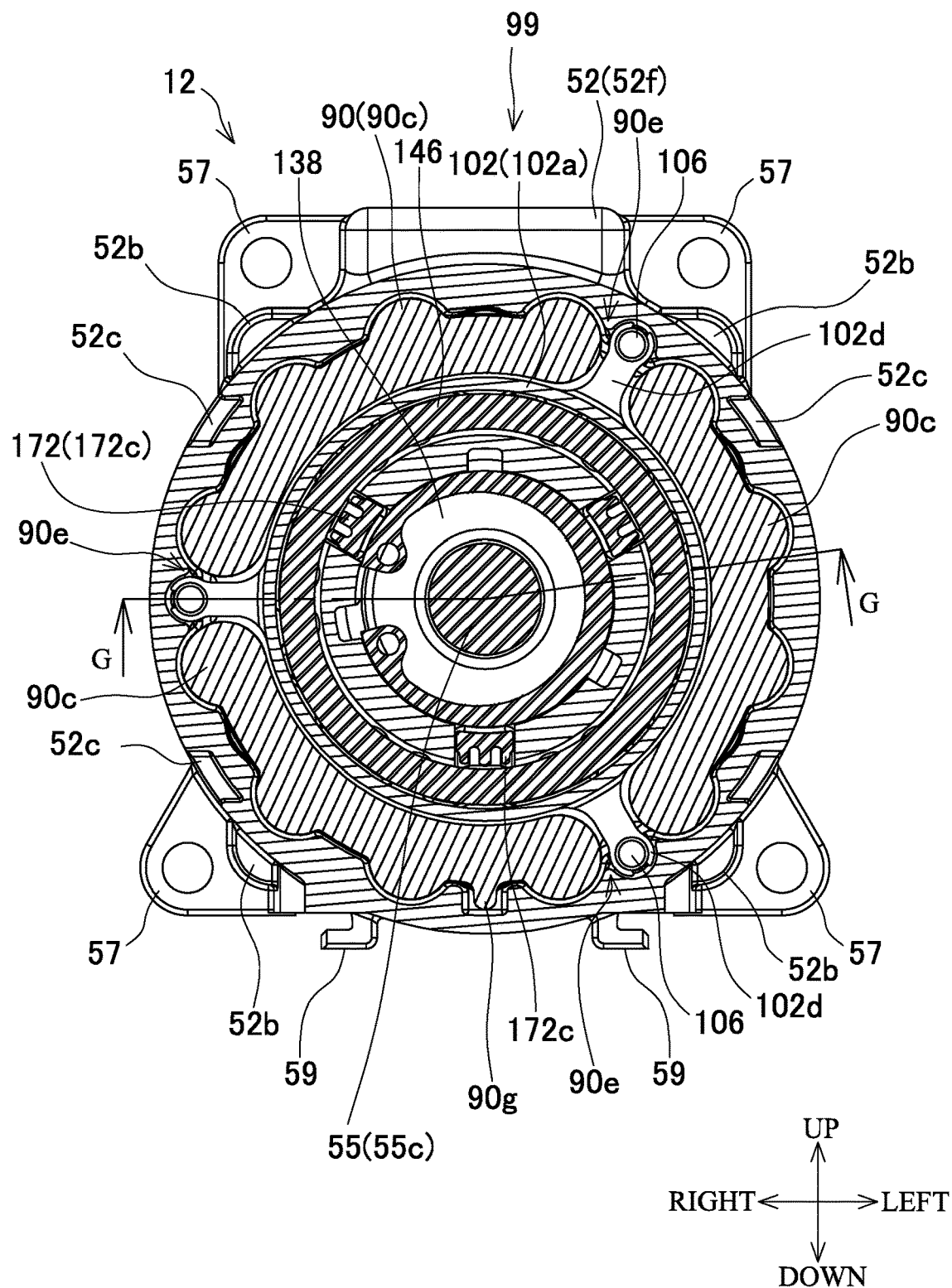

FIG. 24 is a cross-sectional view taken along T-T of FIG. 16.

Figure 25:
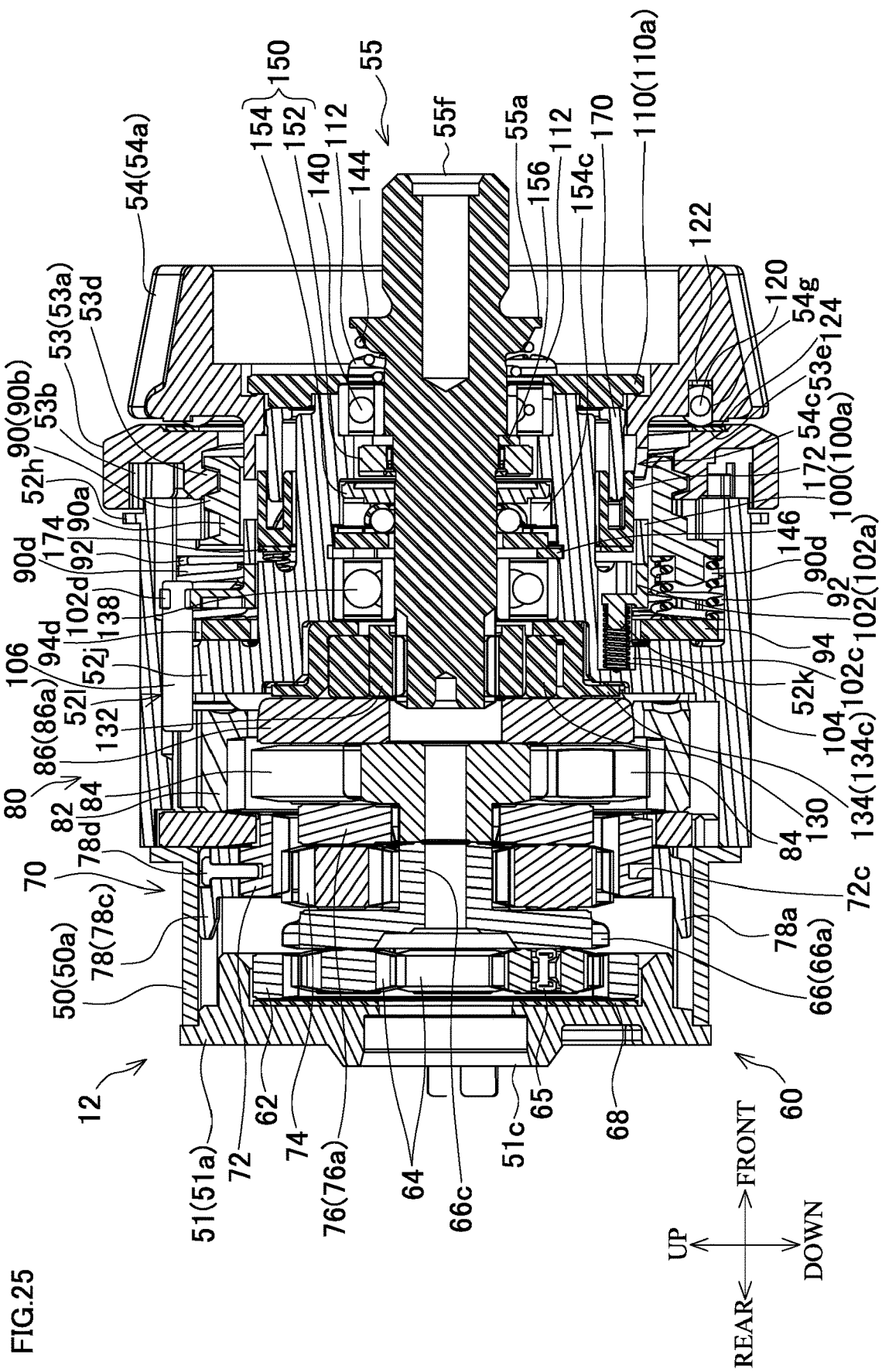

FIG. 25 is a cross-sectional view taken along G-G of FIG. 24.

Figure 26:
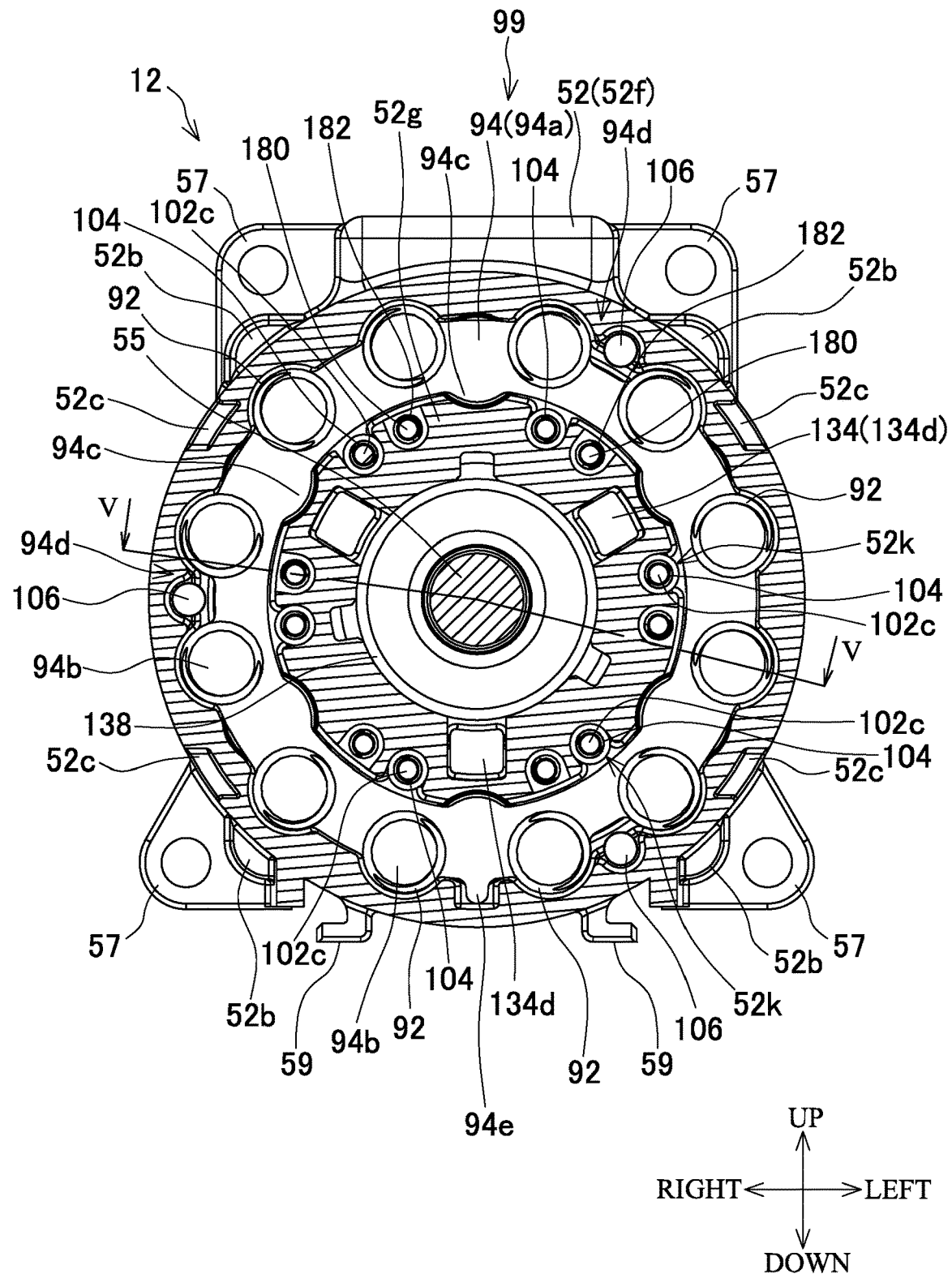

FIG. 26 is a cross-sectional view taken along D-D of FIG. 16.

Figure 27:
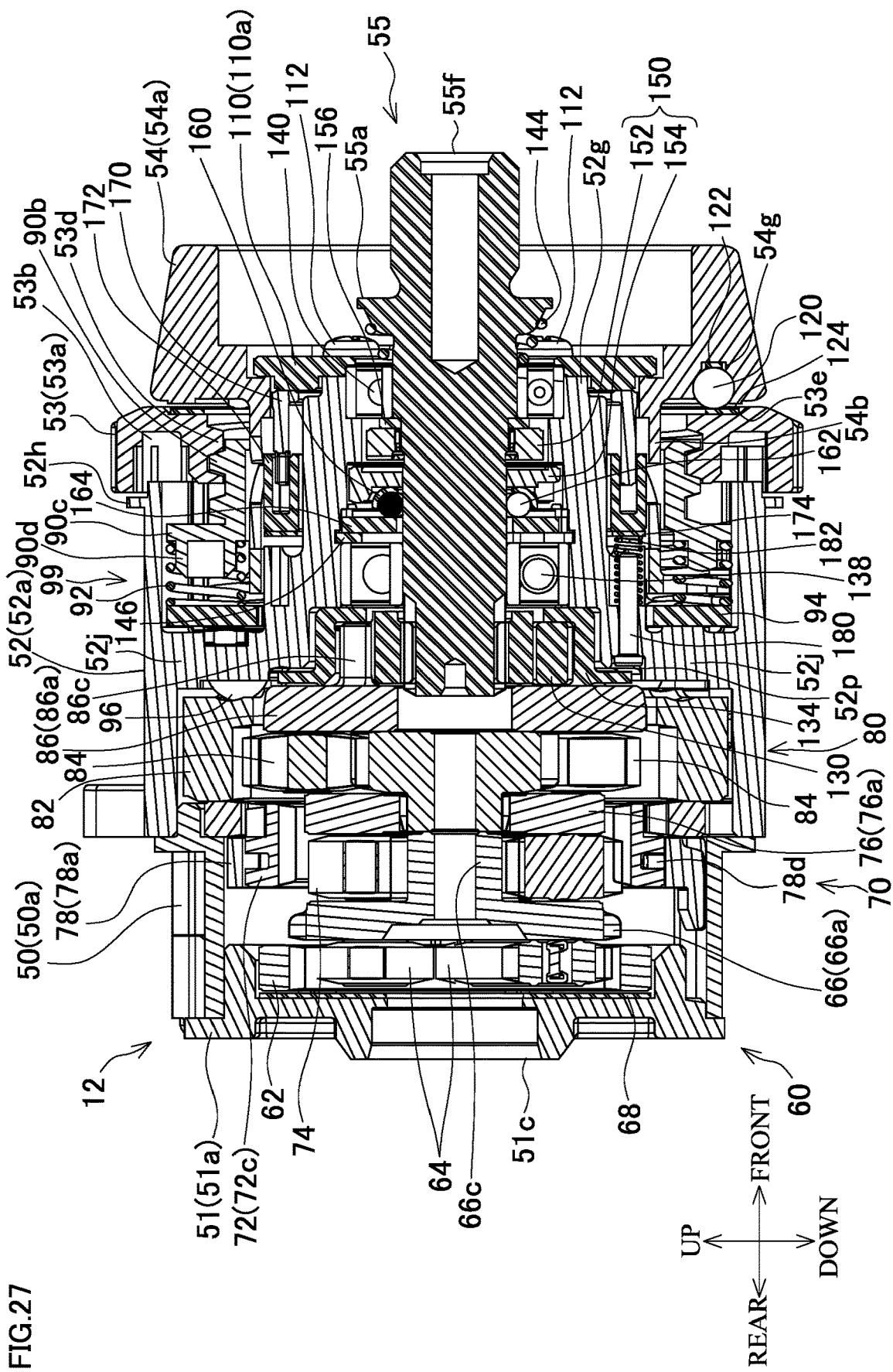

FIG. 27 is a cross-sectional view taken along V-V of FIG. 26.

FIG. 28A is a cross-sectional view taken along Z-Z of FIG. 16.

FIG. 28B is a cross-sectional view taken along AA-AA of FIG. 28A.

Figure 29:
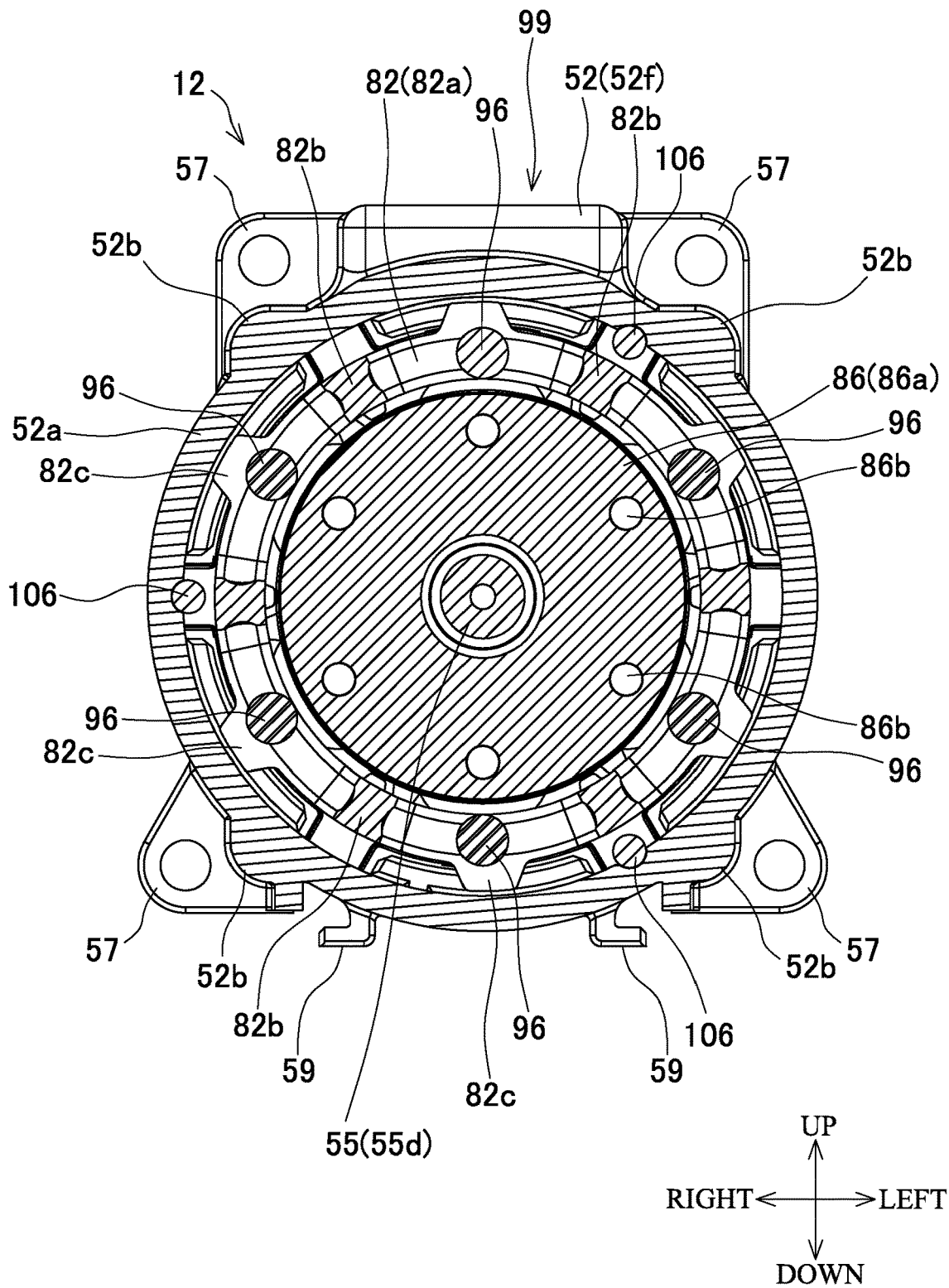

FIG. 29 is a cross-sectional view (during rotation) taken along S-S of FIG. 16.

Figure 30:
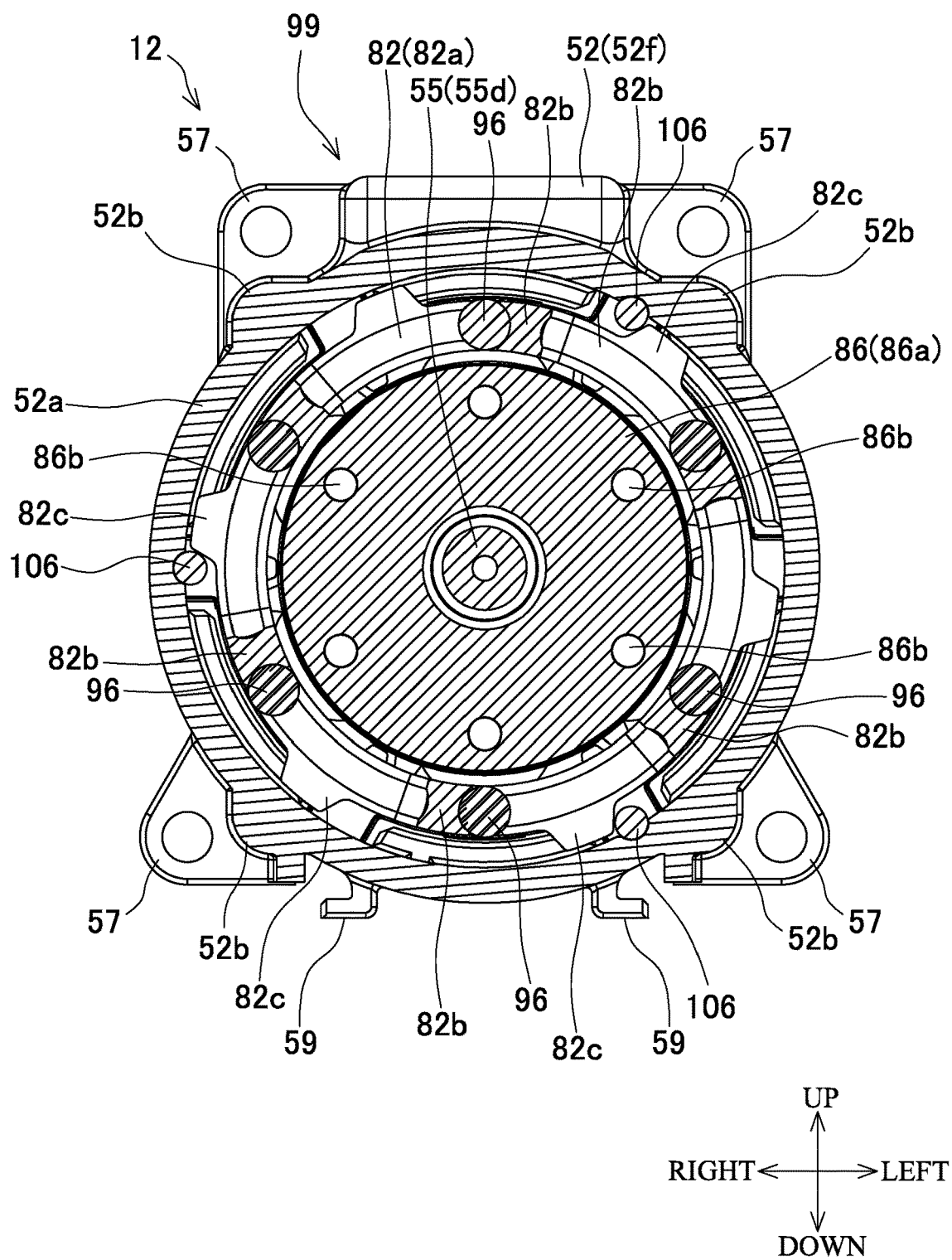

FIG. 30 is a cross-sectional view (during stop) taken along S-S of FIG. 16.

Figure 31:
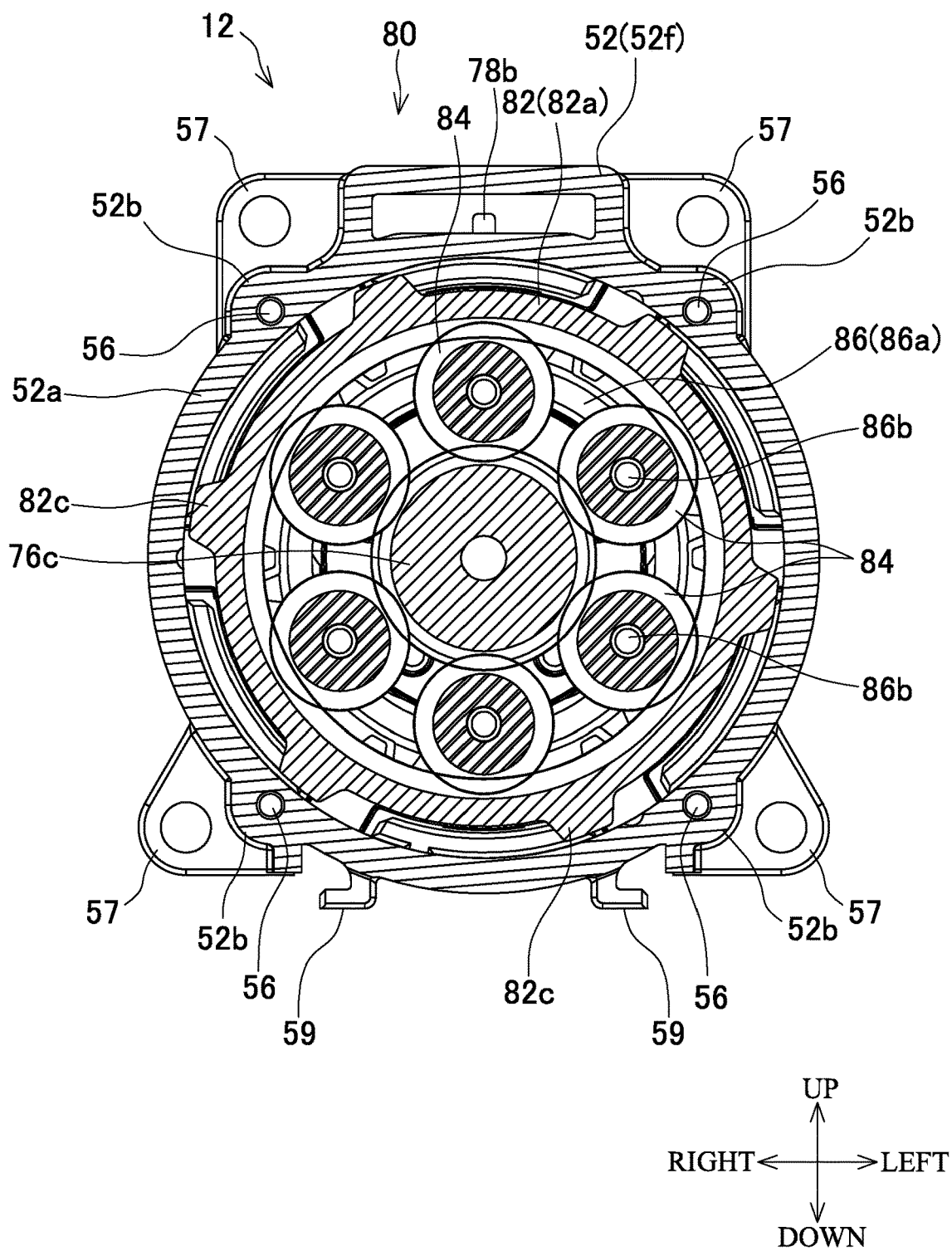

FIG. 31 is a cross-sectional view taken along E-E of FIG. 16.

Figure 32:
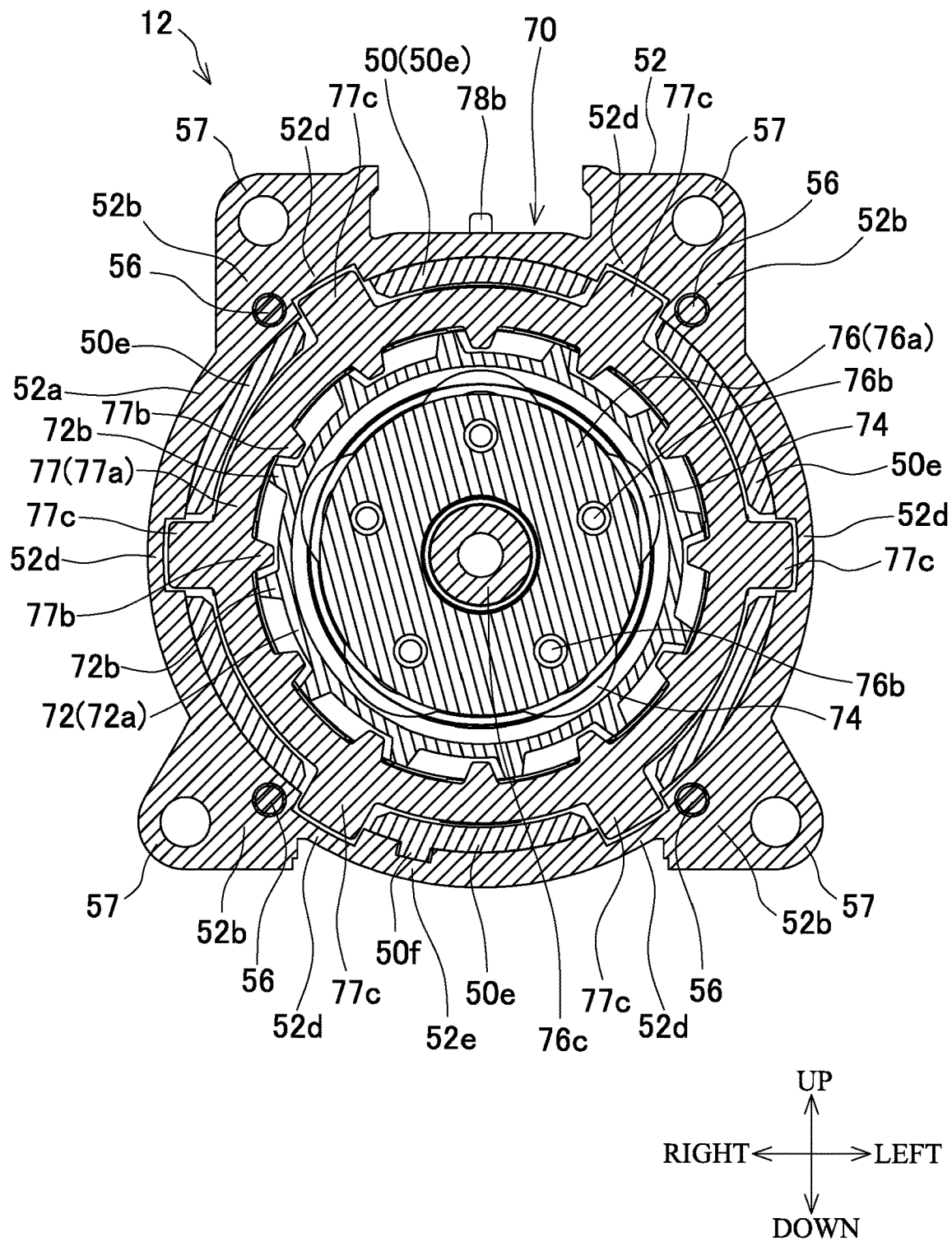

FIG. 32 is a cross-sectional view taken along F-F of FIG. 16.

FIG. 33 is a cross-sectional view taken along J-J of FIG. 16.

Figure 34:
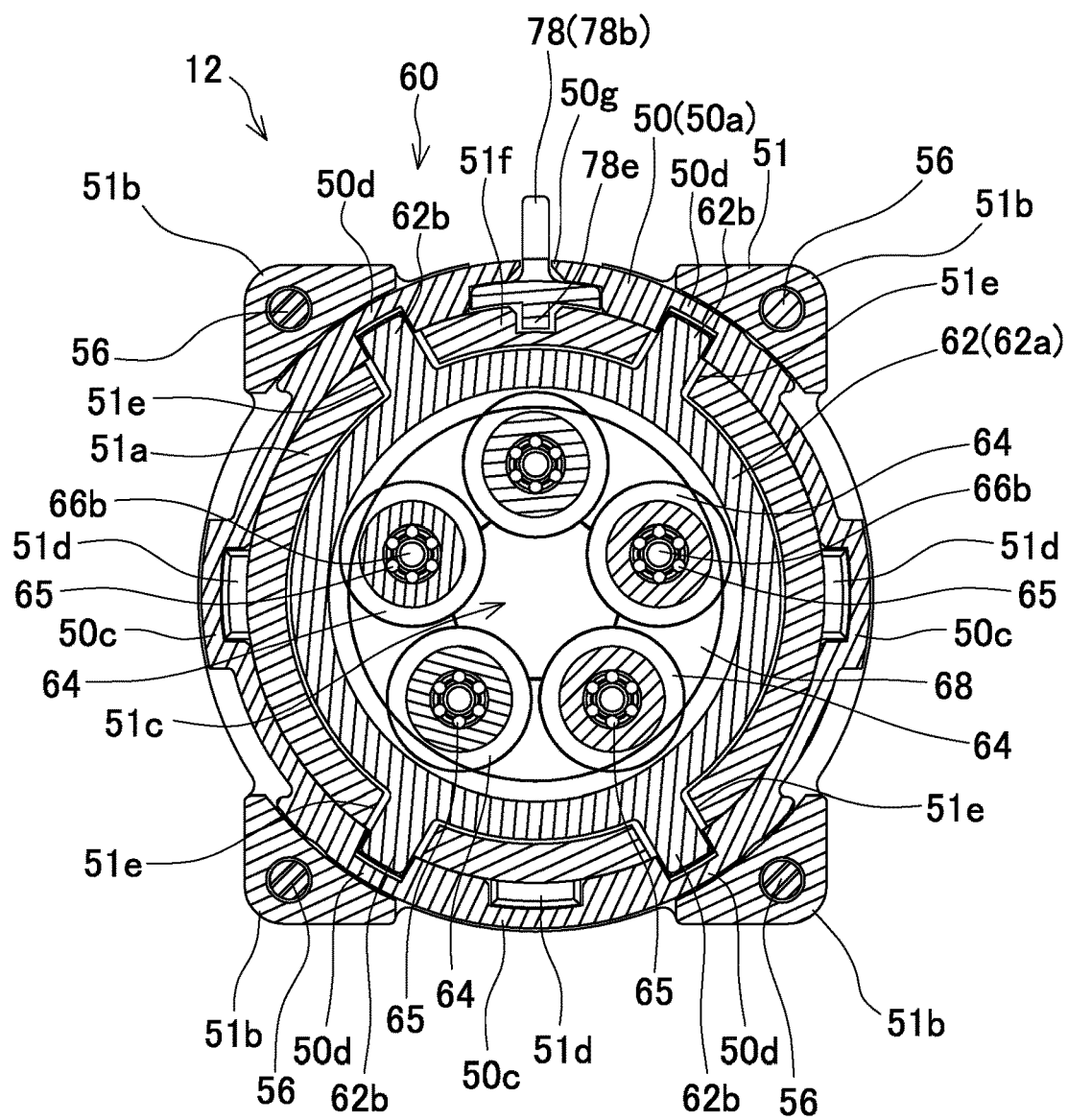

FIG. 34 is a cross-sectional view taken along H-H of FIG. 16.

FIG. 35 is a cross-sectional view taken along L-L of FIG. 16.

Figure 36:
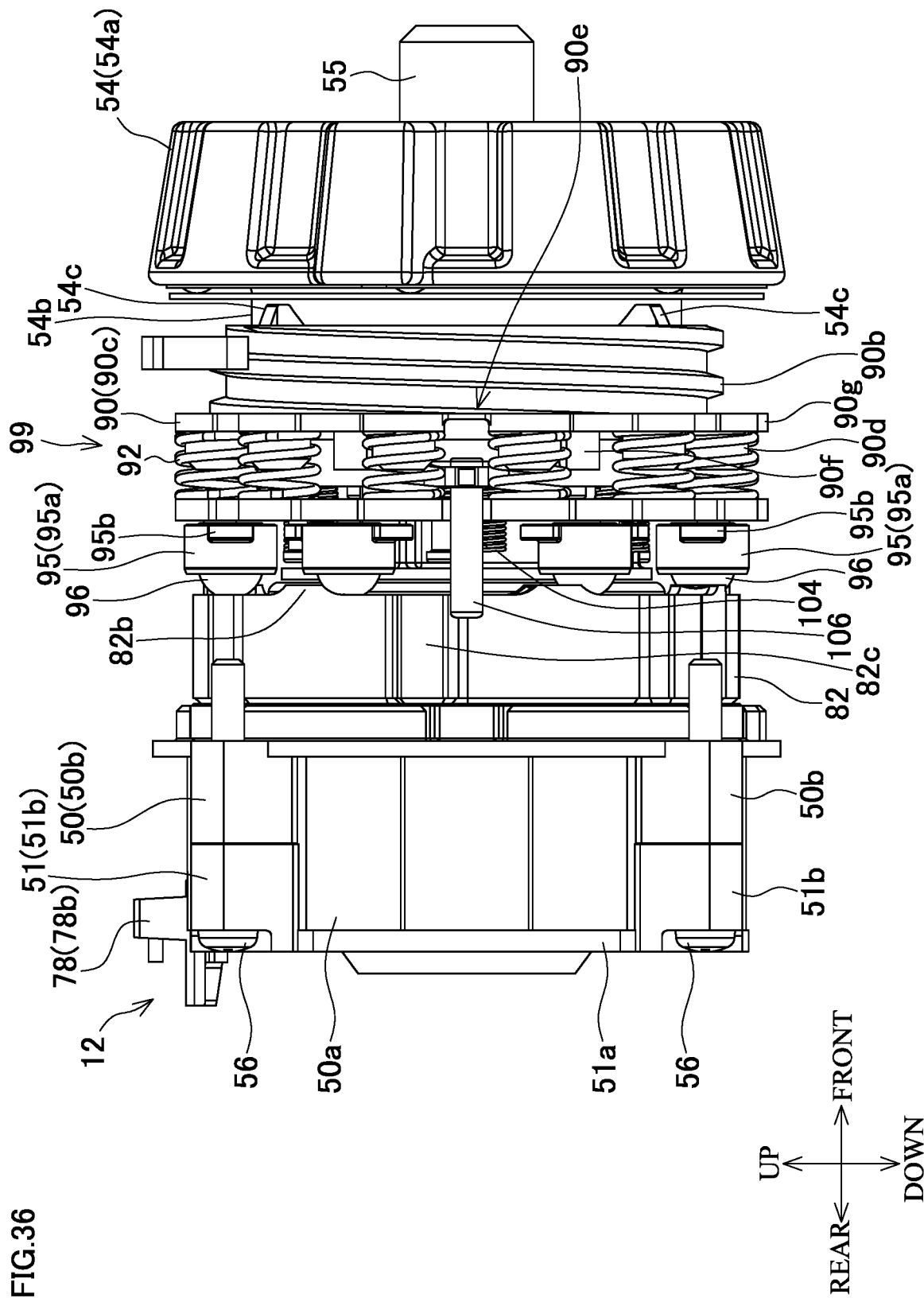

FIG. 36 is a drawing when a pan of an outer wall is removed in FIG. 10.

Figure 37:
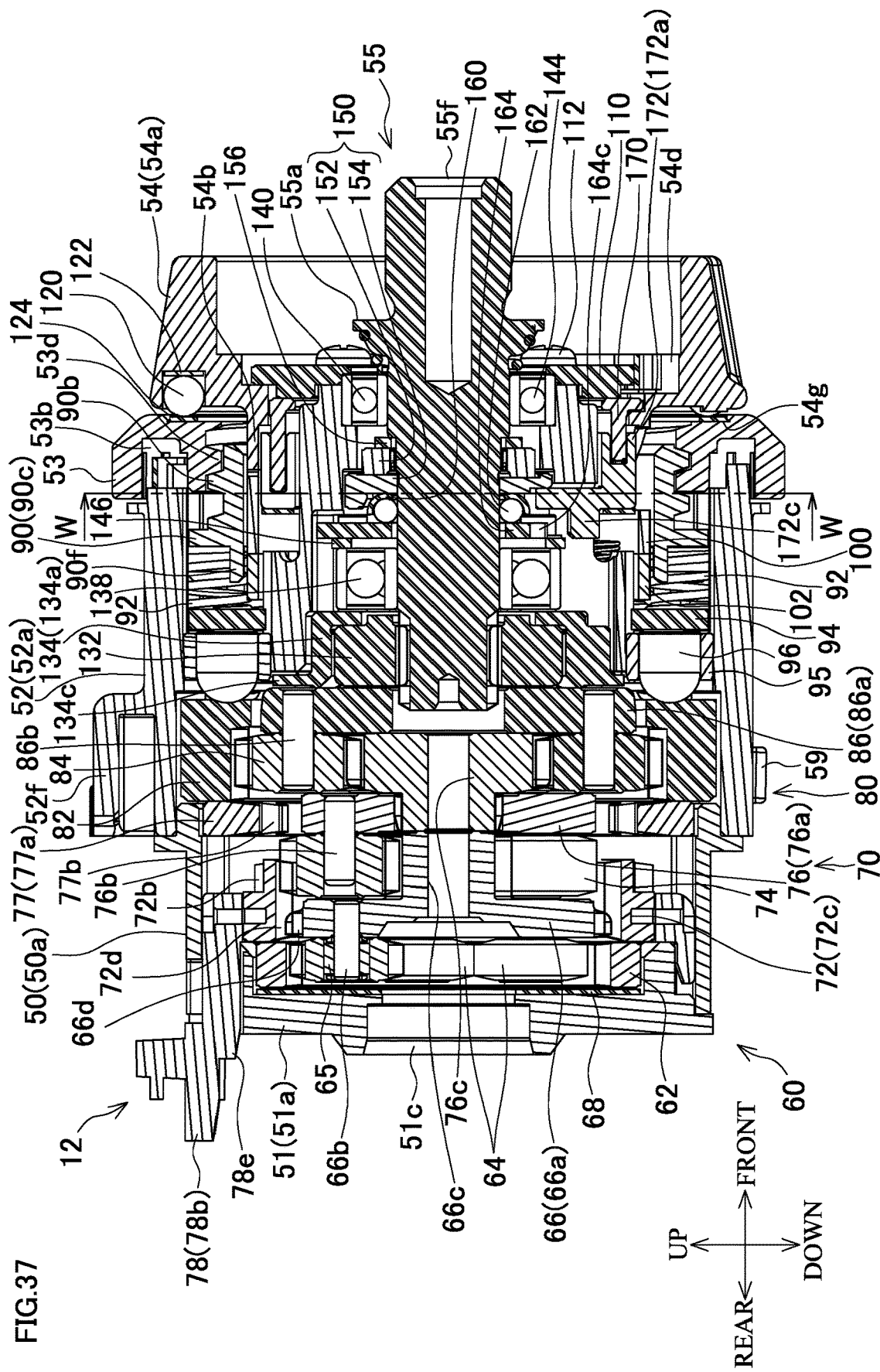

FIG. 37 is a drawing similar to FIG. 16 in a vibration mode and a high speed mode.

Figure 38:
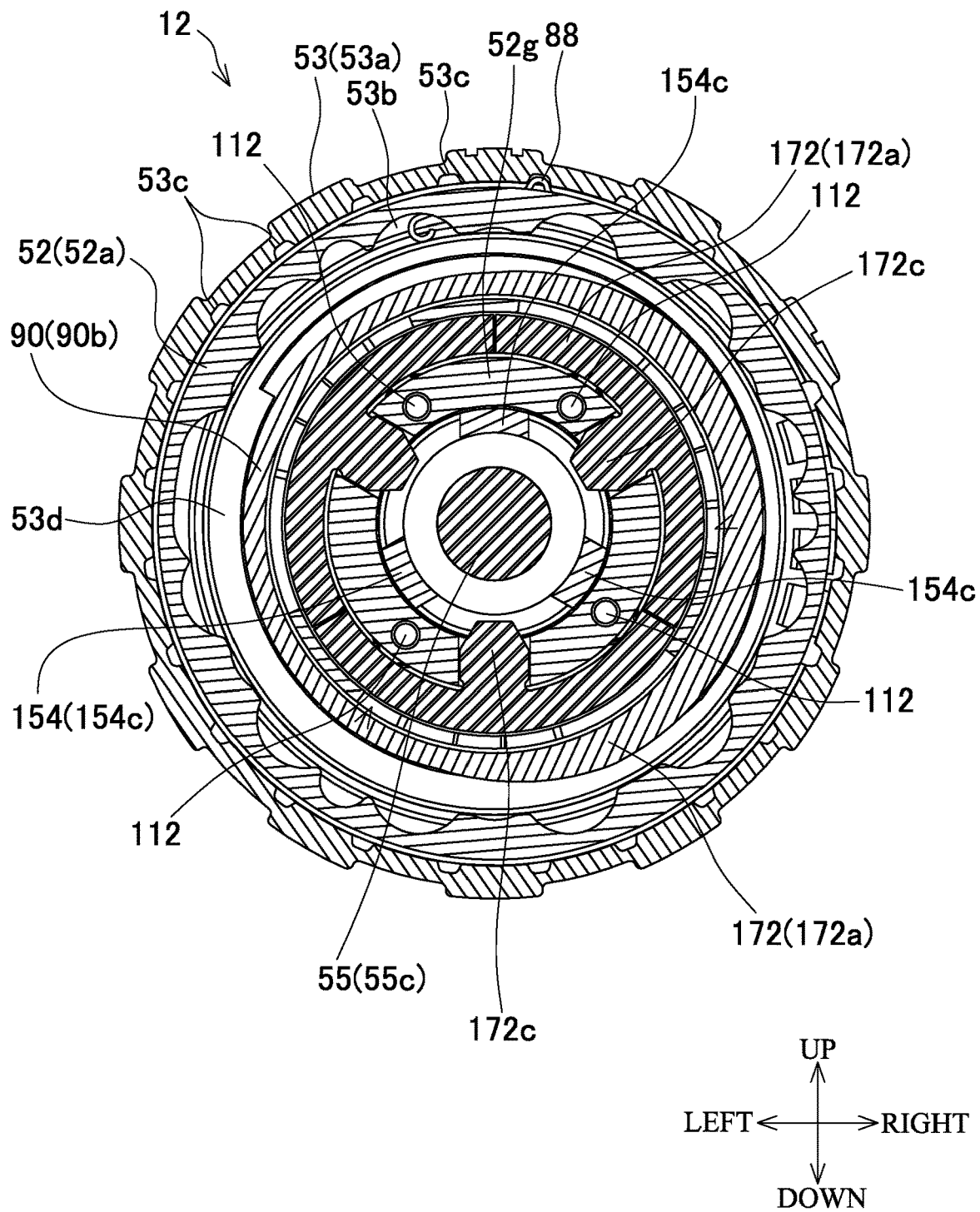

FIG. 38 is a cross-sectional view taken along W-W of FIG. 37.

Figure 39:
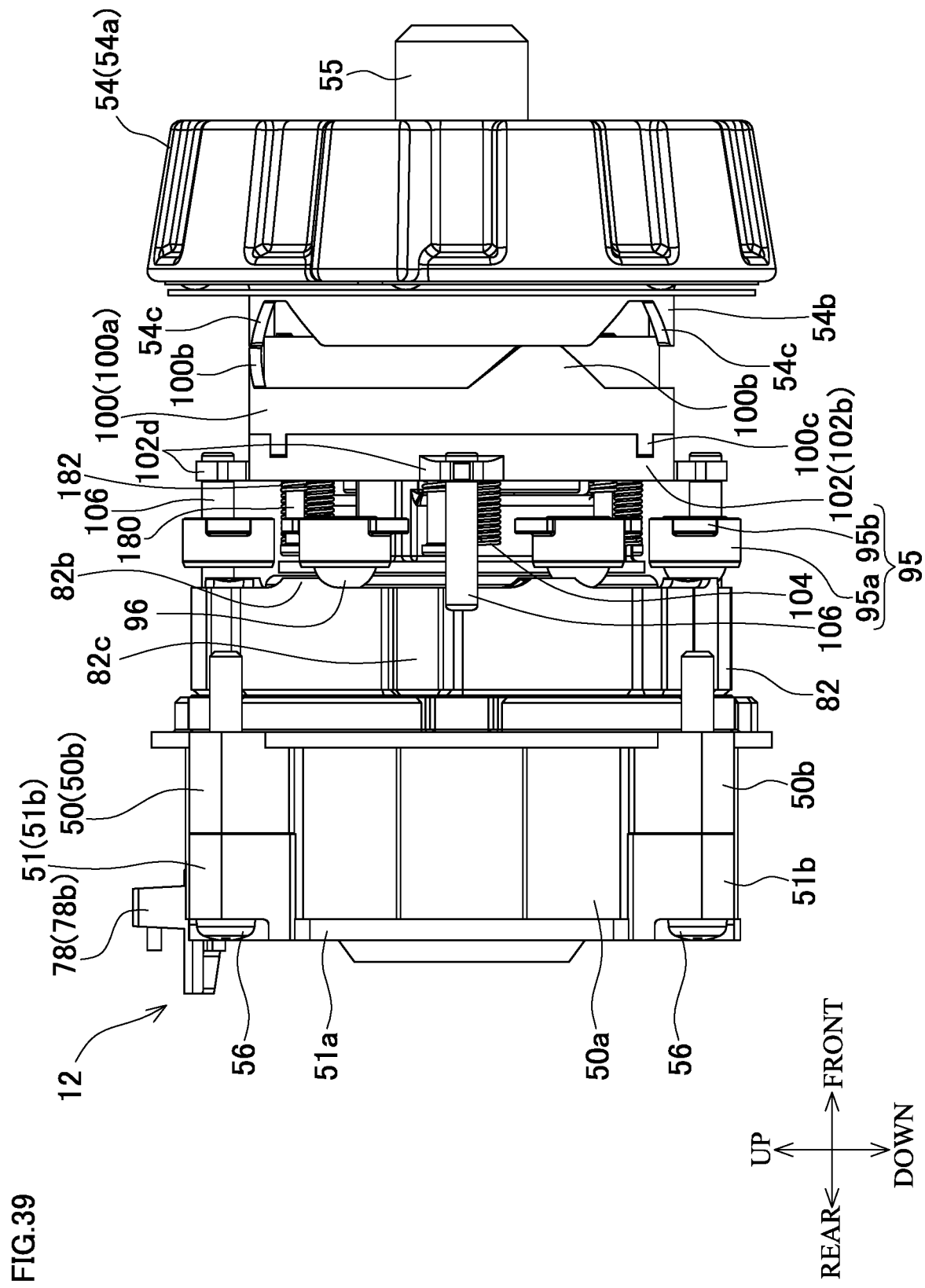

FIG. 39 is a drawing when a part of an internal mechanism is removed in FIG. 36 and a mode is other than a clutch mode.

Figure 40:
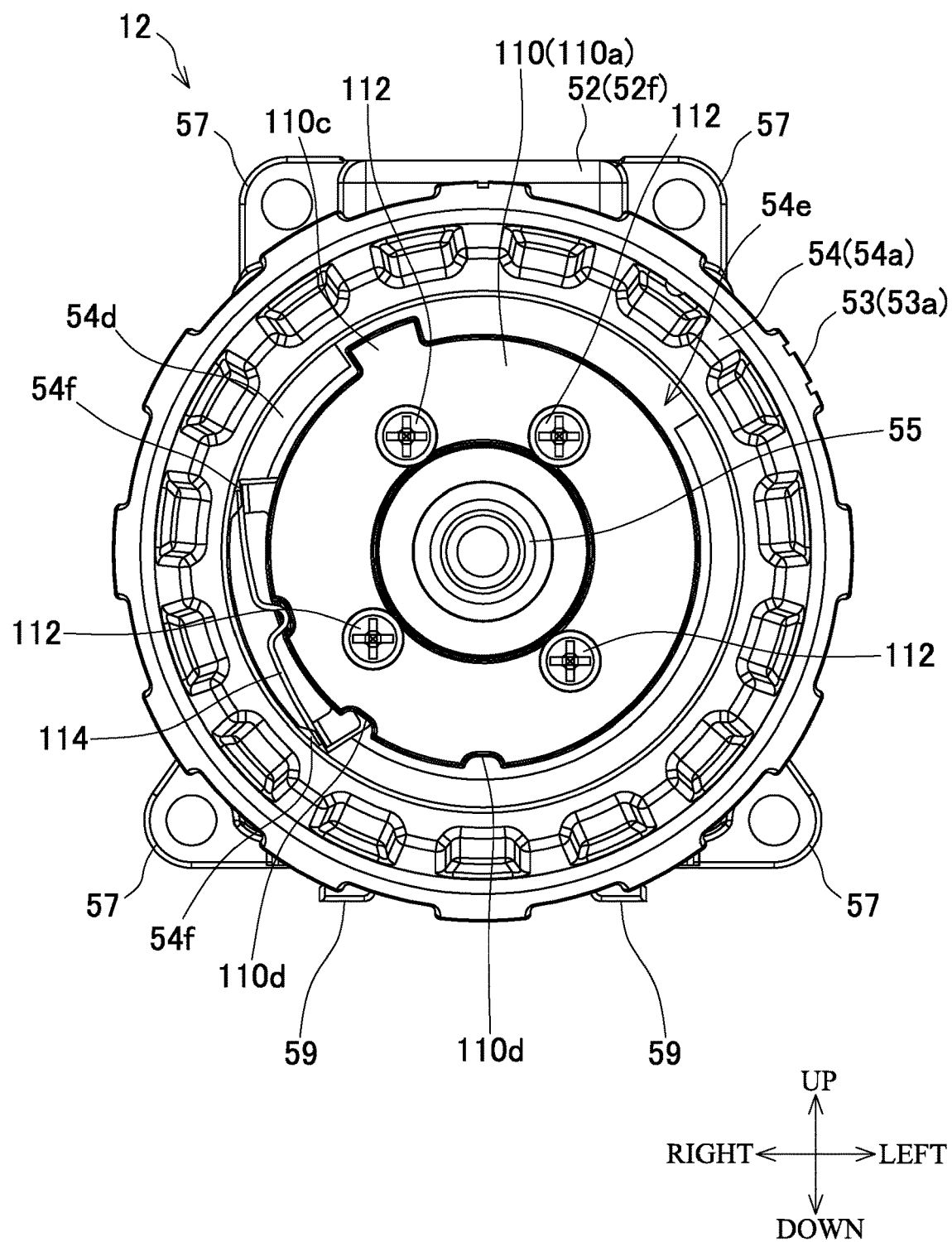

FIG. 40 is a drawing similar to FIG. 10 in the clutch mode.

Figure 41:
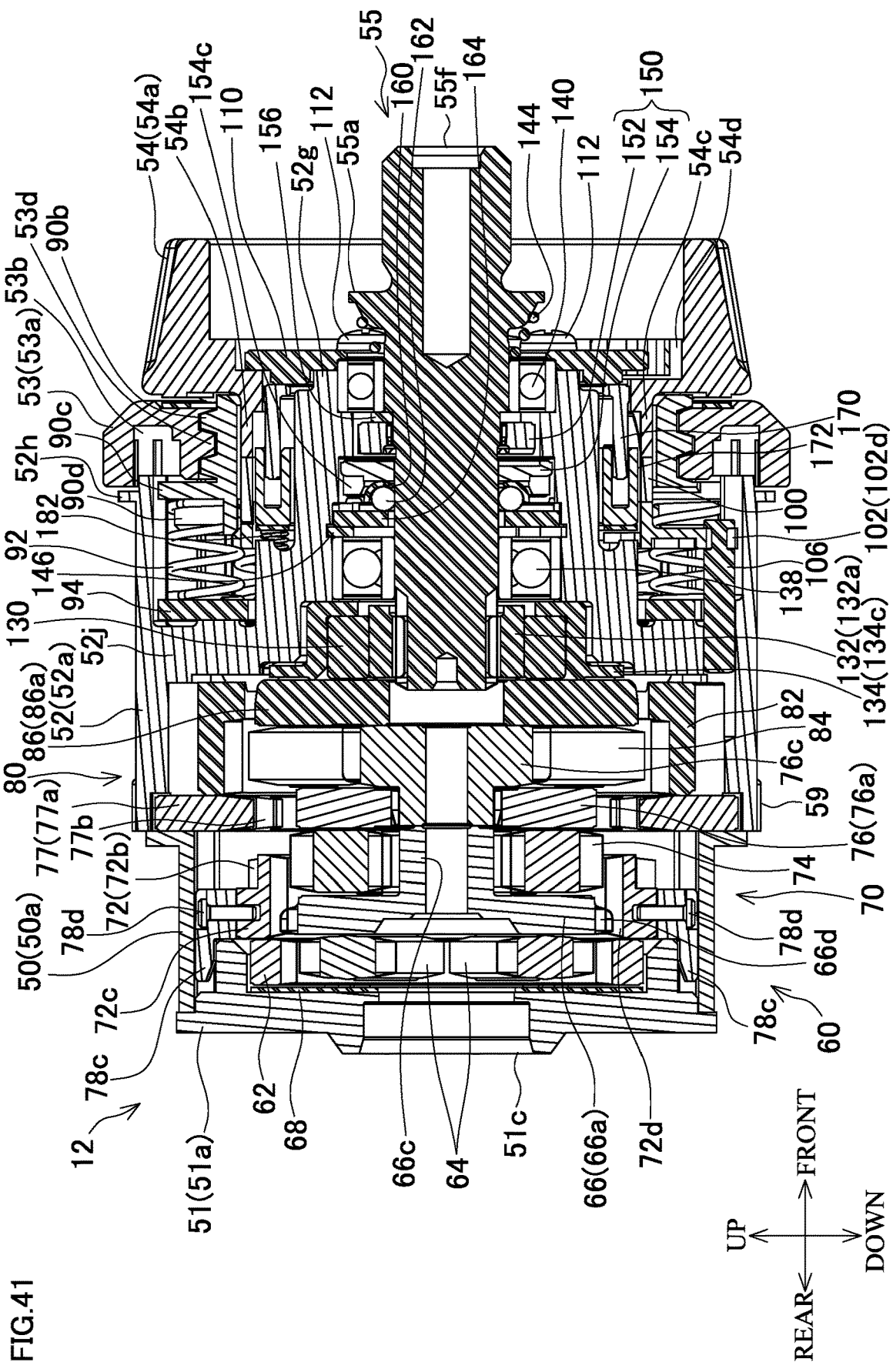

FIG. 41 is a drawing similar to FIG. 17 in the clutch mode and the high speed mode.

Figure 42:
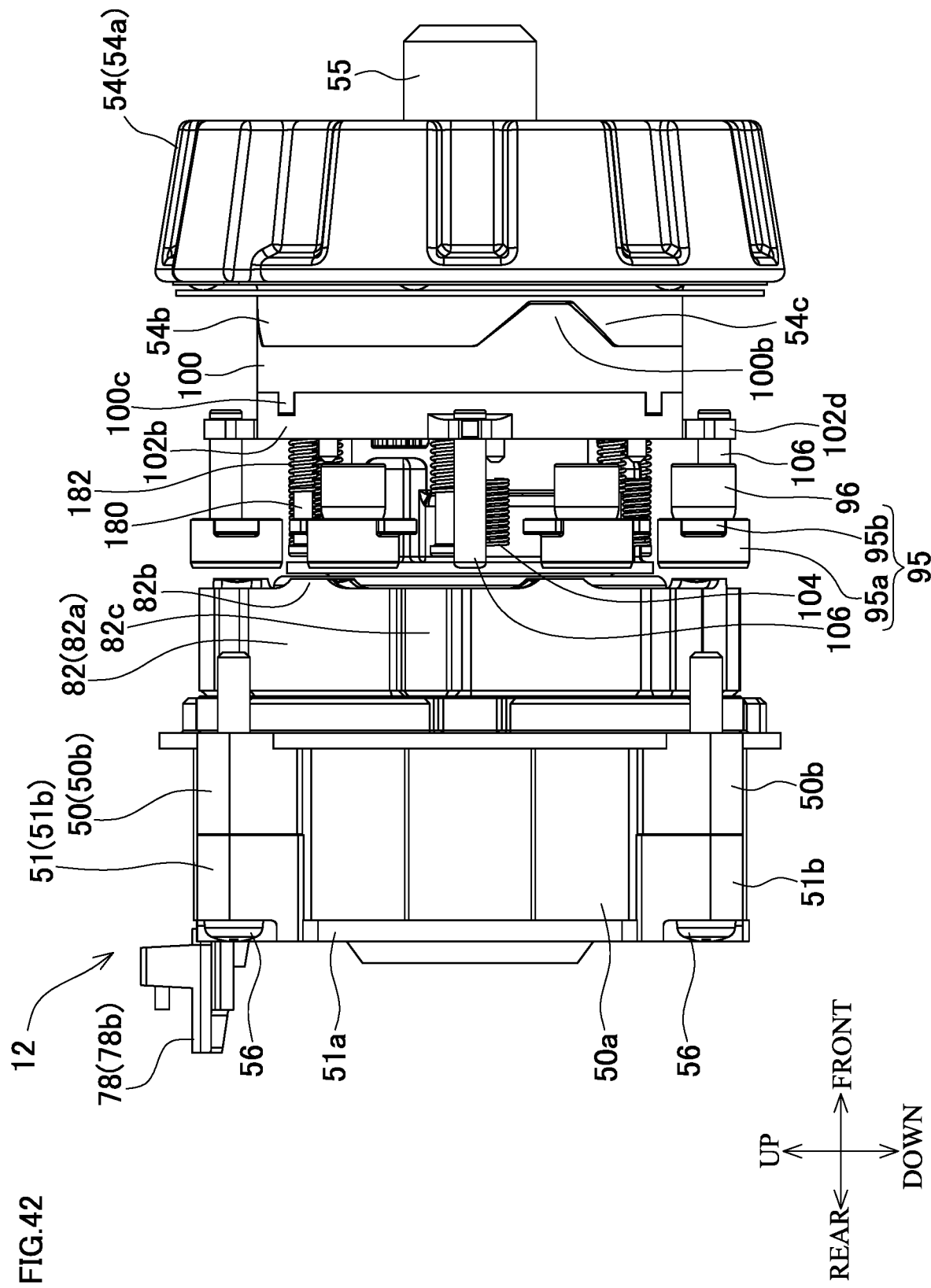

FIG. 42 is a drawing similar to FIG. 39 in the clutch mode.

DETAILED DESCRIPTION

The following describes embodiments and modification examples of the embodiments of the disclosure with reference to the drawings as necessary. The front, rear, up, down, right, and left are defined in these embodiments and modification examples for convenience of explanation and therefore may change depending on at least one of a work condition, a state of a moving member, and a similar state. The disclosure is not limited to the following embodiments and modification examples.

Figure 3:
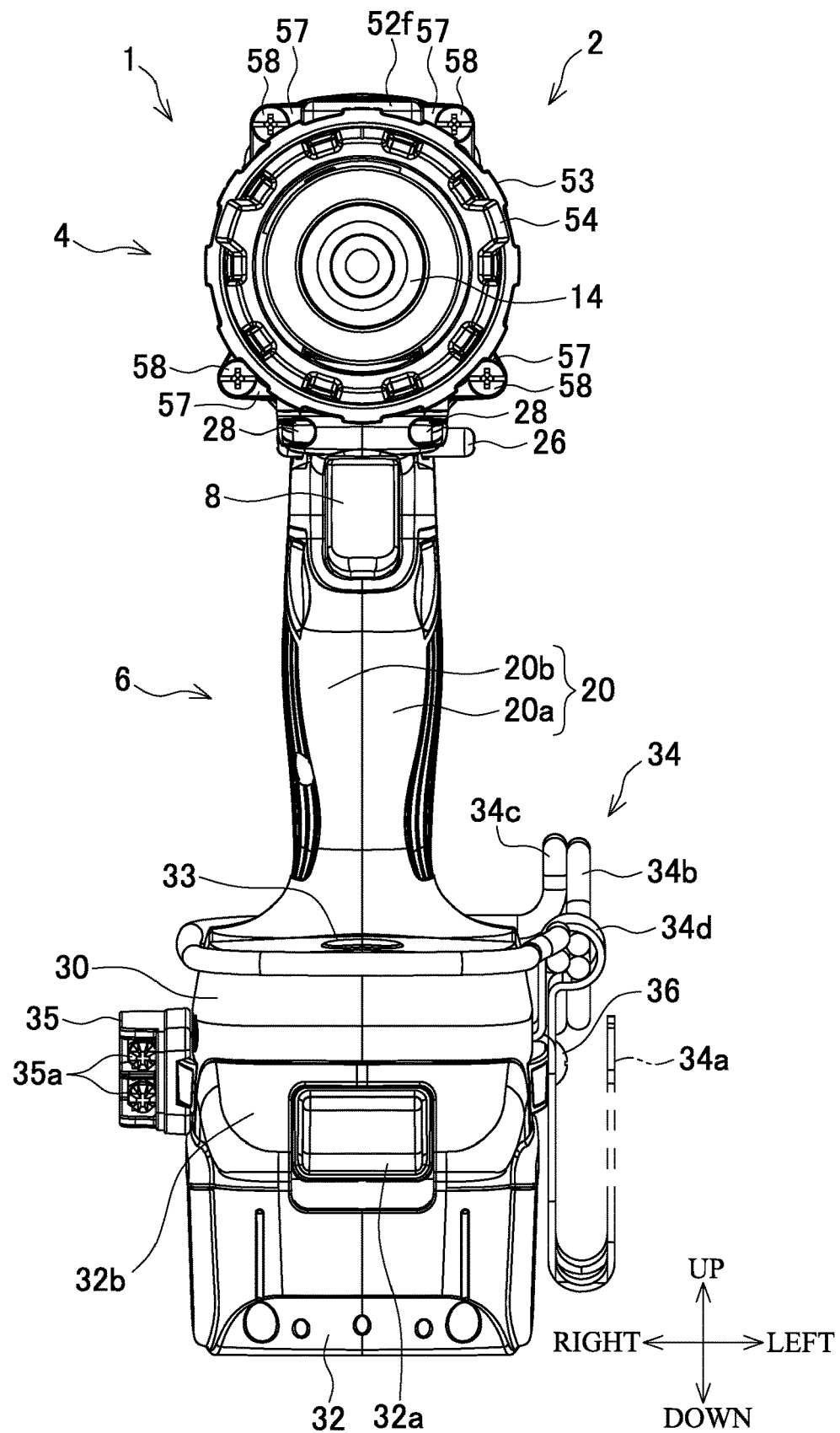
FIG. 3 is a front view of FIG. 1.
Figure 4:
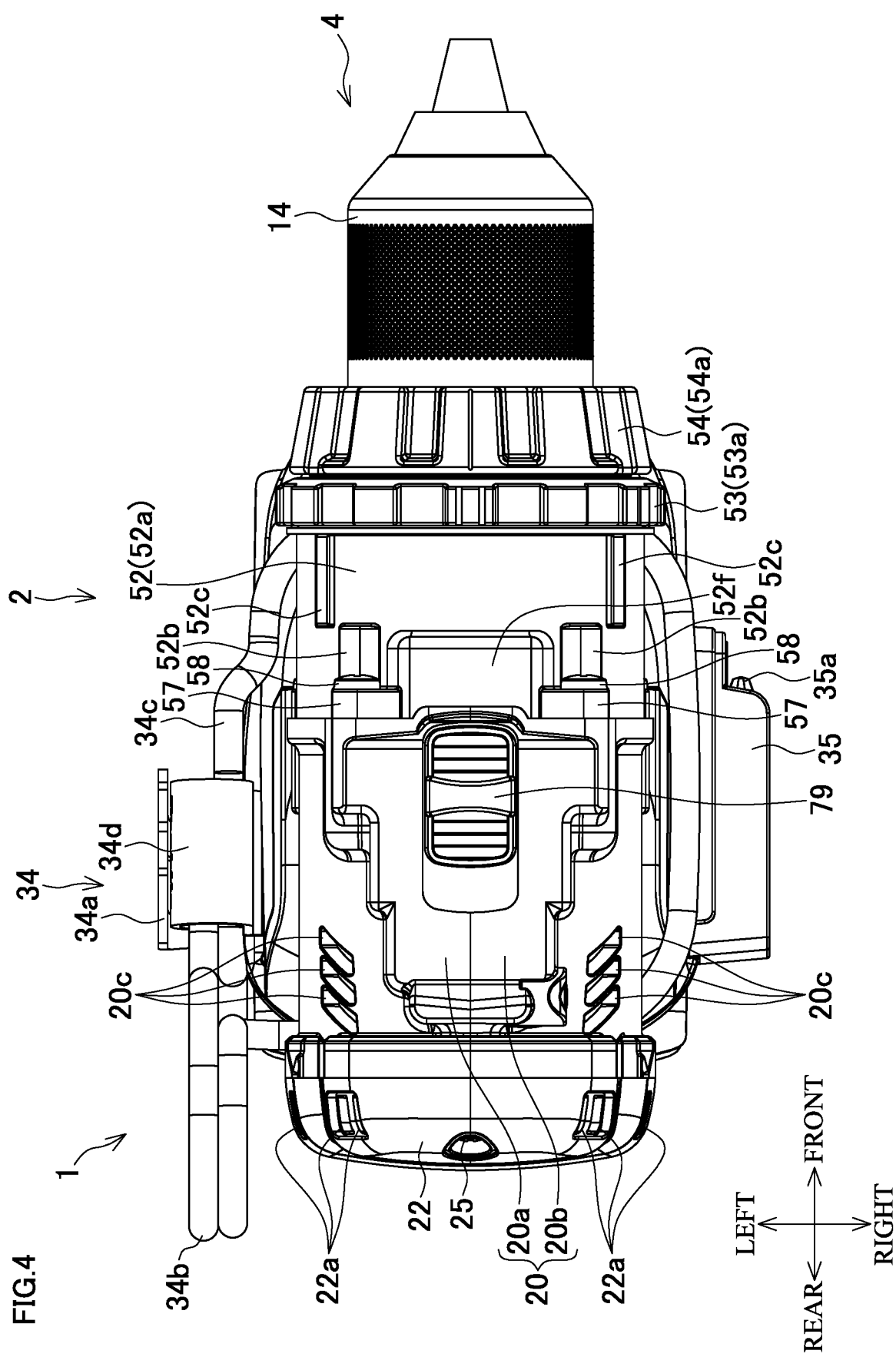
FIG. 4 is a lop view of FIG. 1.
Figure 5:
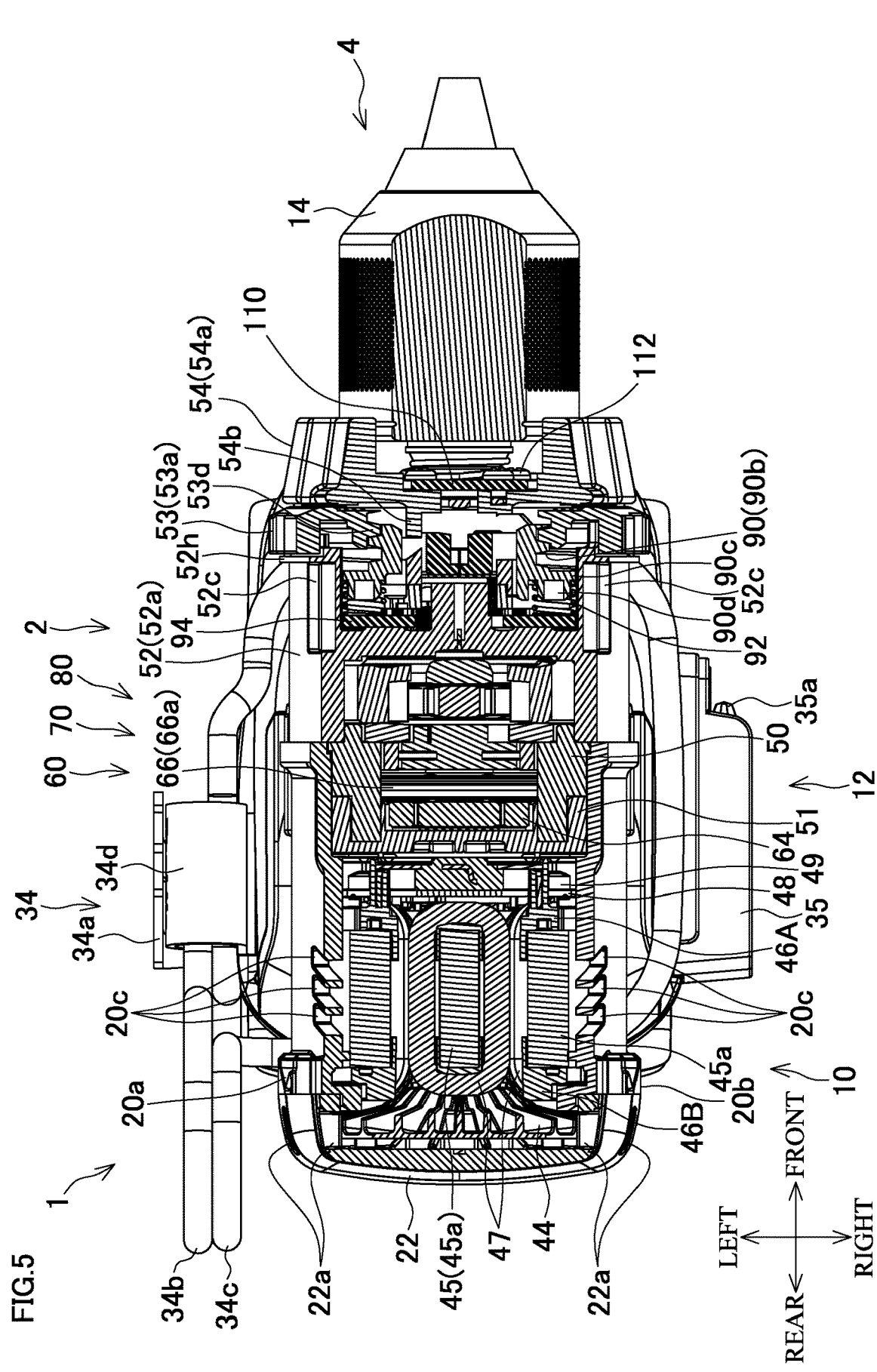
FIG. 5 is a cross-sectional view taken along KAZAMADO-KAZAMADO of FIG. 2.
Figure 6:
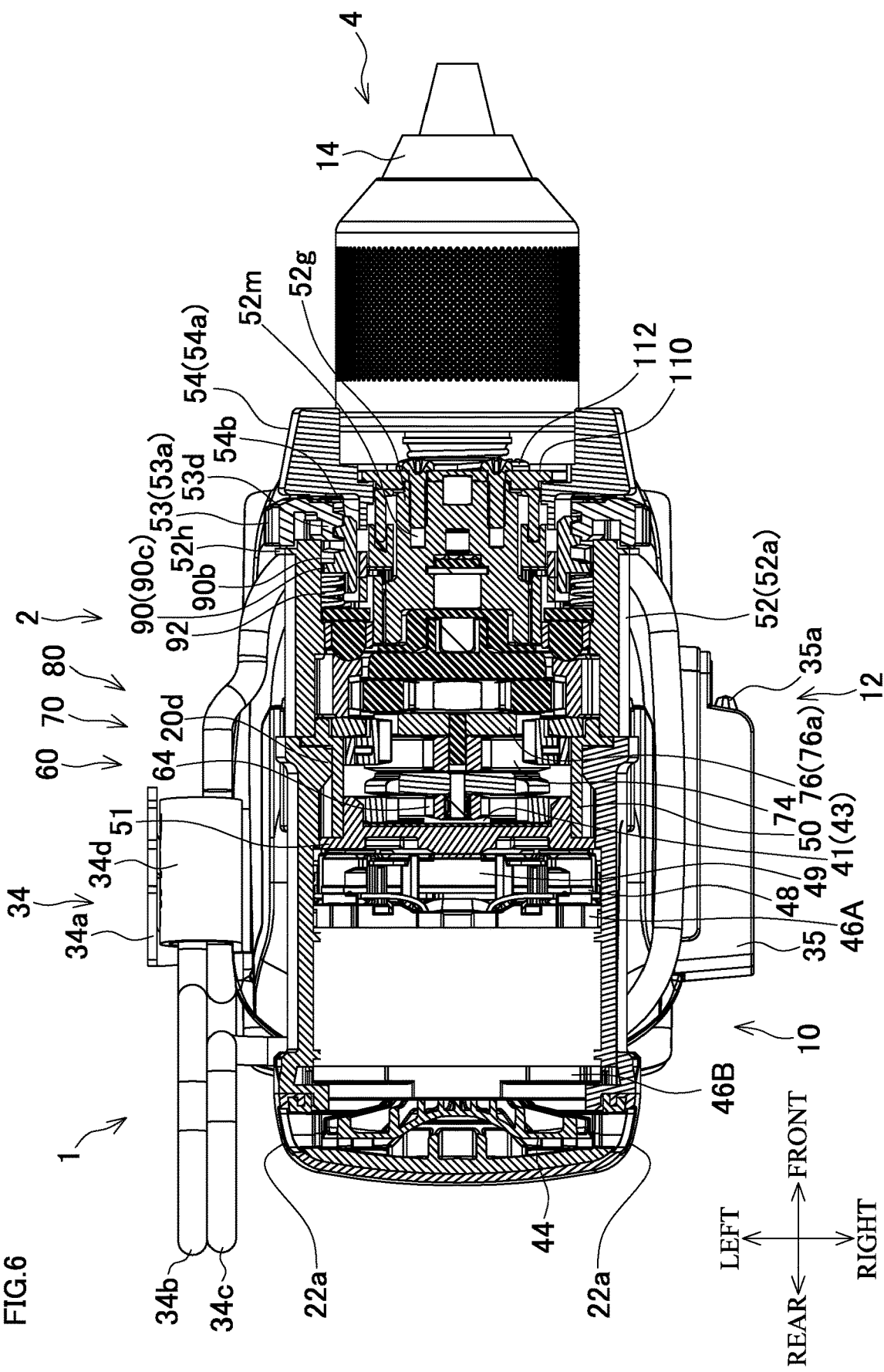
FIG. 6 is a cross-sectional view taken along BB-BB of FIG. 2.
Figure 7:
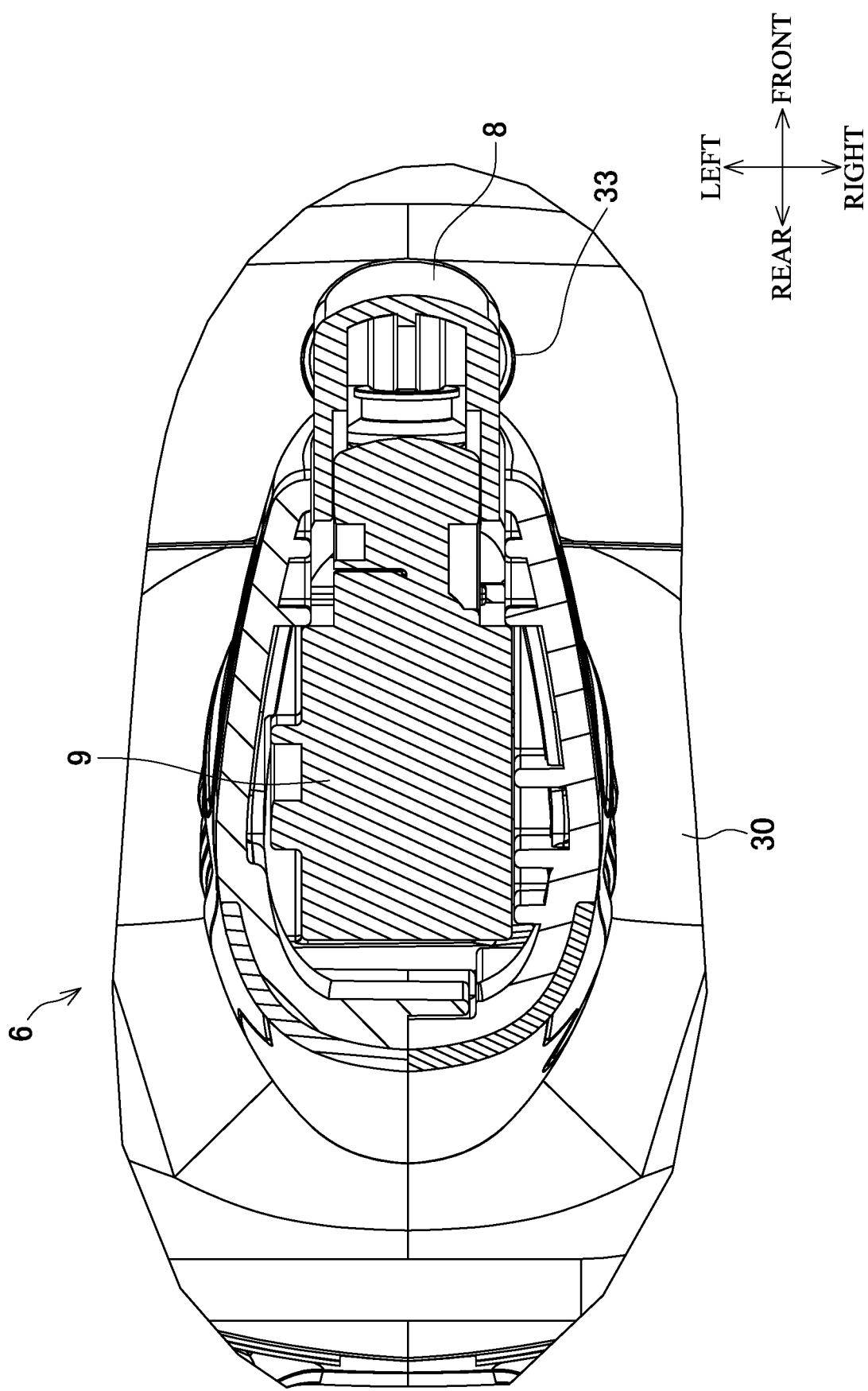
FIG. 7 is a cross-sectional view taken along GRIP1-GRIP1 of FIG. 2.
Figure 8:
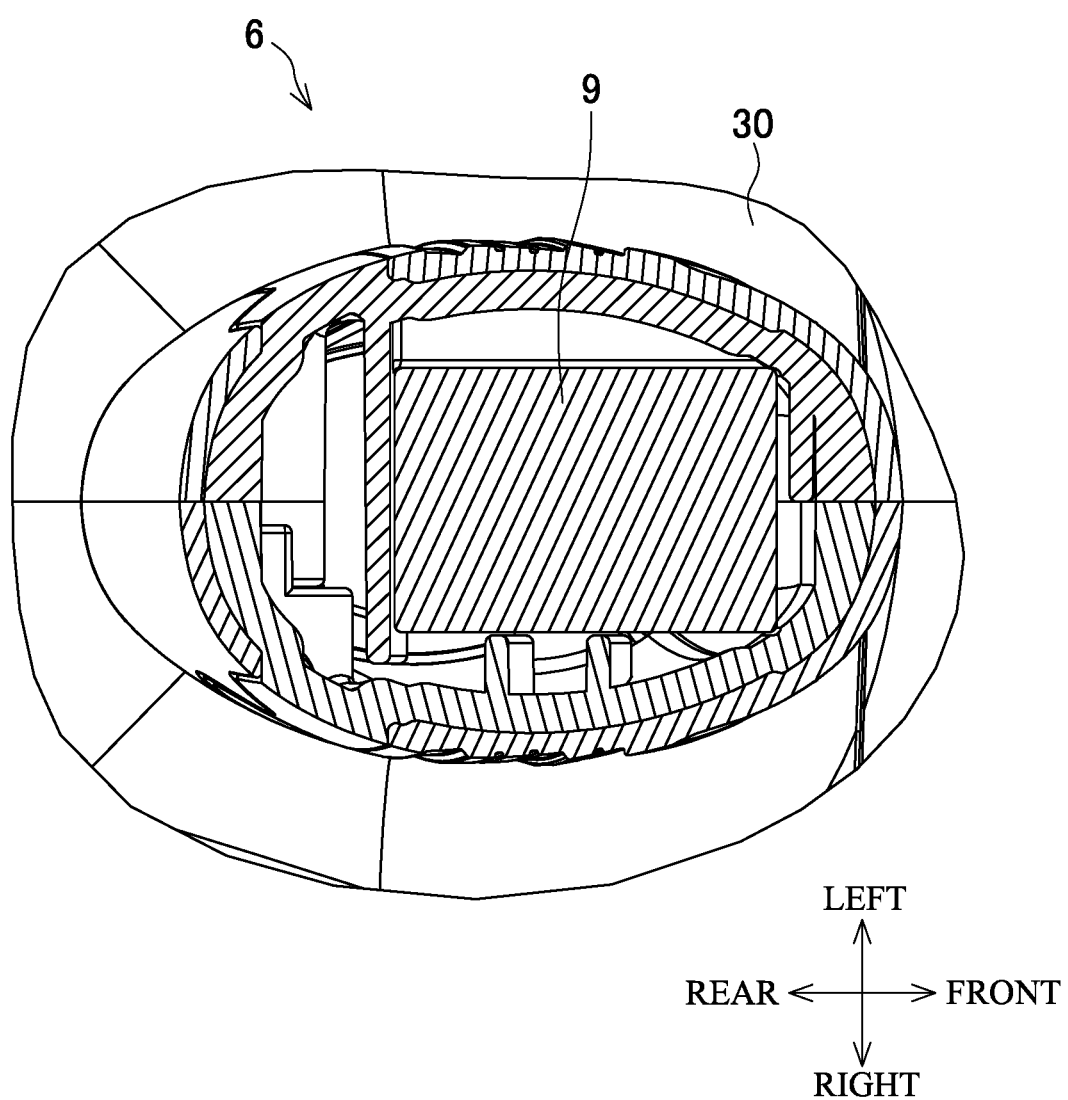

FIG. 1 is a perspective view of an electric vibration driver drill 1 as one example of an electric power tool. FIG. 2 is a right view of the electric vibration driver drill 1. FIG. 3 is a front view of the electric vibration driver drill 1. FIG. 4 is a top view of the electric vibration driver drill 1. FIG. 5 is a cross-sectional view taken along KAZAMADO-KAZAMADO of FIG. 2. FIG. 6 is a cross-sectional view taken along BB-BB of FIG. 2. FIG. 7 is a cross-sectional view taken along GRIP1-GRIP1 of FIG. 2. FIG. 8 is a cross-sectional view taken along GRIP2-GRIP2 of FIG. 2. FIG. 9 is a cross-sectional view taken along GRIP3-GRIP3 of FIG. 2.

The electric vibration driver drill 1 includes a housing 2 forming its outer wall.

The electric vibration driver drill 1 includes a tubular main body 4 having a center axis in a front-rear direction and a grip portion 6 formed so as to project downward from the lower portion of the main body 4. Note that the right is the front and the up is the up in FIG. 2, and the up is the left and the right is the front in FIG. 4.

The grip portion 6 is a part gripped by a user and includes a trigger type switch lever 8, on which a pulling operation by a fingertip of the user is possible, on its upper end portion. The switch lever 8 projects from a switch main body 9 (see FIG. 7 and FIG. 8).

As illustrated in FIG. 5 and FIG. 6, a motor 10 is housed in the rear portion of the main body 4 of the electric vibration driver drill 1. A gear assembly 12 is located on the front side of the motor 10. On the front side of the gear assembly 12, a chuck 14 configured to grip a bit (tool bit) is disposed.

The motor 10 is a driving source for the electric vibration driver drill 1. A rotation of the motor 10 is decelerated and transmitted in the gear assembly 12 and then is transmitted to the chuck 14 and the bit. Note that FIG. 6 omits a part of the motor 10.

The housing 2 includes a main body housing 20 made of resin in which the motor 10, the switch main body 9 and the like are held and a rear cover 22 made of resin covering the rear of the motor 10.

The main body housing 20 includes an outer wall of the grip portion 6.

The main body housing 20 includes half left main body housing 20a and right main body housing 20b. The left main body housing 20a includes a plurality of screw boss portions, and the right main body housing 20b has screw-holes corresponding to the screw boss portions. The left main body housing 20a and the right main body housing 20b are assembled with screws 24 in a right-left direction inserted into the respective sets of the screw-holes and the screw boss portions.

The respective rear portions of the left main body housing 20a and the right main body housing 20b in the main body 4 are assembled with one another to form an opening. The rear cover 22 is fastened to the opening with a plurality of screws 25 extending in the front-rear direction. The respective screws 25 are located up and down (only the upper screw 25 is illustrated) to surely fix the rear cover 22. A plurality of air inlets 20c extending in an up-down direction are open so as to be arranged in the front-rear direction on the upper and the lower side portions of the rear end portions of the left main body housing 20a and the right main body housing 20b. That is, the plurality of air inlets 20c are formed into continuous slit shapes located along parts adjacent to the front of the rear cover 22. Further, a plurality of exhaust outlets 22a each extending in the front-rear direction are open so as to be arranged up and down on the side portions of the rear cover 22 and at the rear of the respective air inlets 20c.

As illustrated in FIG. 2 and FIG. 3 at the rear of the switch lever 8, a forward-reverse switching lever 26, a switch switching a rotation direction of the motor 10, is disposed so as to penetrate from side to side in a boundary region between the main body 4 and the grip portion 6.

Additionally, a plurality (two pieces) of lights 28 that can irradiate the front side are disposed so as to be located side by side on the upper side of the switch lever 8 and on the front of the forward-reverse switching lever 26. Here, the respective lights 28 are LEDs.

The grip portion 6 has a lower end portion where a battery mounting portion 30, which expands outward from its upper portion, is disposed. A battery 32 is held to the lower side of the battery mounting portion 30 to be attachable/detachable with a battery button 32a. The battery 32 is a lithium-ion battery and includes a plurality of cells (not illustrated). The cells have columnar shapes long in an axial direction and face the right-left direction.

On the front upper portion of the battery mounting portion 30 (on the top surface portion on the front side of the expanded lower portion of the grip portion 6), a display unit 33 that displays a state of an electronic gear by a lighting aspect of a plurality of lamps is disposed.

With a battery terminal portion upward and a bulge portion 32b upward and forward, the battery 32 is slid rearward from the front of the battery mounting portion 30 to be mounted. During the installation, the rear portion of the bulge portion 32b abuts on the front portion of the battery mounting portion 30, and the battery terminal portion contacts a battery mounting terminal portion of the battery mounting portion 30. Moreover, during the installation, a battery claw biased upward by an elastic member and projecting from a top surface of another part of the battery 32 enters a concave battery mounting portion hollowed upward and disposed on the lower front portion of the battery mounting portion 30. Meanwhile, when the battery 32 is removed, while the battery button 32a coupled to the elastic member for the battery claw is operated to disengage the battery claw with the concave battery mounting ponton, the battery 32 is slid forward.

Respective hook 34 and bit holder 35 are located on the battery mounting portion 30. The hook 34 mid the bit holder 35 are mountable to the left portion or the right portion of the battery mounting portion 30 with a screw 36. The hook 34 includes a U hook 34a having a "U" shape in front view, a first loop hook 34b having an "Ω" shape in side view, and a second loop hook 34c having a part along the first loop hook 34b and a loop-shaped part in top view. The parallel front end portion of the first loop hook 34b and both end portions of the second loop hook 34c are held in a tubular portion 34d, which is formed on the upper end portion of the U hook 34a having an axial direction in the front-rear direction. The bit holder 35 holds a plurality (two pieces) of respective bits 35a to be removable by forward sliding. The bits 35a are slid rearward with respect to the bit holder 35 to be mountable.

As illustrated in FIG. 2 and FIG. 9, a control circuit board 38 of a controller that controls the motor 10 is held in the battery mounting portion 30. The control circuit board 38 includes a columnar capacitor 38a, which projects upward with respect to the other part, and a microcomputer. The control circuit board 38 is electrically coupled to the motor 10 with a power supply lead wire and a signal lead wire (not illustrated). The control circuit board 38 is also electrically coupled to the battery mounting terminal portion of the battery mounting portion 30.

As illustrated in FIG. 5 and FIG. 6, the motor 10 is a brushless motor and includes a cylindrical stator 40 and a rotor 41 located inside the stator 40.

The rotor 41 includes a columnar motor shaft extending in the front-rear direction, a pinion 43 (FIG. 6) integrated with the front end portion of the motor shaft, a cylindrical rotor core located on the peripheral area of the center of the motor shaft, and a permanent magnet located inside the rotor core.

A cooling fan 44 is mounted to the rear of the motor shaft via a metallic insert bush (not illustrated). The fan 44 is a centrifugal fan. The insert bush is press-fitted to be strongly fixed to a motor shaft of the fan 44.

Respective exhaust outlets 22a are positioned radially outward of the fan 44.

A motor rear bearing that rotatably supports the rear end portion of the motor shaft is held to the rear side of the fan 44 and the inner surface of the rear portion of the rear cover 22.

The stator 40 includes a stator core 45, ring-shaped front insulating member 46A and rear insulating member 46B, a coil 47, a sensor substrate 48, and a sheet metal member 49 made of synthetic resin. The stator core 45 includes a cylindrical portion having the axial direction in the front-rear direction and a plurality of respective teeth 45a projecting radially inward from its inner surface. The front insulating member 46A and rear insulating member 46B are each mounted to the forth and the rear of the stator core 45. The coil 47 is wound around the respective teeth 45a via the front insulating member 46A and the rear insulating member 46B. The sensor substrate 48 is mounted to the front side of the front insulating member 46A. The sheet metal member 49 is mounted to the front side of the sensor substrate 48, has a circular shape, and includes a plurality of arc-shaped sheet metals.

The sensor substrate 48 senses a rotation position of the rotor 41 (permanent magnet) and transmits the rotation position to the control circuit board 38.

The sheet metals of the sheet metal member 49 are electrically coupled to the coil 47 to one another in a predetermined aspect and are coupled to the power supply lead wire of the control circuit board 38.

As illustrated from FIG. 10 to FIG. 42, the gear assembly 12 includes a cylindrical gear case 50 as its outer wall, a plate-shaped (dish-shaped) motor bracket 51 located on the rear side of the rear end of the gear case 50, a metallic gear housing 52 in a shape of inner and outer double cylinders located on the front side of the gear ease 50, a clutch ring 53 as a clutch switching ring located on the from side of the gear housing 52, exposed in the upper from portion of the housing 2, and externally mounted to the housing 2, and a mode switching ring 54 externally mounted to the housing 2 on the from side similarly to the clutch ring 53.

A spindle 55 is located inside in the radial direction on the from portion of the outer wall in the gear assembly 12 so as to run along the center axis of the gear assembly 12. The spindle 55 has a distal end portion projecting forward from the outer wall of the gear assembly 12.

The spindle 55 is a columnar member having the axial direction in the front-rear direction and includes a spindle flange 55a, which expands radially outward at the center in the front-rear direction, a front stepped portion 55b, an intermediate stepped portion 55c, and a rear stepped portion 55d, which are formed at the rear of the spindle flange 55a by configuring the respective diameters smaller than those of the front portions, a clip groove 55e, which are circumferentially formed on the front side of the intermediate stepped portion 55c, and a spindle hole 55f, which extends back and forth at the center of the front portion and is open at the front end. The spindle hole 55f is a bolt hole having a screw groove. A male threaded portion (not illustrated) is formed on an outer surface radially outward of the spindle hole 55f on the front end portion of the spindle 55.

The chuck 14 includes a female threaded portion (not illustrated) corresponding to the male threaded portion of the spindle 55. The chuck 14 receives the male threaded portion of the spindle 55 by the female threaded portion, and an insertion of a bolt (not illustrated) into the spindle hole 55f fixes the chuck 14 to the spindle 55. At least one of the spindle 55 and the chuck 14 can be regarded as an output shaft.

The gear case 50 includes a cylindrical year case base portion 50a and has screw-hole portions 50b having screw-holes al centers of respective projecting pieces projecting radially outward on upper right, lower right, upper left, and lower left of the gear case base portion 50a. Screw-hole portions 51b and screw-hole portions 52b are similarly formed on a motor bracket base portion 51a having a cylindrical shape with bottom of the motor bracket 51 and on a rear portion of an outer tubular portion 52a of the gear housing 52. The screw-hole portion 51b projects radially outward and forward. The screw-hole portion 52b projects radially outward. A screw 56 shared among the screw-hole portions 50b and 51b and the screw-hole portion 52b on the upper right are passed through, and the same applies to the cases of the lower right, the upper left, and the lower left. Thus, the gear case 50 and the gear housing 52 (and the motor bracket 51) are fastened together with shared joining means, which allows close contact between these components. As a result, an internal mechanism is protected, and a leakage of grease or the like can be prevented when the grease or the like is applied on the internal mechanism. Additionally, compared with the case where a joining member of the motor bracket 51 and the gear case 50 and a joining member of the gear case 50 and the gear housing 52 are separately disposed, the above-described configuration achieves the compact gear assembly 12.

Side handle mounting portions 52c, which are concave portions in me front-rear direction to receive a "C"-shaped handle-side mounting portion of a side handle (not illustrated), are formed in the outer surface of the front portion of the outer tubular portion 52a of the gear housing 52 and in parts adjacent to the screw-hole portions 52b in the circumferential direction (the lower side of the upper screw-hole portion 52b and the upper side of the lower screw-hole portion 52b). Forked distal ends of the handle-side mounting portion are inserted into the pair of side handle mourning portions 52c on the right side and left side, so that the side handle extending in the right-left direction is mounted. Even when the side handle is attempted to rotate around the handle-side mounting portion, the screw-hole portions 52b projecting circumferentially outward retain the handle-side mounting portion, and therefore this rotation is prevented and the mounting stale of the side handle is stably maintained.

With screw-hole portions 57 located radially outward of the respective screw-hole portions 52b of the gear housing 52 and screws 58 inserted into screw holes formed on an opening of the main body 4 of the main body housing 20, the gear assembly 12 is mounted to the front of this opening of the main body housing 20. The two upper screw-hole portions 57 have intervals in the right-left direction narrower than intervals of the two lower screw-hole portions 57 in the right-left direction. Accordingly, the respective screw-hole portions 57 are located so as to fit the shape of the columnar main body 4 from which the grip portion 6 extends downward, thereby contributing to the compactification of the upper portion in the right-left direction.

As illustrated in FIG. 6, in the inner surface of this opening of the main body housing 20, a rib 20d projecting radially inward is disposed. The rib 20d is adjacent to the side surface of the gear case base portion 50a at a rear side of a diameter-expanding portion with respect to the gear housing 52. By an operation of the internal mechanism (for example, an intermediate planetary gear mechanism 70 described later) of the gear assembly 12, the rib 20d receives a reactive force of stress deformation generated in the gear case 50. Accordingly, the gear assembly 12 is securely held.

On the right and left of the rear portion of the lower surface in the outer tubular portion 52a of the gear housing 52, projecting bodies 59 projecting downward and outward in the right-left direction are disposed. The respective projecting bodies 59 are locked to the inner surface of the main body housing 20 to prevent the separation of the gear assembly 12 from the main body housing 20.

The gear housing 52 has the exposed front portion, side portion, and upper portion serving as a part of the outer wall of the main body 4, and the gear housing 52 becomes a part of the housing 2.

In a center hole 51c of the motor bracket 51, a motor front bearing (not illustrated) that rotatably supports the pinion 43 (see FIG. 6) on the front end portion of the motor shaft is inserted. As especially illustrated in FIG. 35, the rotation of the motor bracket 51 is prevented by insertion of a plurality (seven pieces) of protrusions 51d, which project radially outward from the outer surface of the cylindrical portion of the motor bracket base portion 51a, into inner grooves 50c, which extend in the front-rear direction, are formed on the inner surface of the rear end portion of the gear case base portion 50a, and are hollowed radially outward.

Note that at least any of the motor bracket 51, the clutch ring 53, the mode switching ring 54, and the spindle 55 may be regarded as not a component of the gear assembly 12 but the motor bracket 51 may be regarded as a component of the motor 10. At least any of the chuck 14, the motor front bearing, and the pinion 43 may be regarded as the component of the gear assembly 12.

The gear assembly 12 internally includes three-stage planetary gear mechanisms, decelerates the rotation of the motor shaft, and transmits the rotation to the spindle 55. That is, the gear assembly 12 includes a rear planetary gear mechanism 60 (a deceleration mechanism at the first stage), the intermediate planetary gear mechanism 70 (a deceleration mechanism at the second stage, and a front planetary gear mechanism 80 (a deceleration mechanism at the third stage).

As illustrated in FIG. 33 and FIG. 34, the rear planetary gear mechanism 60 includes an internal gear 62 fixed to the inside of the gear case 50, a plurality (five pieces) of planetary gears 64 having external teeth meshing with internal teeth of the internal gear 62, and a carrier 66 that rotatably supports the respective planetary gears 64 via needle bearings 65.

A plurality (four pieces) of protrusions 62b, which project radially outward from a ring-shaped inner tooth portion 62a, are inserted into a plurality of slits 51e and inner grooves 50d, thus preventing the internal gear 62 from rotating. The plurality of slits 51e are formed on the cylindrical surface of the motor bracket base portion 51a and extend in the front-rear direction. The inner grooves 50d are formed the inner surface of the rear end portion of the gear case base portion 50a, extend in the front-rear direction, and are hollowed radially outward.

The respective planetary gears 64 mesh with the pinion 43 (see FIG. 6) of the motor shaft.

The carrier 66 includes five pieces of pins 66b projecting rearward from a rear surface of a disk-shaped portion 66a with a hole at the center disposed at regular intervals in the circumferential direction. One planetary gear 64 and one needle bearing 65 are supported to each pin 66b. The carrier 66 has an external tooth gear 66c projecting forward from the center of the front surface of the disk-shaped portion 66a in a cylindrical shape. Further, a meshing tooth 66d is disposed on the outer surface of the from portion of the disk-shaped portion 66a.

Since the planetary gear 64 is supported by the needle bearing 65, supporting strength increases compared with the use of a ball bearing. Accordingly, even when the planetary gears 64 are thinned in the axial direction (front-rear direction), the strength to the same extent of that of the ball bearing can be secured, making the planetary gears 64 and the rear planetary gear mechanism 60, and eventually the electric vibration driver drill 1 further compact in the front-rear direction.

A washer 68 is located between the respective planetary gears 64 and the motor bracket 51.

As illustrated in FIG. 32 and FIG. 33, the intermediate planetary gear mechanism 70 includes an internal gear 72, a plurality (five pieces) of planetary gears 74 having external teeth meshing with the internal teeth of the internal gear 72, and a carrier 76 that rotatably supports the respective planetary gears 74.

On an outer surface of a front portion of a ring-shaped inner tooth portion 72a of the internal gear 72, a plurality of external teeth 72b projecting in the radial direction and extending in the front-rear direction are disposed at predetermined intervals in the circumferential direction. A coupling groove 72c extending in the circumferential direction is disposed on the outer surface of the rear portion of the inner tooth portion 72a. Additionally, a meshing tooth 72d is disposed on a side portion of an opening of the rear surface of the internal gear 72 and configured to mesh with the meshing tooth 66d of the carrier 66 at the first stage.

The respective planetary gears 74 mesh with the external tooth gear 66c of the carrier 66 at the first stage.

The carrier 76 includes five pieces of pins 76b projecting rearward from a rear surface of a disk-shaped portion 76a with the hole at the center, and one planetary gear 74 is supported to each pin 76b. The carrier 76 includes an external tooth gear 76c projecting forward in a cylindrical shape from the center of the front surface of the disk-shaped portion 76a.

As illustrated in FIG. 32, on the front side outside the internal gear 72, a coupling ring 77 held to the rear portion inside the gear housing 52 is located. On an inner peripheral surface of a circular coupling ring base portion 77a in the coupling ring 77, internal teeth 77b projecting radially inward and extending in the front-rear direction are disposed by the identical number to external teeth 72b of the internal gear 72. On the outer peripheral surface of the coupling ring base portion 77a, a plurality (six pieces) of projections 77c projecting outward and extending in the front-rear direction are disposed at predetermined intervals in the circumferential direction. The respective external teeth 72b of the internal gear 72 can enter between any of the internal teeth 77b in the coupling ring 77.

The respective projections 77c enter between a plurality of corresponding arc-shaped ribs 50e and inner grooves 52d, thus preventing the coupling ring 77 from rotating. The arc-shaped ribs 50e are formed on the front end portion of the gear case base portion 50a at regular intervals in the circumferential direction. The inner grooves 52d are formed on the inner surface of the rear end portion of the outer tubular portion 52a of the gear housing 52, extend in the front-rear direction, and are hollowed radially outward. A projecting portion 50f projecting radially outward is formed on a surface radially outward of the lower arc-shaped rib 50e. The projecting portion 50f enters inner grooves 52e, which are formed on the inner surface of the rear end portion of the outer tubular portion 52a of the gear housing 52, extend in the front-rear direction, and are hollowed radially outward.

Meanwhile, as illustrated in FIG. 33, a speed switching ring 78 is located outside the rear portion of the internal gear 72. On an upper portion of a circular speed switching ring base portion 78a in the speed switching ring 78, a coupling piece 78b projects rearward and upward in an "L" shape in side view. Respective projecting pieces 78e project radially outward and rearward on the left portion, the right portion, and the lower portion of the speed switching ring base portion 78a.

As illustrated in FIG. 34, the gear case 50 includes a slit 50g entering forward from the upper rear portion, a lower end portion of an upper projecting part of the coupling piece 78b enters the slit 50g. The upper portion of the upper projecting part of the coupling piece 78b is joined to the lower portion of a speed switching lever 79 (see FIG. 1, FIG. 2, and FIG. 4), which is disposed to be slidable back and forth on the upper portion of the housing 2, via coil springs (elastic bodes, not illustrated) arranged in the front-rear direction. The speed switching lever 79 has a front portion entering a hole portion 52f having a hole formed so as to extend forward from the rear end on the upper portion of the outer tubular portion 52a of the gear housing 52. The upper screw-hole portions 57 are located on both right and left sides of the hole portion 52f.

As illustrated in FIG. 33, guide grooves 50b in the front-rear direction corresponding to the respective projecting pieces 78c of the speed switching ring 78 are disposed on the inner surface of the gear case base portion 50a. The corresponding projecting pieces 78c enter the respective guide grooves 50h to support the speed switching ring 78 such dial the speed switching ring 78 moves only in the front-tear direction.

Pins 78d two in total heading from radially outward to inward of the right and left projecting pieces 78e are disposed. Outer heads of the respective pins 78d abut on the outer surfaces of the respective right and left projecting pieces 78c. Inner distal ends thinner than the heads of the respective pins 78d project radially inward from the timer surfaces of the respective projecting pieces 78c and enter the coupling groove 72c of the internal gear 72.

The speed switching lever 79 is moved forward, which causes the speed switching ring 78 to move forward through the coupling piece 78b. Accordingly, the internal gear 72 moves forward while the internal gear 72 keeps the meshing with the respective planetary gears 74 via the respective pins 78d and the coupling groove 72c. Then, the respective external teeth 72b enter between the internal teeth 77b of the coupling ring 77 to restrict the circumferential rotation of the internal gear 72. The respective planetary gears 74 rotate around the fixed internal gear 72, and the rotation decelerated more than the rotation of the external tooth gear 66c at the first stage is transmitted to the external tooth gear 76c of the carrier 76. That is switching the speed switching lever 70 forward sets a low speed mode that functions the deceleration by the intermediate planetary gear mechanism 70 at the second stage.

Meanwhile, as illustrated in FIG. 37 and FIG. 41, the speed switching lever 79 (see FIG. 1, FIG. 2, and FIG. 4) is moved rearward similarly, which causes the speed switching ring 78 to move rearward. Accordingly, the internal gear 72 moves rearward while keeping the meshing with the respective planetary gears 74. Then, the respective external teeth 72b exit between the internal teeth 77b of the coupling ring 77 to release the rotation restriction in the circumferential direction on the internal gear 72. Thus, the meshing tooth 72d of the internal gem 72 meshes with the meshing tooth 66d of the carrier 66 at the first stage, the internal gear 72 not fixed in the circumferential direction rotates together with the earner 66 at the first stage, and the rotation equivalent to the rotation of the external tooth gear 66c is transmitted to the external tooth gear 76c. That is, the speed switching lever 79 in a rearward position sets a high speed mode that cancels the deceleration by the intermediate planetary gear mechanism 70 at the second stage.

A rib 78e extending back and forth and projecting downward is disposed at the center in the right-left direction of the lower surface of the coupling piece 78b. Accordingly, the rib 78e secures a rigidity of the coupling piece 78b and prevents warping, thus stabilizing the position of the internal gear 72 after the movement by the speed switching ring 78. The rib 78e enters a groove 51f, which is disposed on the top surface of the motor bracket base portion 51a so as to extend in the front-rear direction and be hollowed downward. The slit 50g of the gear case 50 is positioned on the upper side of the groove 51f.

As illustrated FIG. 30 and FIG. 31, the front planetary gear mechanism 80 includes an internal gear 82 disposed rotatable in the circumferential direction in the gear housing 52, a plurality (six pieces) of planetary gears 84 having external teeth meshing with the internal teeth of the internal gear 82, and a carrier 86 that rotatably supports the respective planetary gears 84. On a front surface of a cylindrical inner tooth portion 82a in the internal gear 82, a plurality (six pieces) of cam protrusions 82b projecting forward are disposed at predetermined intervals in the circumferential direction. On the outer surface of the inner tooth portion 82a, a plurality (six pieces) of projecting portions 82c projecting radially outward are disposed. The projecting portions 82c are each located at the center between the cam protrusions 82b in the inner tooth portion 82a.

The respective planetary gears 84 mesh with the external tooth gear 76c of the carrier 76 at the second stage.

The carrier 86 includes a plurality (six pieces) of pins 86b projecting rearward from a rear surface of a disk-shaped portion 86a with a hole at the center, and one planetary gear 84 is supported to each pin 86b. Additionally, the carrier 86 includes a plurality (four pieces) of projecting bodies 86c (see FIG. 14, FIG. 28A, and the like) projecting forward from the center of the front surface of the disk-shaped portion 86a in a quarter cylindrical shape arranged in the circumferential direction.

As illustrated in FIG. 19 and FIG. 20, the clutch ring 53 is located radially outward of an inner tubular portion 52g in the gear housing 52. The inner tubular portion 52g has a cylindrical shape having a diameter smaller than that of the outer tubular portion 52a. The inner tubular portion 52g has a front end positioned forward with respect to the from end of the outer tubular portion 52a.

The clutch ring 53 has a circular groove 53b hollowed forward from a rear end portion of a cylindrical clutch ring base portion 53a with an uneven outside. The clutch ring 53 is rotatably disposed around the axis while the groove 53b is inserted into a pan on the front side with respect to a circular rib 52h (see FIG. 10. FIG. 13, and the like), which is formed so as to project radially outward in a front opening of the outer tubular portion 52a of the gear housing 52.

On the inner surface radially outward of the groove 53b of the clutch ring 53, a plurality of respective positioning depressed portions 53c are formed at regular intervals in the circumferential direction so as to be each depressed radially outward. Meanwhile, on the upper right of the front opening of the outer tubular portion 52a of the gear housing 52, a pair of profusions 52i projecting forward are disposed. A leaf spring 88 bulging radially outward at its center and biased radially outward is locked to these protrusions 52i. The bulge portion of the leaf spring 88 can enter any of the positioning depressed portions 53c, provides a clicking feeling to the rotation of the clutch ring 53, and positions the clutch ring 53 in the rotation direction.

Moreover, a screw portion 53d having a spiral thread is disposed on the inner surface of the clutch ring base portion 53a.

As illustrated in FIG. 19 and FIG. 20, a ring-shaped spring holder 90 is located radially inward of the clutch ring 53.

On an outer surface of a cylindrical spring holder base portion 90a of the spring holder 90, a screw portion 90b having a thread meshing with the screw portion 53d of the clutch ring 53 is formed. The rotation of the clutch ring 53 moves the spring holder 90 in the front-rear direction.

The spring holder base portion 90a has the rear portion including flange portions 90c (see FIG. 15, FIG. 24, and the like) three positions in total and spring holders 90d (see FIG. 15, FIG. 17, FIG. 18, and the like). The flange portions 90c project radially outward in a semicircular shape at a plurality of (12) positions from the tat portion, and parts radially inward of the semicircular projecting portions are coupled in the predetermined number (four pieces) of sets. The respective spring holders 90d project in columnar shapes rearward from the respective semicircular projecting portions of the flange portions 90c. Bottoms 90e hollowed circumstantially inward with respect to the outer shapes of the respective flange portions 90c are formed between the respective flange portions 90c in the circumferential direction (see FIG. 15, FIG. 24, and the like).

Between the predetermined spring holders 90d, ribs 90f projecting rearward from the rear end portion of the spring holder base portion 90a are disposed (see FIG. 15, FIG. 17, and the like). The respective ribs 90f have projection heights to the rear similar to projection heights of the spring holders 90d. The respective ribs 90f restrict movements outward in the radial direction of various members located inward in the radial direction and hold these members to prevent these members from dropping.

Further, the lower flange portion 90c includes a projecting piece 90g projecting radially outward between the semicircular projecting portions in the lower portion.

As illustrated in FIG. 26, the respective spring holders 90d hold clutch pin coil springs 92 as elastic bodies. On the rear sides of the respective clutch pin coil springs 92, one washer 94 having a shape similar to that of the flange portion 90c is disposed. The respective clutch pin coil springs 92 have front ends abutting on the rear surfaces of the flange portions 90c of the spring holder 90, and the rear ends of the respective clutch pin coil springs 92 abut on the front surface of the washer 94.

The washer 94 includes a plurality of (12 positions) projecting portions 94b projecting radially outward in a semicircular shape from a ring-shaped washer base portion 94a. Additionally, extended portions 94c, which extend in an arc shape radially inward from radially inner part of the washer base portion 94a, are disposed at six positions in total between mutually adjacent semicircular projecting portions projecting radially outward in the washer 94. Further, bottoms 94d are disposed at three positions in total formed similarly to the bottoms 90e of the spring holder 90. A projecting piece 94e projecting radially outward is disposed between the projecting portions 94b in the lower portion of the washer 94.

As illustrated in FIG. 19 to FIG. 26, the spring holder 90, the clutch pin coil springs 92, and the washer 94 are inserted between the inner tubular portion 52g and the outer tubular portion 52a in the gear housing 52. The inner surface of the front portion of the outer tubular portion 52a has an outer shape similar to that of the flange portion 90c or the washer 94. The flange portions 90c and the projecting piece 90g prevent the spring holder 90 from rotating. The projecting portions 94b and the projecting piece 94e prevent the washer 94 from rotating. Note that at least one of the projecting pieces 90g and 94e may be omitted.

As illustrated in FIG. 28A, a front surface of a ring-shaped wall body part 52j, which expands up and down and right and left to couple an inner tubular portion 52g and the outer tubular portion 52a together, of the gear housing 52 has a shape similar to those of the flange portion 90c and the washer 94. Circular holes are bored on parts positioned on the rear sides of the respective extended portions 94c of the washer 94 in the wall body part 52j. Into these holes, respective columnar clutch pins 96 are inserted from the front side via cylindrical clutch pin sleeves 95.

As illustrated in FIG. 28A and FIG. 28B, the clutch pin sleeves 95 each include a cylindrical clutch pin sleeve base portion 95a and a pair of flanges 95b projecting radially outward from the outer surface of the front end portion of the clutch pin sleeve base portion 95a. The respective flanges 95b are opposed to one another. Thus, arrangements of the respective flanges 95b increases the parts supported by the gear housing 52. Further, lengths of the clutch pin sleeve 95 and the clutch pin 96 in the front-rear direction become short while the support strength is maintained.

The respective clutch pins 96 have columnar shapes whose rear end portions are rounded off into spherical surfaces. The front portions are inserted into the clutch pin sleeve base portions 95a to hold the clutch pins 96 integrally with the clutch pin sleeves 95.

The front end portions of the respective clutch pin sleeves 95 and the front end portions of the respective clutch pins 96 contact the rear surface of the washer 94.

The respective clutch pins 96 have the rear end portions that can contact the front surface of the cylindrical inner tooth portion 82a in the internal gear 82 of the front planetary gear mechanism 80.

When the rotation position of the clutch ring 53 is changed by twisting, the front-rear position of the spring holder 90 changes. Accordingly, a distance between the flange portions 90c and the washer 94 is changed, and the elastic forces of the respective clutch pin coil springs 92 are adjusted. Due to the elastic forces from the clutch pin coil springs 92, the washer 94 pushes the respective clutch pins 96 via the clutch pin sleeves 95. The clutch pins 96 each abut on any of the cam protrusions 82b in the internal gear 82 at the third stage to rotate and restrict the rotation of the internal gear 82 according to the elastic forces from the clutch pin coil springs 92.

That is as illustrated in FIG. 30, the respective clutch pins 96 press the front surface of the internal gear 82 according to the elastic forces from the respective clutch pin coil springs 92, retain the cam protrusions 82b at less than a predetermined torque according to the elastic forces, and fix the internal gear 82. The cam protrusion 82b has a side surface including a narrow portion narrowed down into a spherical surface matching the shape of the rear end portion of the clutch pin 96. The clutch pins 96 in contact with the narrow portions can sufficiently resist the rotational force of the internal gear 82 at the third stage. As illustrated in FIG. 29, when the torque is the predetermined torque or more, the cam protrusions 82b move the respective clutch pins 96 forward against the elastic forces, thus performing relative crossing. The narrow portions facilitate the crossing smoothly. By the relative crossing, the respective clutch pins 96 permit the internal gear 82 to rotate. As long as another member does not block the rotation of the internal gear 82, the rotation of the internal gear 82 idles the carrier 86 (respective projecting bodies 86c) and causes the clutch to operate.

The spring holder 90, the respective clutch pin coil springs 92, the washer 94, the respective clutch pin sleeves 95, and the respective clutch pins 96 are components of u clutch mechanism 99. Note that the clutch mechanism 99 may include the cam protrusions 82b. Further, at least one of the respective clutch pin sleeves 95 and the washer 94 may be omitted.

In the electric vibration driver drill 1, the respective clutch pin coil springs 92 are not one large coil spring but are divided into plural (12 pieces). Thus, a spring constant can be further increased, a close contact length can be further decreased, and a length in the front-rear direction can be further shortened compared with the use of the one large coil spring. Additionally, the various members can be located between the clutch pin coil springs 92 without interference to the operation of the clutch pin coil springs 92, making the electric vibration driver drill 1 compact by the amount.

As illustrated in FIG. 24 and FIG. 25, a support ring 100 and a pin holder 102 on the rear side of the support ring 100 are located radially inward of the spring holder 90.

The support ring 100 includes a plurality of (three positions) trapezoidal cam protrusions 100b on a front end portion of a cylindrical support ring base portion 100a having the axial direction in the front-rear direction. The cam protrusions 100b projecting forward with respect to the other part are formed at regular intervals from one another in the circumferential direction (see FIG. 15, FIG. 20, and the like). A plurality of (three positions) projecting pieces 100c projecting rearward from the rear end portion of the support ring base portion 100a are located between the cam protrusions 100b in the circumferential direction (see FIG. 15 and the like).

The pin holder 102 includes concave portions 102b (see FIG. 15 and the like), a plurality of (six positions) spring holders 102c (see FIG. 15 and the like), and a plurality of (three positions) pin holders 102d. The concave portions 102b are disposed on the front end portion of a cylindrical pin holder base portion 102a having the axial direction in the front-rear direction so as to correspond to the projecting pieces 100c of the support ring 100. The respective spring holders 102c projecting radially inward and rearward from the inner surface of the pin holder base portion 102a are located at regular intervals in the circumferential direction. The respective pin holders 102d projecting radially outward from the outer surface of the pin holder base portion 102a are located at regular intervals in the circumferential direction. The concave portions 102b and the pin holders 102d are displaced from one another in the circumferential direction.

Front end portions of pin holder coil springs 104 as elastic bodies are inserted into parts projecting rearward in the respective spring holders 102c. The pin holder coil springs 104 have rear portions inserted into hollow portions 52k (see FIG. 25, FIG. 28A, and the like) each formed to be hollowed in columnar shapes rearward from the front surface of the wall body part 52j of the gear housing 52. The respective hollow portions 52k are formed six in total located similarly to the spring holders 102c. The pin holder coil springs 104 bias the pin holder 102 forward.

As illustrated in FIG. 24 and FIG. 25, the front end portions of columnar internal gear lock pins 106 extending in the front-rear direction are held to the respective pin holders 102d. The front end portions of the internal gear lock pins 106 form circular grooves, and the distal end portions of the forked pin holders 102d are inserted into the grooves.

The respective pin holders 102d and the respective internal gear lock pins 106 pass through between the predetermined clutch pin coil springs 92 and outside the bottoms 90e and 94d of the spring holder 90 and the washer 94 (see FIG. 24, FIG. 26, and the like). Further, the respective internal gear locking pins 106 pass through pin holes 52l. The pin holes 52l are bored in the wall body part 52j of the gear housing 52 to correspond to the internal gear locking pins 106 (see FIG. 25). The rear end portions of the respective pin holders 102d can advance and retreat with respect to radially outward of the internal gear 82 at the third stage.

As illustrated in FIG. 21, the mode switching ring 54 includes a mode switching ring base portion 54a having a tapered cylindrical shape tapered toward the front and with the uneven outside, and a cam portion 54b projecting in a cylindrical shape rearward from the rear end portion of its inner surface.

The cam portion 54b includes cam depressed portions 54c depressed forward in trapezoidal shapes, which are located similarly to the cam protrusions 100b of the support ring 100, three positions in total (see FIG. 15, FIG. 19, FIG. 36, FIG. 39, and the like). The support ring 100 is located on the rear side of the cam portion 54b.

As illustrated in FIG. 11, FIG. 13, FIG. 15, and FIG. 40, a rotation restricting rib 54d projecting radially inward in a ring shape is disposed on the inner surface of the mode switching ring 54 and the from side of the cam portion 54b. A rotation permitting concave portion 54e depressed radially outward is formed on the upper portion of the rotation restricting rib 54d. A pair of leaf spring lock portions 54f are formed on the lower portion of the rotation restricting rib 54d to lock a leaf spring 114 as an elastic body.

The mode switching ring 54 is mounted to be rotatable around the axis with the cam portion 54b located radially outward of the inner tubular portion 52g of the gear housing 52. To the front end portion of the inner tubular portion 52g, a ring-shaped retainer 110 is fixed with a plurality (four pieces) of screws 112. The mode switching ring 54 is sandwiched between the retainer 110 and the clutch ring 53.

As illustrated in FIG. 11 and FIG. 40, the retainer 110 includes a circular retainer base portion 110a, respective screw-holes 110b disposed on the retainer base portion 110a through which the screws 112 pass, a projecting piece 110c projecting radially outward from the outer side of the retainer base portion 110a, and a plurality of (three positions) notches 110d hollowed radially inward from the outer side of the retainer base portion 110a on a side opposed to the projecting piece 110c.

The respective screw-holes 110b are located so as not to form a rotation symmetry with respect to the center of the retainer base portion 110a. A plurality of screw-hole portions 52m are formed on the front end portion of the inner tubular portion 52g located similarly to the respective screw-holes 110b to receive the screws 112. The non-rotation symmetry locations of the respective screw-holes 110b and the respective screw-hole portions 52m prevents the retainer 110 from being mounted in an incorrect orientation of the retainer 110.

The projecting piece 110c is positioned inside the rotation permitting concave portion 54e of the mode switching ring 54 viewed in the circumferential direction.

The notches 110d are located at regular intervals in the circumferential direction in a predetermined arc. A bulge portion radially inward in the leaf spring 114 can enter any one of the notches 110d.

Rotating the mode switching ring 54 to the left viewed from the rear against the biasing force from the leaf spring 114 from a state where the leaf spring 114 enters the center notch 110d (referred to as a center state, see FIG. 11), the leaf spring 114 enters the right notch 110d (referred to as a left state, see FIG. 40). At this time, the projecting piece 110c is positioned at the end portion of the rotation permitting concave portion 54e, and the additional left rotation is restricted by the rotation restricting rib 54d. Similarly, the right rotation from the center state enters the leaf spring 114 into the left notch 110d (referred to as a right state), and the additional right rotation is restricted.

As illustrated in FIG. 25 and FIG. 27, between the mode switching ring 54 and the clutch ring 53, a plurality (five pieces) of balls 120 made of steel are disposed as sliding members.

Five pieces of hollow portions 54g, which are hollowed forward from the rear surface of the mode switching ring base portion 54a, are located at regular intervals in the circumferential direction. The balls 120 are entered into the respective hollow portions 54g via circular plates 122 made of steel. Meanwhile, a ring-shaped groove 53e is formed on the front surface of the clutch ring base portion 53a, and a washer 124 made of steel is inserted into the groove 53e. The rear portions of the respective balls 120 contact the washer 124.

Relatively rotating the mode switching ring 54 and the clutch ring 53 causes the respective balls 120 to roll between the circular plates 122 and the washer 124, reducing a friction between the mode switching ring 54 and the clutch ring 53.

As illustrated in FIG. 11, FIG. 30, and FIG. 36 to FIG. 39, with the mode switching ring 54 in the center state or the right state, parts of the cam portion 54b other than the cam depressed portions 54c contact the front end portions of the respective cam protrusions 100b of the support ring 100 and the support ring 100 is positioned rearward. Then, the pin holder 102 is positioned rearward and the respective internal gear lock pins 106 enter between the projecting portions 82c in the circumferential direction, radially outward of the internal gear 82 at the third stage. The respective internal gear lock pins 106 abut on the side surfaces of the projecting portions 82c to block the rotation of the internal gear 82 at the third stage.

Meanwhile, as illustrated in FIG. 40 to FIG. 42, with the mode switching ring 54 in the left state, the respective cam protrusions 100b enter the cam depressed portions 54c, and the support ring 100 is positioned forward. Then, the pin holder 102 is positioned forward, and the respective internal gear lock pins 106 escape from radially outward of the internal gear 82 at the third stage. Accordingly, the respective internal gear lock pins 106 do not interfere with the rotation of the internal gear 82 at the third stage. Therefore, the internal gear 82 at the third stage starts rotating at the torque according to the rotation position of the clutch ring 53, and the clutch operates (the clutch mode).

The respective pin holder coil springs 104 bias the support ring 100 via the pin holder 102, thus promoting the entrance of the respective cam protrusions 100b to the cam depressed portions 54c. In the case where the mode switching ring 54 is rotated to turn into another state from the left state, the respective cam protrusions 100b are detached from the cam depressed portions 54c against the biasing forces from the respective pin holder coil springs 104, and the pin holder 102 is positioned rearward.

As illustrated in FIG. 28A, a pair (right and left in the drawing) of respective rollers 130 are located in opposed respective projecting bodies 86c of the carrier 86 at the third stage.

A lock cam 132 is located in another pair (the upper and lower sides in the drawing). The lock cam 132 includes a cylindrical portion 132a and a pair of projecting pieces 132b projecting radially outward from the top and the bottom of the cylindrical portion 132a, and the respective projecting pieces 132b are positioned between the projecting bodies 86c. The cylindrical portion 132a of the lock cam 132 has a center hole spline-coupled to the rear stepped portion 55d of the spindle 55, and the lock cam 132 is integrated with the spindle 55. The lock cam 132 rotates together with the carrier 86 at the third stage via the respective projecting bodies 86c. The lock cam 132 has a front side covered with a cylindrical lock ring 134. The lock ring 134 is fixed to the inside of the inner tubular portion 52g of the gear housing 52. The lock ring 134 includes a cylindrical lock ring base portion 134a, an inner flange 134b projecting inward from the inner surface of the from end portion of the lock ring base portion 134a, an outer flange 134c projecting outward from the outer surface of the rear end portion of the lock ring base portion 134a, and a plurality of (three positions) projecting portions 134d projecting radially outward from the side surface of the lock ring base portion 134a and further projecting forward located at regular intervals in the circumferential direction. On the rear side of the inner flange 134b, the respective rollers 130, the lock cam 132, and the respective projecting bodies 86c of the carrier 86 at the third stage are positioned. The projecting portions 134d enter the inner surface of the inner tubular portion 52g of the gear housing 52 formed so as have the corresponding shape to fix the lock ring 134 unrotatable.

As illustrated in FIG. 15 to FIG. 18 and FIG. 26, the spindle 55 is held to be movable back and forth and rotatable around the axis with a spindle rear bearing 138, which is located on the front side of the lock ring 134, and a spindle front bearing 140, which is located radially outward of the front stepped portion 55b.

The spindle front bearing 140 is located outside the front stepped portion 55b of the spindle 55.

Between the spindle front bearing 140 and the spindle flange 55a, a spindle coil spring 144 as an elastic body is disposed. The rear surface of the spindle flange 55a and the spindle coil spring 144 have inverted tapered shapes expanding forward whose diameters gradually expand toward the front.

Meanwhile, a clip 146 that presses (a front surface of an outer race of) the spindle rear bearing 138 enters a groove disposed on the inner surface of the inner tubular portion 52g of the gear housing 52.

As illustrated in FIG. 14, FIG. 16 to FIG. 18, FIG. 19, FIG. 20, and FIG. 22, between the spindle front bearing 140 and the clip 146, a vibration mechanism 150 is located. The vibration mechanism 150 includes a first vibration cam 152 and a second vibration cam 154 each having a ring shape and held to the intermediate stepped portion 55c of the spindle 55.

A first cam surface 152b having a plurality of cam teeth is formed on the rear surface of a cylindrical first vibration cam base portion 152a in the first vibration cam 152. The first vibration cam 152 is fixed integrally with the spindle 55 with a circlip 156, which is fixed outside the front end portion in the intermediate stepped portion 55c of the spindle 55.

In an ordinary state, the spindle 55 is biased to an advance position where the circlip 156 contacts (an inner race of) the spindle front bearing 140 by the spindle coil spring 144.

A second cam surface 154b having a plurality of cam teeth is formed on a front surface of a ring-shaped second vibration cam base portion 154a in the second vibration cam 154. On the rear surface of the second vibration cam base portion 154a, a plurality (three pieces) of nails 154c projecting rearward are disposed at regular intervals in the circumferential direction. The second vibration cam 154 is placed on the outer circumferential surface of the spindle 55 so as not to be fixed in the circumferential direction.

Between the second vibration cam 154 and the clip 146, a ball holding washer 160, a plurality of balls 162 made of steel, and a ball receiving washer 164 are disposed.

As illustrated in FIG. 22, the ball holding washer 160 is adjacent to the rear surface of the second vibration cam base portion 154a. The ball holding washer 160 having a bowl shape with its inner peripheral portion as the front end and its outer peripheral portion as the rear end, holds the respective balls 162 on the side of the curved rear surface, and arranges the respective balls 162 in the circumferential direction.

As illustrated in FIG. 23, the ball receiving washer 164 includes a plurality of (three positions) convex portions 164b and respective narrow portions 164c. The convex portions 164b projecting radially outward from a circular ball receiving washer base portion 164a are located at regular intervals in the circumferential direction. The narrow portions 164c are located between the respective convex portions 164b in the circumferential direction. The rotation of the ball receiving washer 164 is prevented by entering the respective convex portions 164b into concave portions 52n, which are disposed on the inner surface of the inner tubular portion 52g of the gear housing 52.

Note that at least any of the circlip 156, the ball holding washer 160, the balls 162, and the ball receiving washer 164 may be included in the vibration mechanism 150.

As illustrated in FIG. 15 to FIG. 24, a vibration switching ring 170 is disposed radially inward of the cam portion 54b of the mode switching ring 54. On the rear side of the vibration switching ring 170, one set (three pieces) of vibration switching levers 172 having an are shape one-third of the circumference are disposed. A washer 174 is disposed on the rear side of the vibration switching levers 172.

The vibration switching ring 170 includes a plurality of (three positions) protrusions 170b and a plurality of (three positions) trapezoidal cam depressed portions 170c. The protrusions 170b project radially outward from a front end portion of a cylindrical vibration switching ring base portion 170a located at regular intervals in the circumferential direction. The cam depressed portions 170c are depressed forward from the rear end portion of the vibration switching ring base portion 170a located at positions identical to the protrusions 170b in the circumferential direction. The respective protrusions 170b enter hollow portions 54h (see FIG. 13), which are correspondingly disposed on the rear portion of the cam portion 54b of the mode switching ring 54, and the vibration switching ring 170 rotates integrally with the mode switching ring 54.

The vibration switching lever 172 includes a vibration switching lever base portion 172a having a "U" shape in cross section opening forward, a bulge portion 172b (see FIG. 17, FIG. 21, and the like) bulging forward with shapes corresponding to the cam depressed portions 170c in the vibration switching lever base portions 172a, and a vibration switching claw 172c (see FIG. 22, FIG. 23, and the like) projecting radially inward and rearward from the center of the outer surface radially inward of the vibration switching lever base portion 172a. The respective vibration switching levers 172 are located radially outward of the inner tubular portion 52g in a state where the vibration switching claws 172c enter any of holes 52o (see FIG. 15) bored at three locations at regular intervals in the circumferential direction at centers in the front-rear direction of the inner tubular portion 52g of the gear housing 52. The vibration switching lever 172 is located inside the support ring 100.

As illustrated in FIG. 22 and FIG. 23, the respective vibration switching claws 172c are positioned radially outward of narrow portions 164c of the ball receiving washer 164. That is, the ball receiving washer 164 includes the narrow portions 164c so as to avoid the respective vibration switching claws 172c.

Further, the respective vibration switching claws 172c are configured to advance and retreat with respect to between the claws 154c, which project rearward on the rear side of the second vibration cam base portion 154a.

Respective pin holes 52p extending back and forth are bored between the holes 52o at three positions in the inner tubular portion 52g of the gear housing 52 and parts adjacent to the hollow portions 52k at the six positions in the circumferential direction (see FIG. 21, FIG. 27, and the like). Pins 180 are inserted from rearward into the respective pin holes 52p. The pin holes 52p each have a front portion enlarged with respect to the rear portion. Between the enlarged portions and the front portions of the respective pins 180, vibration switching lever coil springs 182 as elastic bodies are inserted. The respective vibration switching lever coil springs 182 have front end portions contacting the washer 174 on the rear side of the respective vibration switching levers 172. The respective vibration switching lever coil springs 182 bias the washer 174 and the respective vibration switching levers 172 forward.

As illustrated in FIG. 22 and FIG. 23, with the mode switching ring 54 in the center state or the left state, parts other than the cam depressed portions 170c in the rear end portion of the vibration switching ring base portion 170a contact the front end portions of the bulge portions 172b of the respective vibration switching levers 172, so that the respective vibration switching levers 172 are positioned rearward. Then, the respective vibration switching nails 172c are positioned rearward, separate from between the nails 154c of the second vibration cam 154 to permit the rotation of the second vibration cam 154. Although the rotation of the spindle 55 integrally rotates the first vibration cam 152 and the second vibration cam 154 also rotates appropriately via the first cam surface 152b and the second cam surface 154b, since the rotation of the second vibration cam 154 is permitted with the second vibration cam 154 being placed on the outer circumferential surface of the spindle 55, the vibration does not occur.

In contrast to this, as illustrated in FIG. 38, with the mode switching ring 54 in the right state, the corresponding bulge portions 172b enter the respective cam depressed portions 170c, and the respective vibration switching levers 172 are positioned forward. Then, the respective vibration switching nails 172c are positioned forward and enter between the nails 154c of the second vibration cam 154 to block the rotation of the second vibration cam 154. While the rotation of the spindle 55 integrally rotates the first vibration cam 152, the second vibration cam 154 does not rotate; therefore, the retreat of the spindle 55 rotates the first cam surface 152b while in contact with the fixed second cam surface 154b, thus generating the axial vibration in the spindle 55 (vibration mode).

When the respective vibration switching levers 172 are positioned forward, the rear end portion of the vibration switching ring base portion 170a relatively enters the respective vibration switching lever base portions 172a to increase contact of the respective vibration switching levers 172 and contact of the vibration switching ring 170 and the respective vibration switching levers 172. Therefore, when the vibration occurs, obstructiveness of parts forward with respect to the respective vibration switching levers 172 (inside the inner tubular portion 52g of the gear housing 52) is secured, a dust-proof performance is secured, and a leakage of grease applied to the inside of this part is prevented.

Further, the respective vibration switching lever coil springs 182 bias the respective vibration switching levers 172 forward to facilitate entry of the respective bulge portions 172b into the cam depressed portions 170c. In the case where the mode switching ring 54 is rotated from the right state to another state, against the biasing forces from the respective vibration switching lever coil springs 182, the respective bulge portions 172b separate from the cam depressed portions 170c, and the respective vibration switching levers 172 are positioned rearward.

The following describes an operation example of such electric vibration driver drill 1.

When a worker grips the grip portion 6 to pull the switch lever 8, switching in the switch main body 9 feeds the power from the battery 32 to the motor 10 to rotate the rotor 41 (motor shaft).

The rotation of the motor shaft rotates the fan 44. Exhausting air to the respective exhaust outlets 22a of the fan 44 generates an airflow (wind) from the air inlets 20c. Such a wind cools the mechanism inside the housing 2 including the motor 10.

The rotational force of the motor shaft is decelerated by the gear assembly 12 having the three-stage deceleration mechanism, is transmitted to the spindle 55, and then is transmitted to a drill or a bit such as a driver attached to the chuck 14.

The intermediate planetary gear mechanism 70 in the gear assembly 12 operates in the high speed mode or the low speed mode according to the position of the speed switching lever 79.

Further, according to the rotation position of the mode switching ring 54, the three operation modes are selectable.

That is, with the mode switching ring 54 in the left state, the clutch mode is selected. When a torque corresponding to the rotation position of the clutch ring 53 is applied to the spindle 55, the front planetary gear mechanism 80 generates idling to throw out the clutch (slop the torque transmission). The screw tightening proceeds with a driver bit, and when the screw is fully inserted and the large torque is applied, the spindle 55 idles and thus the screw tightening is terminated.

Meanwhile, with the mode switching ring 54 in the right state, the vibration mode is selected. The respective vibration switching levers 172 lock the rotation of the second vibration cam 154, the retreat of the spindle 55 during rotation frictions the first cam surface 152b and the second cam surface 154b together, thus causing the axial vibration in the spindle 55.

On the other hand, with the mode switching ring 54 in the center state, the internal gear 82 of the front planetary gear mechanism 80 is fixed and the second vibration cam 154 is allowed to rotate, thus entering the drill mode in which the clutch does not operate and the vibration does not occur. In the drill mode, the spindle 55 is rotated without throwing out the clutch, and when the worker installs the drill bit to advance drilling, the rotation of the spindle 55 continues regardless of a load on the spindle 55.

The above-described electric vibration driver drill 1 includes the housing 2 (gear housing 52), the mode switching ring 54 (first ring) and the clinch ring 53 (second ring) each externally mounted to the housing 2 to be rotatable, and the respective balls 120 (sliding members) located between the mode switching ring 54 and the clutch ring 53. Accordingly, the friction between the mode switching ring 54 and the clutch ring 53 is reduced, and therefore the mode switching ring 54 and the clutch ring 53 easily rotate.

Since the sliding members are the respective balls 120, the sliding members are further easily located compared with the use of cylindrical bearings.

Further, the respective circular plates 122 are interposed between the mode switching ring 54 and the respective balls 120, and the washer 124 is interposed between the clinch ring 53 and the respective balls 120. Accordingly, compared with the case of the respective balls 120 directly contacting the mode switching ring 54 or the clutch ring 53, the rotations of the balls 120 are further smoothened, and service lives of the respective balls 120, the mode switching ring 54, and the clutch ring 53 are further lengthened.

Moreover, the electric vibration driver drill 1 includes the housing 2 (gear housing 52), the vibration mechanism 150 and the clutch mechanism 99 each located inside the housing 2, the mode switching ring 54 (vibration switching ring) configured to operate the vibration mechanism 150 and rotatably held to the housing 2, the clutch ring 53 (clutch switching ring) configured to operate the clutch mechanism 99 and rotatably held to the housing 2, and the respective balls 120 located between the mode switching ring 54 and the clutch ring 53. Accordingly, the friction between the mode switching ring 54 and the clutch ring 53 is reduced, and therefore the mode switching ring 54 and the clutch ring 53 easily rotate.

Further, the mode switching ring 54 operates the presence/absence of the vibration of the spindle 55 (output shaft) by the vibration mechanism 150 by whether to set the vibration mode (right state) or not. The clutch ring 53 operates the torque for causing the clutch to operate in the clutch mechanism 99 by the change in the rotation position. Therefore, the mode switching ring 54 and the clutch ring 53 easy to rotate and facilitate commanding the presence/absence of the vibration and the clutch operation torque.

Configurations and modification examples of the disclosure are not limited to the above-described configurations and modification example, and, for example, additional modifications as follows can be appropriately applied.

At least one of the circular plates 122 and the washer 124 may be omitted. The circular plates 122 may be located on the clutch ring 53 side, and the washer 124 may be located on the mode switching ring 54 side. The circular plates 122 may be located on both sides, and the washers 124 may be located on both sides.

Instead of the balls 120 or together with the balls 120, a washer (sliding member) made of resin having smooth front surface and rear surface may be employed. Without the use of the balls 120, the mode switching ring 54 and the clutch ring 53 slide on the smooth surfaces of the washer to reduce the friction.

These locations may be changed to, for example, the mode switching ring 54 being located on the rear side of the clutch ring 53. Further, at least any of the mode switching ring 54 and the clutch ring 53 may be externally mounted to the housing 2 or may be changed to another ring operable by the worker.

The clutch mechanism 99 may be an electric clutch. The vibration mechanism 150 may electrically generate vibrations. The vibration mechanism 150 may be omitted, and an electric driver drill without the vibration mode may be used.

The pin holders 102d may hold the internal gear lock pins 106 by another configuration such as a press-fitting of a projection to a hole. Other configurations of holding, press-fitting, and the like may be appropriately changed similarly.

The fan 44 may be located forward with respect to the stator 40.

As the battery 32, any lithium-ion battery with 14.4 V, 18 V (maximum: 20 V), and 18 to 36 V such as 18 V, 25.2 V, 28 V, and 36 V can be used, a lithium-ion battery with a voltage less than 10.8 V or more than 36 V can be used, and a battery of another type can be used.

The gear housing 52 may be held in the main body housing 20. At least any of the number of sections of the housing 2, the number of installations of the planetary gears, the number of stages of the deceleration mechanism, the number of various balls, the number of rollers 130, the numbers of various protrusions (the projecting portions, the projecting pieces, convex portions, and the like), the number of various pins, the number of various springs, and the number of various screws may be increased and decreased from the above-described numbers. Materials of various members may be changed, such as a ball made of steel being changed to a ball made of resin. Configurations of various operation units, such as the configuration of the switch of the switch lever 8, may be changed. Locations of various members or parts may be changed, such as the spring holder 90 of the clutch mechanism 99 being located radially inward of the pin holder 102 for locking the internal gear 82. The shapes of the various members may be changed, such as the circular plates 122 being formed into a regular polygonal plate.

Additionally, the disclosure may be applied to an angle power tool in which a direction of an output shaft (tool bit holder) is different from (becomes approximately 90 degrees) a direction of a power unit (at least one of a direction among a direction of a motor shaft of a motor and a transmission direction of a mechanism that transmits its rotational force).

Further, the disclosure may be applied to, for example, a vibration driver drill other than a rechargeable vibration driver drill (driven by a battery) including one driven by a commercial power supply, or other electric power tools other than a vibration driver drill, or a cleaner, a blower, or a gardening tool including a gardening trimmer.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:
   a housing;
   a first ring configured to switch a first operation of the electric power tool between first alternatives and a second ring configured to switch a second operation of the electric power tool between second alternatives, each of the first ring and the second ring is externally and rotatably mounted to the housing; and
   a plurality of sliding members that (i) are operatively between the first ring and the second ring, (ii) are configured to facilitate relative rotation between the first ring and the second ring when the first ring is rotated relative to the second ring and the housing and the second ring is rotated relative to the first ring and the housing and (iii) are spaced in a ring shape, wherein:

the first ring and the second ring are immediately adjacent to each other but not in direct contact with each other;

the first ring and the second ring are not operationally connected;

one of the first ring and the second ring includes spaced recesses;

one of the plurality of sliding members is received and retained in each one of the spaced recesses; and a washer or a plate is between each of the plurality of sliding members and a bottom surface of the each one of the spaced recesses.

2. The electric power tool according to claim 1, wherein the plurality of sliding members includes two or more spaced balls.

3. The electric power tool according to claim 2, wherein the two or more spaced balls are made of steel.

4. The electric power tool according to claim 1, wherein the housing is a gear housing that houses gears that operatively connect a motor and an output shaft.

5. The electrical power tool according to claim 2, wherein:
the spaced recesses are in an innermost surface of the first ring; and
the two or more spaced balls are in the spaced recesses.

6. An electric vibration driver drill comprising:
a housing;
a vibration mechanism and a clutch mechanism inside the housing;
a vibration switching ring (1) configured to switch a vibration setting of the vibration mechanism and (2) rotatably attached to the housing;
a clutch switching ring (1) configured to switch a clutch setting of the clutch mechanism and (2) rotatably attached to the housing; and
a plurality of sliding members that (i) are operatively between the vibration switching ring and the clutch switching ring and (ii) are configured to facilitate relative rotation between the vibration switching ring and the clutch switching ring when the vibration switching ring is rotated relative to the clutch switching ring and the housing and the clutch switching ring is rotated relative to the housing and the vibration switching ring, wherein:
the vibration switching ring and the clutch switching ring (i) are immediately adjacent to each other but not in direct contact with each other and (ii) are not operationally connected;

one of the vibration switching ring and the clutch switching ring includes spaced recesses;

one of the plurality of sliding members is received and retained in each one of the spaced recesses; and a washer or a plate is between each of the plurality of sliding members and a bottom surface of the each one of the spaced recesses.

7. The electric vibration driver drill according to claim 6, wherein
the plurality of sliding members includes two or more spaced balls.

8. The electric vibration driver drill according to claim 7, wherein
the two or more spaced balls are made of steel.

9. The electric vibration driver drill according to claim 6, wherein
the vibration switching ring is configured to turn on and off a vibration of an output shaft by the vibration mechanism; and
the clutch switching ring is configured to control a torque for performing operation of a clutch in the clutch mechanism.

10. An electric power tool comprising:
a housing extending in a front-rear direction;
a first ring (1) externally and rotatably mounted to the housing and (2) having a first face in the front-rear direction;
a second ring (1) externally and rotatably mounted to the housing and (2) having a second face in the front-rear direction, the second face facing the first face; and
a plurality of sliding members that are operatively between the first face and the second face and configured to facilitate relative rotation between the first ring and the second ring when the first ring is rotated relative to the second ring and the housing and the second ring is rotated relative to the first ring and the housing, wherein:
the first ring and the second ring (i) are immediately adjacent to each other but not in direct contact with each other and (ii) are not operationally connected;
one of the first ring and the second ring includes space recesses;
one of the plurality of sliding members is received and retained in each one of the space recesses; and
a washer or a plate is between each of the plurality of sliding members and a bottom surface of the each one of the spaced recesses.

11. The electric power tool according to claim 10, wherein the first ring and the second ring do not overlap in the front-rear direction.

* * * * *